US006415822B1

(12) United States Patent
Hollingshead

(10) Patent No.: US 6,415,822 B1
(45) Date of Patent: Jul. 9, 2002

(54) MODULAR CHEMICAL DELIVERY BLOCKS

(76) Inventor: J. Gregory Hollingshead, 1304 Verdant Way, Austin, TX (US) 78746

( * ) Notice: Subject to any disclaimer, the term of this patent is extended or adjusted under 35 U.S.C. 154(b) by 0 days.

(21) Appl. No.: 09/352,087

(22) Filed: Jul. 14, 1999

Related U.S. Application Data

(63) Continuation-in-part of application No. 09/145,716, filed on Sep. 2, 1998, now Pat. No. 6,260,581, which is a continuation-in-part of application No. 09/094,522, filed on Jun. 12, 1998, now Pat. No. 6,085,783.

(51) Int. Cl.[7] .............................................. F16K 11/10
(52) U.S. Cl. .................... 137/884; 285/120.1
(58) Field of Search ................. 137/269, 271, 137/884; 285/120.1

(56) References Cited

U.S. PATENT DOCUMENTS

| 2,927,602 A | | 3/1960 | Eklund |
| 3,215,158 A | | 11/1965 | Bass et al. |
| 3,234,963 A | * | 2/1966 | Lyon ........................... 137/884 |

(List continued on next page.)

FOREIGN PATENT DOCUMENTS

| DE | 295 14 348 | 11/1995 |
| EP | 0 169 963 | 2/1986 |
| EP | 0 844 424 | 5/1998 |
| FR | 2.122.225 | 8/1972 |
| FR | 2.227.489 | 11/1974 |
| WO | 98/25058 | 6/1998 |

OTHER PUBLICATIONS

SEMI Draft Doc. 2787 "Specification For Surface Mount Interface of Gas Distribution Components," before Jun. 1998, 1 page.

SEMI Draft Doc. 2787.1 "Specification For Surface Mount Interface of Gas Distribution Components–Counterbore Design," before Jun. 1998, 2 pages.

Cestari, et al., "The Next Step in Process Gas Delivery: A Fully Integrated System," Jan. 1997, 79 pages.

CKD/Tylan General, "New Integrated Gas System" (advertisement), 1996, 1 page.

*Primary Examiner*—John Fox
(74) *Attorney, Agent, or Firm*—Conley, Rose & Tayon, PC; Robert C. Kowert

(57) ABSTRACT

A modular chemical delivery block is presented. In an embodiment, the modular chemical delivery block is a top-accessible modular block. A top-accessible modular block is one that may be coupled to or decoupled from an adjacent modular block using access from directly above the top-accessible modular block. The top-accessible modular chemical delivery block preferably includes an axial connection location configured to allow the modular block to be coupled to a laterally adjacent modular block. The interior surface of the axial connection location is preferably substantially parallel to the exterior surface of the axial connection location and unobstructed by other portions of the modular block from the top surface of the modular block.

Another embodiment involves a unified modular block configured to direct multi-directional fluid flow therethrough. The unified modular block preferably includes first and second fluid flow paths having first and second axial bore holes. The first fluid flow path may be configured to transport fluid flow through the unified modular block at least partially in a first direction, and the second fluid flow path may be configured to transport fluid flow through the modular block at least partially in a second direction horizontally transverse to the first direction. A lowermost portion of the second fluid flow path is preferably elevationally below a lowermost portion of the first fluid flow path. The unified modular block may be further configured to be coupled to other modular blocks laterally adjacent to the first axial bore hole and the second axial borehole.

25 Claims, 44 Drawing Sheets

U.S. PATENT DOCUMENTS

| | | |
|---|---|---|
| 3,407,834 A | 10/1968 | Brandenberg |
| 3,457,943 A | 7/1969 | Kawabata |
| 3,504,704 A | 4/1970 | Beckett et al. |
| 3,654,960 A | 4/1972 | Kiernan |
| 3,747,623 A | 7/1973 | Greenwood et al. |
| 3,756,274 A * | 9/1973 | Wolfgramm ............ 137/561 R |
| 3,915,194 A | 10/1975 | Friedrich |
| 4,080,983 A * | 3/1978 | Stumpmeier ................ 137/271 |
| 4,082,324 A | 4/1978 | Obrecht |
| 4,136,713 A * | 1/1979 | Humphreys ................ 137/270 |
| 4,224,957 A | 9/1980 | Darves et al. |
| 4,392,677 A | 7/1983 | Hardouin |
| 4,415,004 A | 11/1983 | Bouteille et al. |
| 4,488,343 A * | 12/1984 | Kobelt .................... 29/890.09 |
| 4,921,072 A | 5/1990 | Divisi |
| 5,285,814 A * | 2/1994 | Pettersson et al. .......... 137/271 |
| 5,488,925 A | 2/1996 | Kumada |
| 5,529,088 A | 6/1996 | Asou |
| 5,605,179 A | 2/1997 | Strong, Jr. et al. |
| 5,662,143 A | 9/1997 | Caughran |
| 5,769,110 A | 6/1998 | Ohmi et al. |
| 5,819,782 A | 10/1998 | Itafuji |
| 5,836,355 A | 11/1998 | Markulec et al. |
| 5,860,445 A | 1/1999 | Yoshimura et al. |
| 5,860,676 A | 1/1999 | Brzezicki et al. |
| 5,904,381 A | 5/1999 | Ohmi et al. |

* cited by examiner

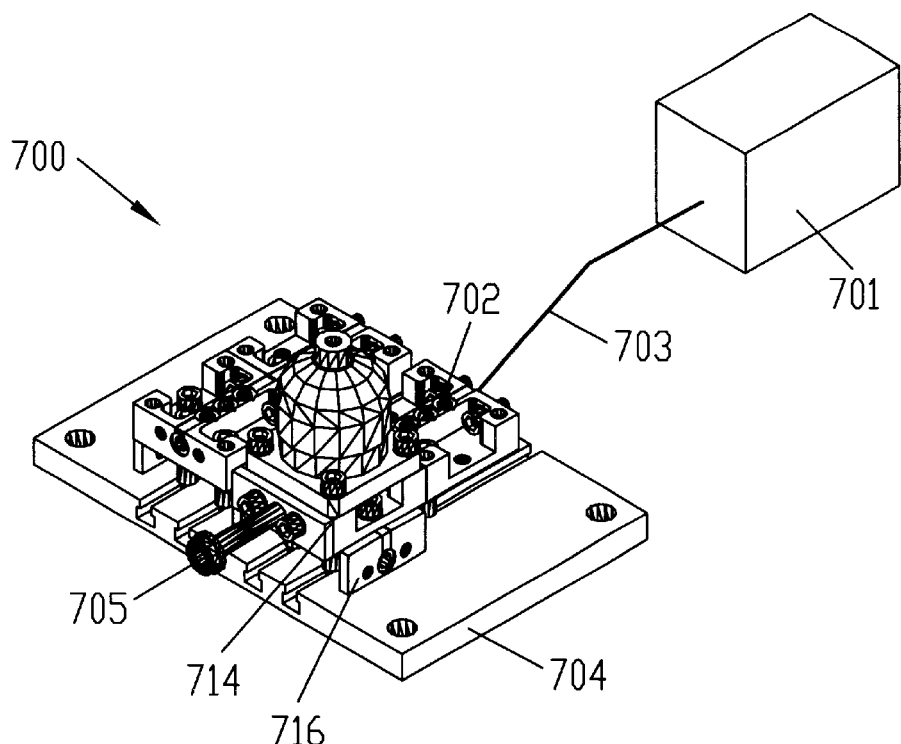
FIG. 11
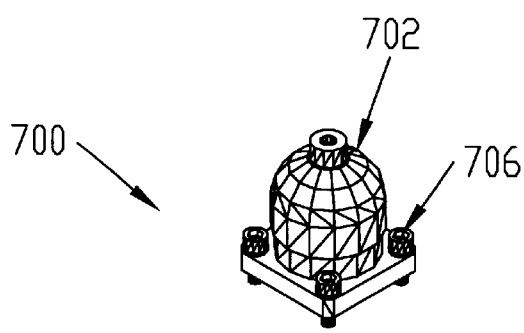
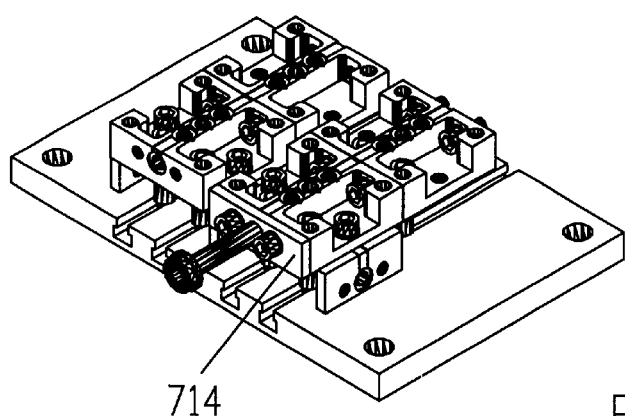
FIG. 12

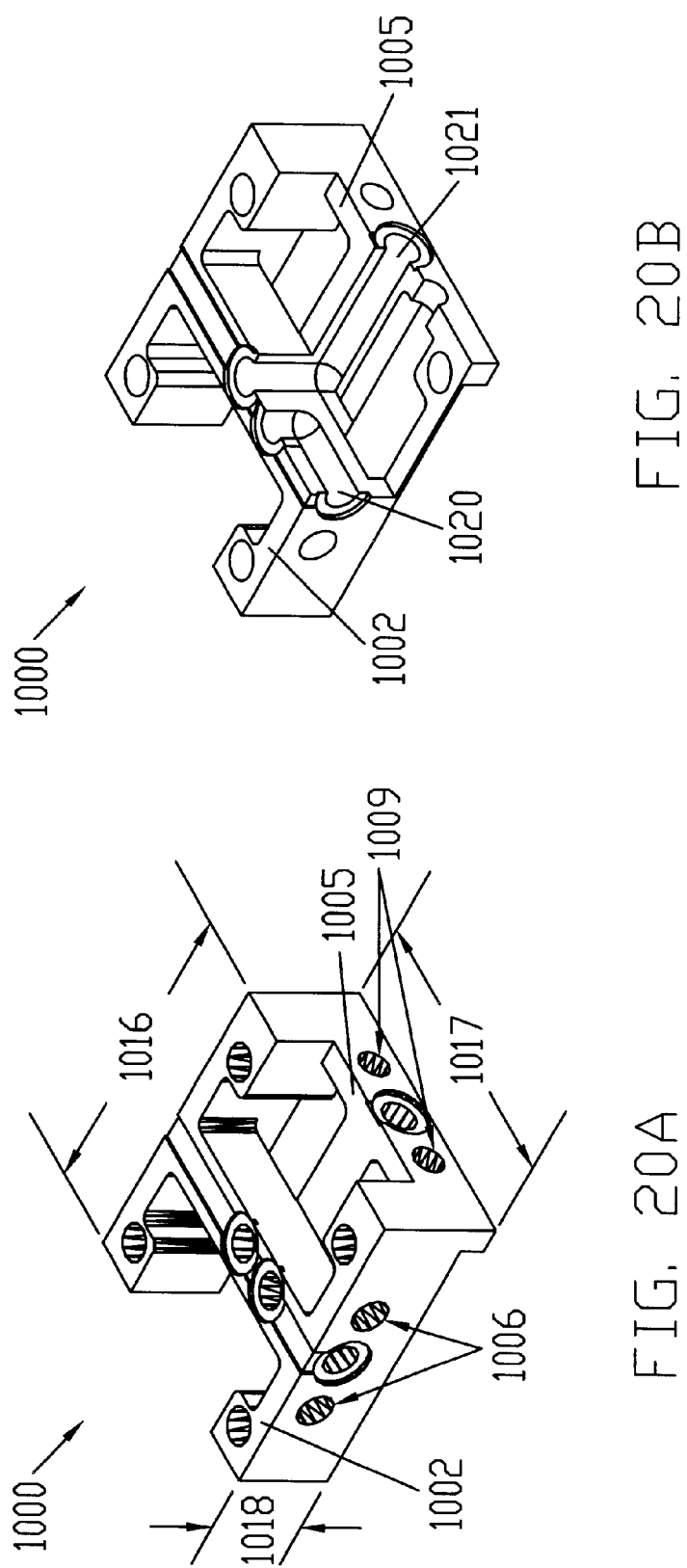

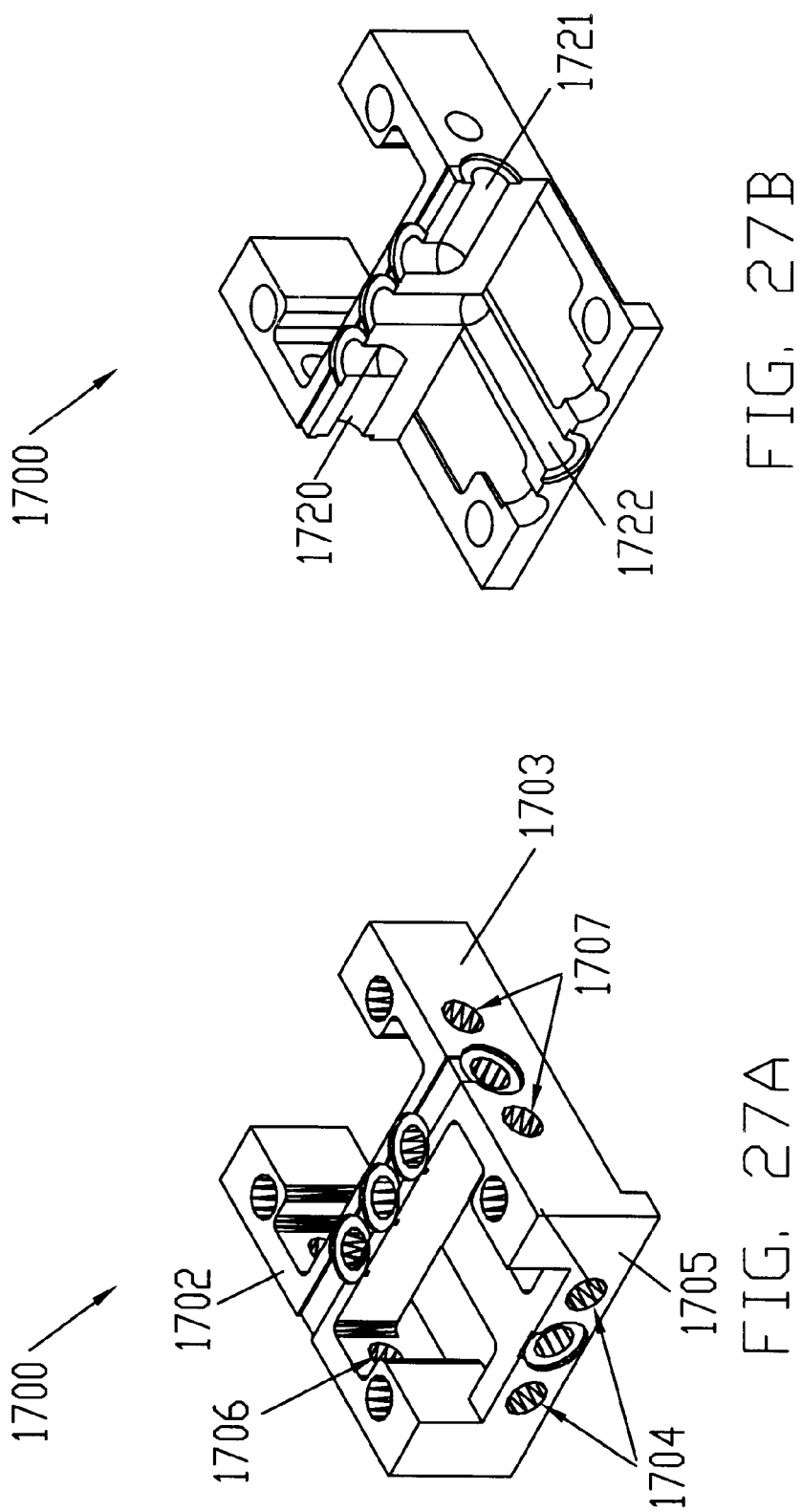

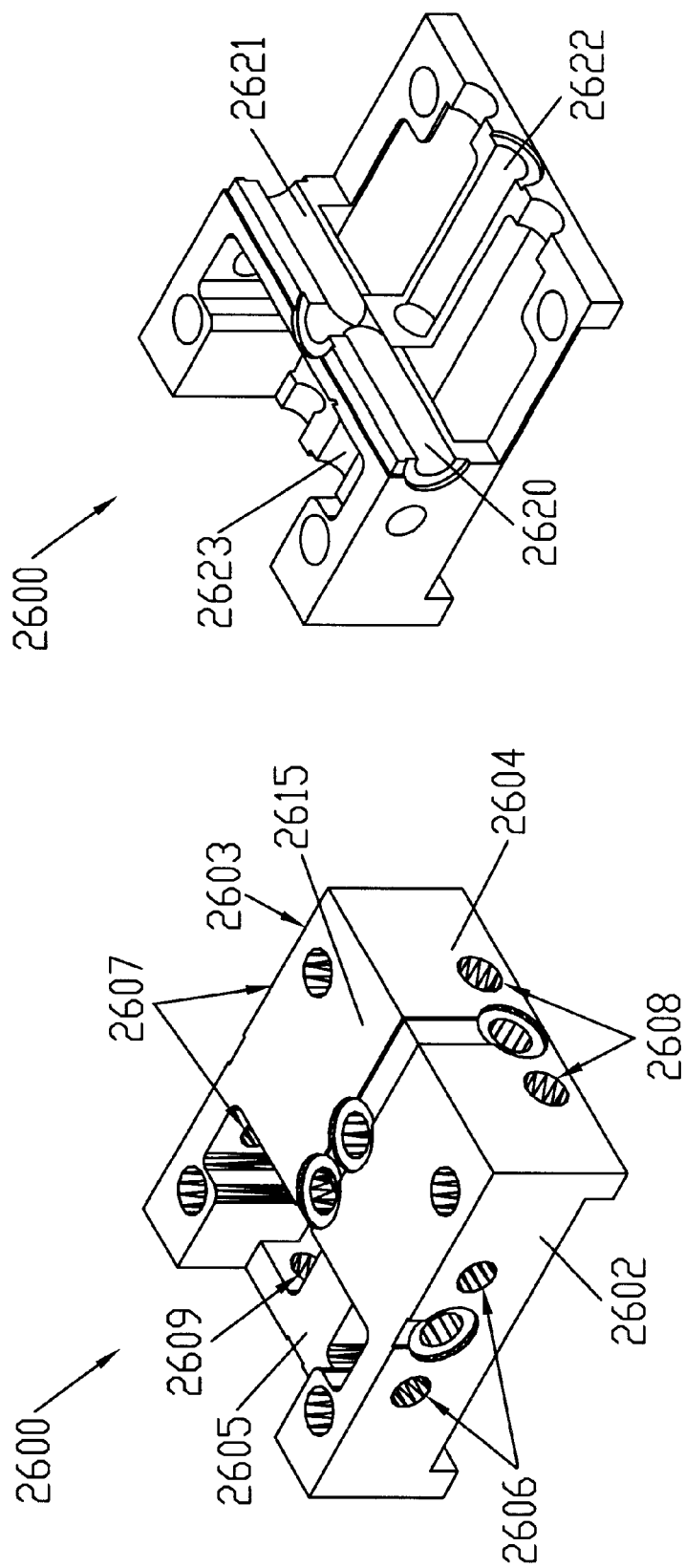

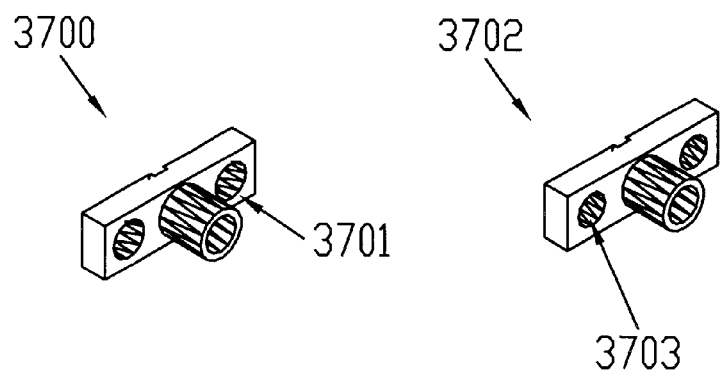
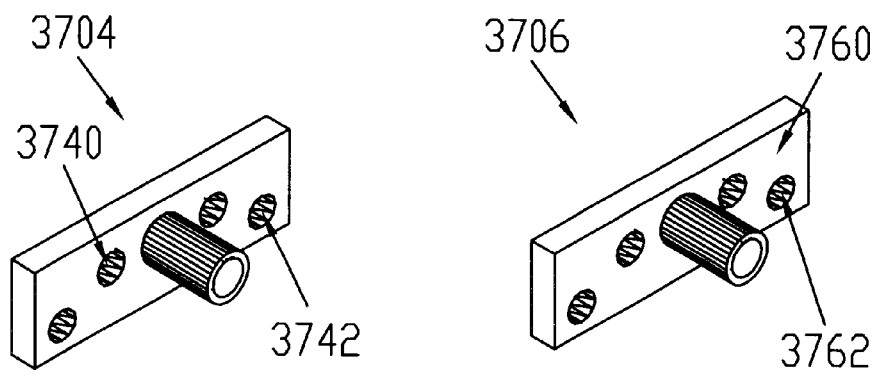
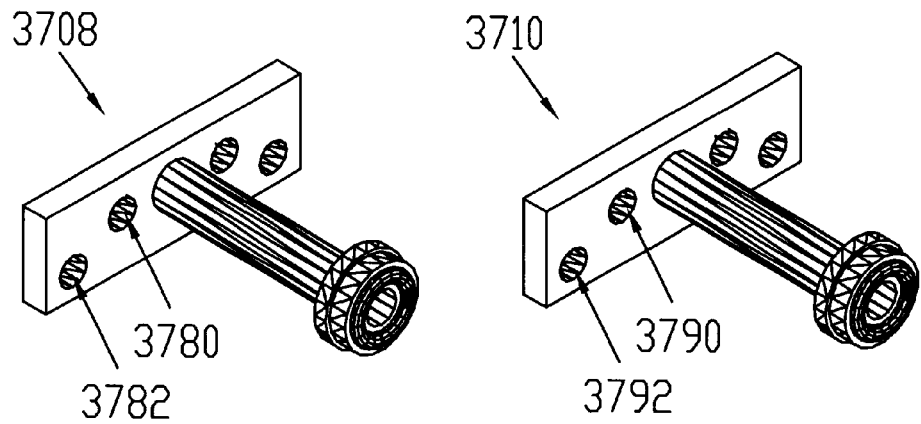
FIG. 47

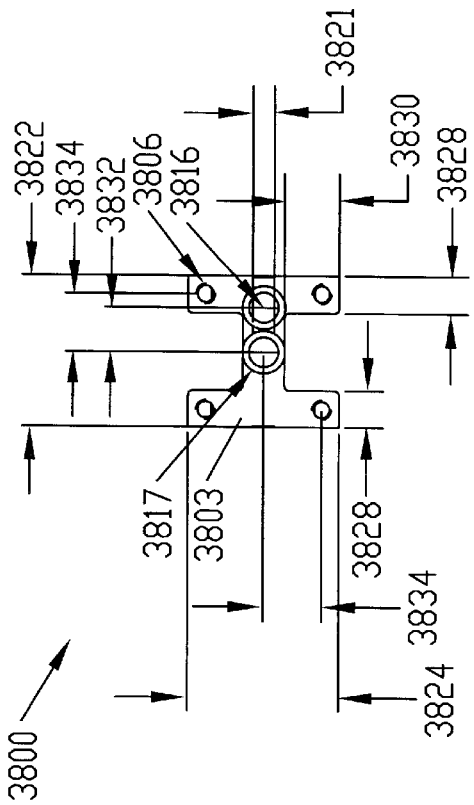
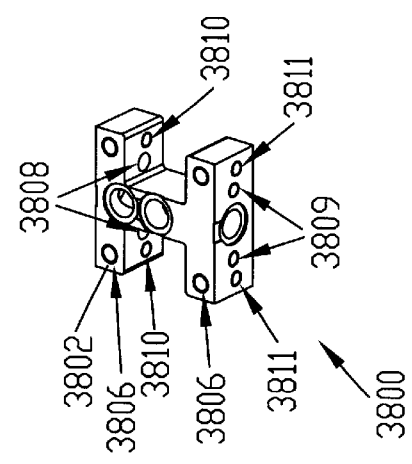
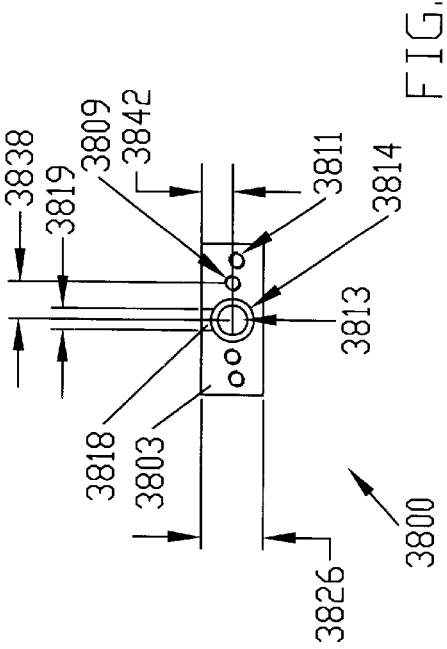
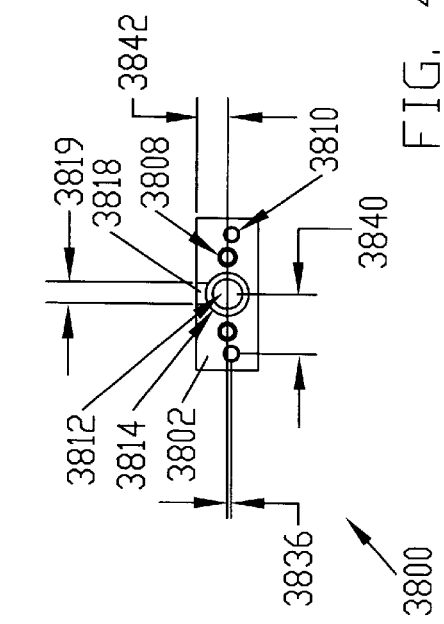
FIG. 48B
FIG. 48D
FIG. 48A
FIG. 48C

MODULAR CHEMICAL DELIVERY BLOCKS

CROSS REFERENCE TO RELATED APPLICATIONS

This application is a Continuation-In-Part of U.S. patent application Ser. No. 09/094,522 entitled "METHOD AND APPARATUS FOR ASSEMBLING MODULAR CHEMICAL DISTRIBUTION SUBSTRATE BLOCKS" by J. Gregory Hollingshead, now U.S. Pat. No. 6,260,581 filed Jun. 12, 1998, the disclosure of which is incorporated herein by reference. This application is also a Continuation-In-Part of U.S. patent application Ser. No. 09/145,716, entitled "UNIFIED MODULAR MULTI-DIRECTIONAL CHEMICAL DISTRIBUTION BLOCK" by J. Gregory Hollingshead, filed Sep. 2, 1998, now U.S. Pat. No. 6,085,783 the disclosure of which is incorporated herein by reference.

BACKGROUND OF THE INVENTION

1. Field of the Invention

This invention relates to chemical delivery systems and, more particularly, to modular chemical delivery blocks, systems incorporating modular chemical delivery blocks, and methods relating to modular chemical delivery blocks.

2. Description of the Related Art

Chemical delivery systems are used in numerous industries to control the flow of fluids, including gas reactants and other chemicals (e.g., liquids). One industry that heavily relies on chemical delivery systems is the semiconductor processing industry. In semiconductor processing, these systems are commonly used to control the flow of gases to and from processing chambers. Such processing often makes demanding requirements of chemical delivery systems. In chemical etch processes, for example, gas lines usually must be periodically changed out because of line corrosion and/or partial or complete system reconfiguration during maintenance. To minimize the downtime of the etch tool to which a chemical delivery system is attached, the gas lines of the chemical delivery system should be capable of quick removal and replacement.

Conventional chemical delivery systems, however, often fail in this regard. FIG. 1 shows a conventional chemical delivery system 100 configured to supply gases to an etch process tool used in semiconductor fabrication. Gas paths are provided in system 100 using stainless steel conduit or tubing paths 102 (typically ¼"O.D., ⅜" O.D., or ½" O.D.), which are welded between each gas controlling component 104. Because of the configuration of system 100, the time required to change-out or repair components 104 is too long and the cost to reconfigure conduit (tubing) paths 102 is too high.

To overcome the problems of conventional welded tubing designs, modular chemical delivery blocks may be used. Modular chemical delivery blocks are substrates onto which a chemical control component can be mounted. The blocks can then be directly attached to each other, eliminating the need for welded fittings. By using modular chemical delivery systems that incorporate modular blocks and components, not only can worn components be more easily replaced, but the gas delivery system design also can be more readily reconfigured.

But many designs for modular chemical delivery systems are not, however, without their own deficiencies. For example, FIG. 2 shows a modular chemical delivery system in which individual modular blocks 112 are fastened together with horizontal, full length bolts 114, 130 throughout an entire modular block assembly 110. While allowing for rather quick assembly (typically only two 2-inch bolts per axial connection), this design raises several safety, disassembly and repair concerns.

One problem with the design shown in FIG. 2 is that when full length bolts 114 are subjected to the torque required to provide appropriate sealing integrity between the sealing joints 118, the deflection of full length bolts 114 is too great. Effectively, the basic deflection force of a bolt 12 can be calculated with the following formula: DEFLECTION=PL/AE, wherein P is the amount of force load upon an axial connection of any adjoining blocks 112 in series (the deflection potential), L is the length of bolt 114, A is the cross-sectional area of bolt 114, and E is the modulus of elasticity of bolt 114 based on its material composition. If it is assumed that all equipment suppliers of such modular block technology use 300 series or better materials for the fastener components, then E is a constant for any length bolt 114. Likewise, in these types of modular gas system designs a designer is often mechanically constrained to using fastener diameters of ¼" (6.35 mm) or smaller, and thus A can be considered relatively constant. In summary, if A and E are constant, then as the designer increases the length L of the bolt 114, there will be a corresponding linear increase in the deflection force of the bolt 114 which is conveyed to the fastened substrate joints. If the deflection force is high enough, the seat integrity at the axial joint-to-joint) connections 118 could be lost. As might be expected, such a loss of integrity could be extremely dangerous, especially when toxic chemicals are being delivered.

Another concern with the extended length fastener design shown in FIG. 2 is related to the manner in which bolts 114 fasten blocks 112 together. If a user were to require removal of any block 112 in modular block assembly 110, then the respective sealing joints 118 throughout block assembly 110 would be exposed to atmosphere. Such exposure potential raises, among other things, safety and contamination issues with corrosive and toxic chemical delivery applications.

FIGS. 3A and 3B are cross-sectional and top views, respectively, of another modular block design in which the individual blocks 122 are fastened together via localized bolting at each block-to-block or axial joint connection 124 to form a modular block assembly 120. Modular block assembly 120 is then connected to mounting brackets 126. This design dramatically reduces or eliminates the concern for deflection potential by localizing fastener sealing strength, integrity, and length. Use of such a localized fastener design also reduces the number of sealing joints 128 exposed to atmosphere when any given block 122 is removed.

However, the design shown in FIG. 3A also has a limitation regarding disassembly. As shown in FIG. 3B, if a user were to place multiple modular block assemblies side-by-side (typically on 1.6" (40.64 mm) to 2" (50.8 mm) spacing), many of the axial fasteners 130 could not be accessed because the fastener locations lie under the top accessible surface of the blocks (i.e., the collective surface of a modular block that may be accessed from directly above the modular block). Consequently, if the removal of a given modular block is desired, then the modular blocks adjacent to that modular block may undesirably have to be removed first.

Therefore, it would be desirable to design a modular chemical delivery block in which connection locations for allowing the modular chemical delivery block to be coupled to a laterally adjacent chemical delivery block were not obstructed by other portions of the modular block. It would also be advantageous to design a modular chemical delivery system in which localized fasteners connecting laterally adjacent modular blocks were not prevented from being accessed from directly above the top surface of the modular blocks connected by the fasteners. Such a system could allow the flow paths provided by the modular blocks to be more easily and rapidly reconfigured than in other chemical delivery systems.

The above-described information is not admitted to be prior art by its presence in this Background section.

SUMMARY

The problems described above are in large part addressed by a top-accessible modular chemical delivery block configured to direct fluid flow therethrough. Broadly speaking, a top-accessible modular block is one that may be coupled to or decoupled from an adjacent modular block using access from directly above the top-accessible modular block. In a preferred embodiment, the top-accessible modular chemical delivery block includes an axial connection location configured to allow the modular block to be coupled to a laterally adjacent modular block. The interior surface of the axial connection location is preferably substantially parallel to the exterior surface of the axial connection location and unobstructed by other portions of the modular block from the top surface of the modular block. This configuration preferably allows the axial connection location to be accessed from directly above the modular block.

A top-accessible modular block may provide several advantages when incorporated in a modular chemical delivery system. For instance, a top-accessible modular block preferably affords easy access to an axial connection location even when located in an area where lateral access to the block is restricted. A top-accessible modular block as described herein is preferably configured to be coupled to laterally adjacent modular blocks without using welded fittings. Consequently, the flow paths of a modular chemical delivery system that includes a plurality of top-accessible modular blocks may be quickly reconfigured and worn components of the system may be rapidly replaced. As a result of these benefits, the overall downtime of a modular chemical delivery system incorporating such modular blocks may be significantly reduced over that of conventional chemical delivery systems.

Moreover, because of the ability to access axial connection locations from directly above the block, a top-accessible modular block may be decoupled from laterally adjacent modular blocks of a plurality of modular blocks without removing any other blocks (unlike the system shown in FIG. 2). Preferably, the top-accessible modular block may be decoupled from a pair of laterally adjacent modular blocks coupled thereto without displacing or otherwise moving the laterally adjacent modular blocks. In addition, the top-accessible modular block may be configured to be decoupled from laterally adjacent modular blocks without compromising the seals between non-laterally adjacent modular blocks. Through such features, a top-accessible modular block may further facilitate the removal of worn or damaged components of a modular chemical delivery system.

In a preferred embodiment, all connection locations of the modular block are also configured to be accessed from directly above the modular block. For example, the modular block may include mounting fastener receiving elements configured to receive mounting fasteners for mounting the modular block to a support structure (e.g., a mounting palette). The mounting fasteners may be accessed from directly above the modular block, allowing the modular block to be mounted to the support structure without using a mounting bracket. Beneficially, such a feature may not only reduce the total number of parts used in a system, but may also reduce the footprint of each modular block.

Furthermore, the top-accessible modular block contains a first fluid flow path configured to transport fluid flow through the modular block. As referred to herein, a fluid may be considered any substance that tends to flow and to conform to the outline of its container, including gases and liquids. The modular block includes a top surface. A top surface of a modular block may be a top surface of the modular block when the block is oriented as it would be during operation of a system in which the block is incorporated, or a top surface to which or directly above which a chemical control component may be mounted. It should be understood that a top surface of a modular block is not confined to simply the one uppermost area of an entire modular block, but may be include the top surfaces in various areas throughout the block.

The modular block further includes an axial interface flange. An axial interface flange may be any lateral structure of the modular block to which another, laterally adjacent modular block may be coupled. The axial interface flange may or may not be connected (by, e.g., a lateral wall) to other axial interface flanges. The first fluid flow path is preferably arranged adjacent to and partially with the axial interface flange.

The axial interface flange preferably includes an interior surface and an exterior surface. As referred to herein, interior and exterior surfaces may be considered surfaces of the modular block or components of the modular block that at least partially face the interior or exterior, respectively, of the modular block. A exterior facing surface of the modular block does not have to be on the absolute exterior of the block as long as it faces in that direction (e.g., a surface could be recessed within a wall of a modular block and still be an exterior surface). A first axial borehole of the first fluid flow path is preferably defined in the exterior surface of the axial interface flange.

The axial interface flange preferably includes an axial connection location configured to allow the modular block to be coupled to an adjacent modular block. The axial connection location has an interior surface and an exterior surface. The interior surface of the axial connection location is preferably unobstructed by other portions of the modular block so that the interior surface of the axial connection location is accessible from the top surface. In other words, there is at least one direct line from the top surface of the modular block to the interior surface of the axial connection location that is unobstructed by other portions of the modular block. The direct line is preferably a vertical line. It should be understood that, in some situations, there may be direct lines between the top surface of the modular block and the interior surface of the axial connection location that are obstructed by a portion or portions of the modular block. In that event, the interior surface of the axial connection location may nevertheless be considered unobstructed as long as one direct line from the top surface of the modular block exists.

Furthermore, connection locations as described herein, and axial connection locations in particular, may be considered those portions of a modular block that are in some way configured to allow the modular block to be coupled to an adjacent modular block. In a case where a connection location includes a fastener receiving element such as a hole or cavity, the connection location preferably includes the fastener receiving element, the portion of the modular block defining the fastener receiving element, and the surfaces of the modular block immediately around the lip of the receiving element. In a preferred embodiment, the axial connection location contains an axial fastener receiving element configured to receive a local side-to-side fastener for coupling the modular block to a laterally adjacent modular block. Consequently, the interior surface of such an axial connection location may be considered the interior facing surface of the modular block immediately around the lip of an axial fastener receiving element. The interior surface of the axial connection location is preferably substantially parallel to the exterior surface of the axial connection location. That is, while the interior and exterior surfaces of the axial connection locations may not be absolutely parallel, the general orientation between the surfaces may be substantially parallel.

The axial fastener receiving element preferably includes an interior opening defined in the interior surface of the axial interface flange and an exterior opening defined in the exterior surface of the axial interface flange. The interior opening of the axial fastener receiving element is preferably unobstructed by other portions of the modular block so that the interior opening of the axial fastener receiving element is accessible from the top surface. Preferably, the axial fastener receiving element is a first one of a plurality of axial receiving elements. The first one and a second one of the plurality of axial receiving elements preferably both extend from the exterior surface of the axial interface flange to the interior surface of the axial interface flange. The first one and the second one of the plurality of axial receiving elements are preferably arranged on opposite sides of the first axial bore hole of the first fluid flow path. The exterior and interior openings of each of the plurality of axial receiving elements are preferably substantially parallel. That is, the exterior and interior surfaces of the axial interface flange immediately defining the interior and exterior openings, respectively, of the axial fastener receiving elements are preferably substantially parallel to each other.

It is also desirable for a modular chemical delivery system to have multiple flow paths running in multiple, horizontally transverse directions. It should be understood that many modular blocks will provide some vertical flow component (e.g., a vertical flow section leading to a top bore hole for transporting fluid between a surface mounted chemical control component). However, a modular block or modular block assembly configured to provide multi-directional fluid flow is one that is capable of providing fluid flow in at least first and second directions horizontally transverse to each other and substantially parallel to the top surface of the modular block or modular block assembly (i.e., the top surface of a top layer block of the assembly).

Accordingly, an embodiment provides modular blocks configured as top layer modular blocks or lower layer modular blocks for use in a multilayer modular block assembly. The top layer and lower layer blocks may be configured such that an multilayer assembly of top layer blocks coupled to underlying lower layer blocks is capable of directing fluid flow in multiple, horizontally transverse directions. A top layer modular block is preferably configured to interface with a chemical control component. Preferably, the top layer modular block is configured to interface with a variety of chemical control components, including valves, pressure regulators, pressure transducers, filters, purifiers, and mass flow controllers (MFCs). A first fluid flow path preferably includes a top bore hole defined in a top surface of the modular block. The top bore hole is preferably configured to allow fluid flow to be transported between the modular block and a chemical control component mounted above the modular block. The top layer block may include component fastener receiving elements configured to receive fasteners for mounting a chemical control component above the top surface of the modular block. The component fastener receiving elements are preferably defined in the top surface of the top layer modular block and are preferably accessible from directly above the top layer modular block. The top layer modular block may include an interface web arranged between a pair of axial interface flanges and elevationally below the top surface of the modular block. Intermediate fastener receiving elements of a top layer are preferably arranged within the interface web.

A lower layer modular block preferably configured for use in an assembly of modular blocks is also provided. A lower layer modular block may have similar elements as a top layer modular block, except that a lower layer modular block will preferably be unable to directly interface with a chemical control component and thus will preferably not have component fastener receiving elements. Intermediate fastener receiving elements of a lower layer modular block may include holes defined in a fluid flow path wall and directly above a first fluid flow path. A top layer modular block and a lower layer block are configured to be coupled together by inserting a top-to-bottom fastener through an intermediate fastener receiving element of the top layer block into an intermediate fastener receiving element of the lower layer modular block.

A method of removing modular chemical delivery blocks via access from directly above the modular chemical delivery blocks is also provided. A first modular block configured to direct fluid flow is preferably coupled to a laterally adjacent second modular block configured to direct fluid flow by a local-side-to-side fastener. The first modular block is removed from the second modular block by accessing the local side-to-side fastener from directly above the first modular block and removing the local side-to-side fastener from the second modular block and the first modular block. By accessing the local side-to-side fastener from directly above the first modular block, the method reduces installation time and enables removal of the modular block even when lateral access to the block is limited. In addition, when the first modular block is part of a system including a plurality of modular blocks, the method preferably allows the first modular block to be removed without compromising the integrity of seals between all other ones of the plurality of modular blocks. Modular blocks are preferably removed without using specialized tools; that is, the method may be performed using only conventional tools such as a wrench.

A method of using a modular chemical delivery system is also provided. The method involves transporting fluid flow through a plurality of modular chemical delivery blocks. Laterally adjacent ones of the plurality of modular blocks may be coupled such that sealing joints are formed therebetween. Transporting fluid flow through the plurality of modular blocks preferably involves transporting fluid flow from a fluid flow path of one modular block to a fluid flow path of another modular block through a sealing joint. The method may further involve transporting fluid flow from the plurality of modular blocks to a semiconductor processing chamber.

Another embodiment involves a unified modular block configured to direct multi-directional fluid flow therethrough. A unified modular block as described herein preferably includes first and second fluid flow paths having first and second axial bore holes. A lowermost portion of the second fluid flow path is preferably elevationally below a lowermost portion of the first fluid flow path. The first fluid flow path may be configured to transport fluid flow through the unified modular block at least partially in a first direction, and the second fluid flow path may be configured to transport fluid flow through the modular block at least partially in a second direction horizontally transverse to the first direction. As referred to herein, horizontally transverse directions may be those that, when extended to infinity and viewed from above the block, appear to cross. In a preferred embodiment, the first direction and the second directions lie on substantially parallel planes but are not themselves parallel. Preferably, the first and second directions are substantially horizontally perpendicular. In addition, the second and first directions are preferably substantially parallel to the top surface. The unified modular block may be further configured to be coupled to other modular blocks laterally adjacent to the first axial bore hole and the second axial borehole. While a multidirectional flow can be obtained using a multilayer modular block system as described above, a unified modular block configured to provide multi-directional fluid flow may have several advantages over, e.g., a multilayer modular block assembly capable of multi-directional fluid flow.

The total amount of space occupied by a modular chemical delivery system is partly determined by the size of the modular blocks in the system. Consequently, it is generally desirable to minimize the thickness (i.e., height) of a modular block. One advantage of a unified modular block is the lesser thickness of such a block compared to a multilayer modular block assembly with similar multi-directional flow capabilities. By definition, a multilayer modular block assembly includes two or more vertically adjacent modular blocks. Therefore, the total thickness of such an assembly will tend to increase in proportion to thickness of each block that makes up the assembly. Because the unified block assembly may have a thickness similar to or only slightly greater than that of a single layer block of a multilayer assembly, the thickness of a unified modular block assembly will likely be substantially less than a multilayer block assembly with similar multi-directional flow capabilities. In a preferred embodiment, the thickness of a unified modular block is less that one-half its length and less than one-half its width.

Similarly, a unified modular chemical delivery block also preferably reduces the vertical length of the fluid flow paths contained within when compared to a multilayer modular block assembly. In part because a unified modular block houses all fluid flow paths in a single block rather than dividing the paths between two or more blocks (as in a multilayer design), the total vertical length of fluid flow paths may be substantially less than in a multilayer block assembly.

Such a reduction may substantially reduce the time required to dry the fluid paths of a chemical delivery system. Given a constant internal bore diameter, the reduced vertical length of the fluid flow paths in a unified modular block proportionally reduces the total chemical wetted volume inside the fluid flow path bore(s). By reducing the total chemical wetted volume of its component fluid paths, a unified modular block can correspondingly reduce the required dry down time when an inert carrier is used to dry out the moisture content of the modular chemical delivery system in which the block is incorporated. Consequently, the time between process and/or purge cycles may be reduced. In a preferred embodiment, the vertical length of the second fluid flow path is less than one-third a length and a width of the unified modular block.

Furthermore, it is also desirable to reduce the total weight of a modular chemical delivery system, and the weight of the modular blocks themselves is a large component of the total system weight. The weight of a unified modular block may be similar to or slightly greater than the weight of each modular block that makes up a layer of a multilayer modular block assembly. Since a multilayer modular block assembly includes two or more stacked modular blocks, a unified modular block may weigh substantially less than a multilayer block assembly with similar multi-directional flow capabilities.

In addition, a multi-layer modular block assembly may require intermediate (top-to-bottom) fasteners to couple vertically adjacent modular blocks and interlayer seals to seal the fluid path between the top layer between vertically adjacent modular blocks. Intermediate seals may be required in multi-layer modular block assemblies to prevent fluid leakage, particularly when corrosive or toxic fluids are being transported. However, even the best seals are not completely leakproof. In addition, under the demanding conditions of, for example, semiconductor processing most seals will wear significantly with time. When this happens, the ability of these seals to prevent fluid leakage is further reduced.

Similarly, intermediate fasteners may be used in a multilayer modular block assembly to securely couple vertically adjacent blocks and ensure that the seal between such blocks remain intact. Unfortunately, the holes for the intermediate fasteners occupy scarce space on the upper surface of the modular blocks and the intermediate fasteners themselves require additional time to install. Furthermore, the fasteners can loosen over time, reducing the integrity of the seals between blocks. Finally, the use of additional seals and fasteners in a multilayer system may increase total costs.

A unified modular block as described herein, however, would eliminate the need for intermediate fasteners and seals. Since a unified modular block does not need to transport fluid flow to another vertically adjacent modular block, seals may only be required, if at all, between laterally adjacent modular blocks and between a surface mounted chemical control component. In a preferred embodiment, the unified modular flow block is free of intermediate fasteners and seals, thus avoiding the above-described disadvantages of such elements. Furthermore, the second fluid flow path of the unified modular block is preferably configured to transport fluid flow between the second axial borehole and a second top borehole defined in the top surface of the unified modular block without passing through a seal. For many applications, a unified modular block may provide significant advantages over a multilayer modular block assembly with similar capabilities for multi-directional flow.

A multilayer block assembly, however, may retain some advantages over a unified modular block as described herein. For example, if it is desired to modify the orientation of a top fluid flow path while leaving the orientation of a lower fluid flow path unchanged, a multilayer modular block assembly only requires that the top layer modular block be replaced. With a unified modular block assembly, however, the entire block may need to be replaced with another, suitably configured unified modular block. Given the respective advantages of the various embodiments of modular blocks presented herein, modular block selection will greatly depend on the particular requirements of a chemical delivery system in which the modular block will be incorporated.

In an embodiment, the unified modular block preferably includes a first fluid flow path for transporting fluid flow through the modular block at least partially in a first direction. The first fluid flow path preferably has a first axial bore hole in a first exterior surface of the unified modular block. The unified modular block further includes a first axial connection location configured to allow the modular block to be coupled to another modular block laterally adjacent to the first axial bore hole. In addition, the unified modular block preferably includes a second fluid flow path for transporting fluid flow through the modular block at least partially in a second direction. A lowermost portion of the second fluid flow path is preferably elevationally below a lowermost portion of the first fluid flow path. The second fluid flow path preferably has a second axial bore hole in a second exterior surface of the unified modular block. The second direction is horizontally transverse to the first direction. In a preferred embodiment, the second direction is substantially horizontally perpendicular to the first direction. Further, the first and second directions are preferably substantially parallel to a top surface of the modular block. The modular block also includes a second axial connection location configured to allow the modular block to be coupled to a modular block laterally adjacent to the second axial bore hole. In addition, the first and second fluid flow paths may be configured to be in fluid communication within the unified modular blocks. The dimensions of unified modular blocks described herein preferably comply with applicable SEMI standards.

A unified modular block configured to direct multi-directional fluid flow therethrough may also allow for access to an axial connection location from directly above the unified modular block. In an embodiment, a unified modular block includes an axial connection location configured to allow the modular block to be coupled to a laterally adjacent modular block. The interior surface of the axial connection location is preferably substantially parallel to the exterior surface of the axial connection location and unobstructed by other portions of the modular block so that the interior surface of the axial connection location is accessible from the top surface. This configuration preferably allows the axial connection location to be accessed from directly above the modular block.

Another embodiment provides a modular chemical delivery system incorporating a plurality of unified modular blocks each configured to provide multi-directional fluid flow therethrough. Each of the plurality of unified modular blocks preferably includes a first fluid flow path for transporting fluid flow through the modular block at least partially in a first direction. The first fluid flow path preferably has a first axial bore hole in a first exterior surface of the unified modular block. Each of the plurality of unified modular blocks may further include a first axial connection location configured to allow the modular block to be coupled to another modular block laterally adjacent to the first axial bore hole. In addition, each of the plurality of unified modular blocks preferably includes a second fluid flow path for transporting fluid flow through the modular block at least partially in a second direction. The second direction may be horizontally transverse to the first direction, and both the first and second directions may be substantially parallel to a top surface of the unified modular block. The second fluid flow path preferably includes a second axial bore hole in a second exterior surface of the unified modular block. Each of the plurality of unified modular blocks may further include a second axial connection location configured to allow the modular block to be coupled to a modular block laterally adjacent to the second axial bore hole. The modular chemical delivery system further includes a plurality of local side-to-side fasteners. Preferably, fasteners of the plurality of local side-to-side fasteners couple ones of the plurality of unified modular blocks to other, laterally adjacent ones of the plurality of unified modular blocks. The modular chemical delivery system is preferably resistant to shock and/or vibration; that is, performance of the system is not significantly affected by shocks or vibration during operation.

A further embodiment is directed to a method of using a modular chemical delivery system. The method involves transporting fluid flow through a plurality of unified modular blocks. The method may further involve transporting fluid flow from the plurality of modular blocks to a semiconductor processing chamber. In an embodiment, a second fluid flow path of a first one of the plurality of unified modular blocks comprises a second top bore hole, and the method further includes transporting fluid flow from a second axial bore hole to the second top bore hole of the first one of the plurality of modular blocks without passing through a seal.

Beneficially, the dimensions of the modular blocks described herein and their component features preferably comply with applicable SEMI (Semiconductor Equipment and Materials International, Mountain View, Calif.) standards. For example, the center-to-center spacing of any component fastener receiving elements preferably complies with SEMI 2787. 1, which relates to the surface mount interface of gas distribution components. In an embodiment, the center-to-center spacing of the component fastener receiving elements is less than about 1.2 in., and preferably is 1.188 in. The dimensions of other elements and of a modular block as a whole preferably comply with their respective standards.

Such compliance with SEMI standards may assist the modular blocks in being used in modular chemical delivery systems configured to transport fluid flow from a plurality of modular blocks to a semiconductor processing chamber for use in semiconductor processing. The semiconductor processing chamber can be any of the variety of the specialized chamber used in semiconductor processing, including, but not limited to, etch chambers and deposition chambers.

Modular blocks as described herein may be made of any a variety of materials suitable for use in chemical delivery applications, and particularly for delivery of corrosive and/or toxic chemicals. In an embodiment, a modular block as described herein is composed of a metal. The metal is preferably stainless steel, and is more preferably high purity stainless steel. Optimally, the metal is 316L stainless steel SCQ VIMJVAR having a sulfur concentration less than 0.010%, and preferably electroplated. In another embodiment, a modular block as described herein is made of a chemically resistant plastic, preferably a fluorocarbon polymer such as Teflon® (commercially available from E.I. du Pont de Nemours and Company). Such materials may allow the modular block to deliver a variety of fluids, including highly corrosive fluids. A variety of methods for making the blocks of the present invention will be apparent to one skilled in the art having the benefit of the present disclosure. For example, the blocks of the present invention may be machined or cast from suitable materials.

BRIEF DESCRIPTION OF THE DRAWINGS

Other objects and advantages of the invention will become apparent upon reading the following detailed description and upon reference to the accompanying drawings in which:

FIG. 11 is a perspective view of a modular chemical delivery system in accordance with an embodiment.

FIG. 12 is a perspective view of the modular chemical delivery system shown in FIG. 11, in which a surface mounted chemical control component is removed from a top layer modular block.

FIG. 20A is a perspective view of a unified modular block in accordance with an embodiment.

FIG. 20B is a partial cross-sectional view of the unified modular block of FIG. 20A.

FIG. 27A is a perspective view of a unified modular block in accordance with an embodiment.

FIG. 27B is a partial cross-sectional view of the unified modular block of FIG. 27A.

FIG. 35A is a perspective view of a unified modular block in accordance with an embodiment.

FIG. 35B is a partial cross-sectional view of the unified modular block of FIG. 35A.

FIG. 47 is a perspective view of fittings configured to be used with modular blocks described herein.

FIG. 48A is a perspective view of a top-accessible modular block in accordance with an embodiment.

FIG. 48B is a top view of a view of the top-accessible modular block shown in FIG. 48a.

FIG. 48C is a front view of a view of the top-accessible modular block shown in FIG. 48a.

FIG. 48D is a rear view of a view of the top-accessible modular block shown in FIG. 48a.

Figure 1:
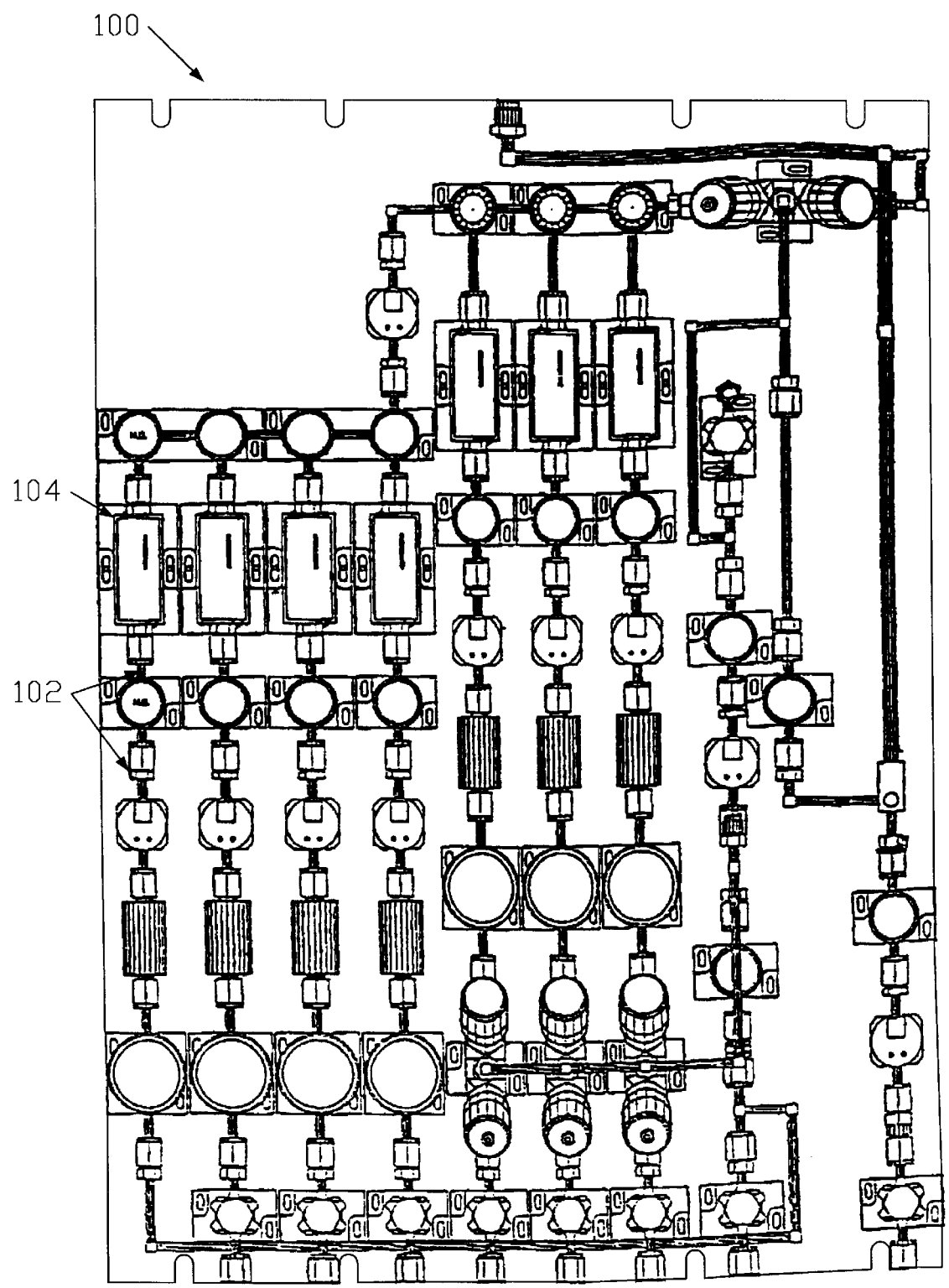
FIG. 1 is a top view of a conventional gas delivery system for an etch process tool.
Figure 2:
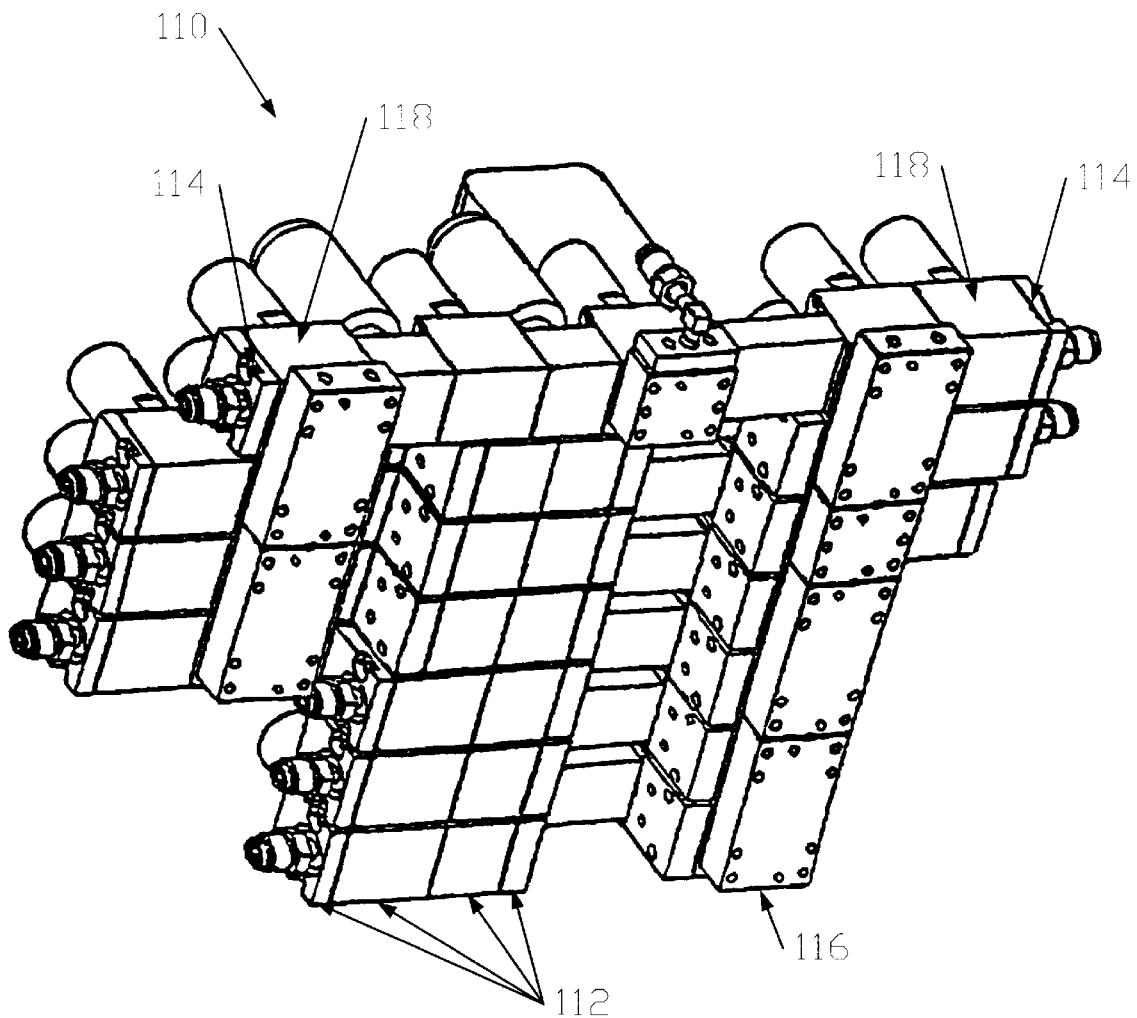
FIG. 2 is a perspective view of a modular block assembly that uses full length bolts to fasten individual modular blocks together.
Figure 3A:
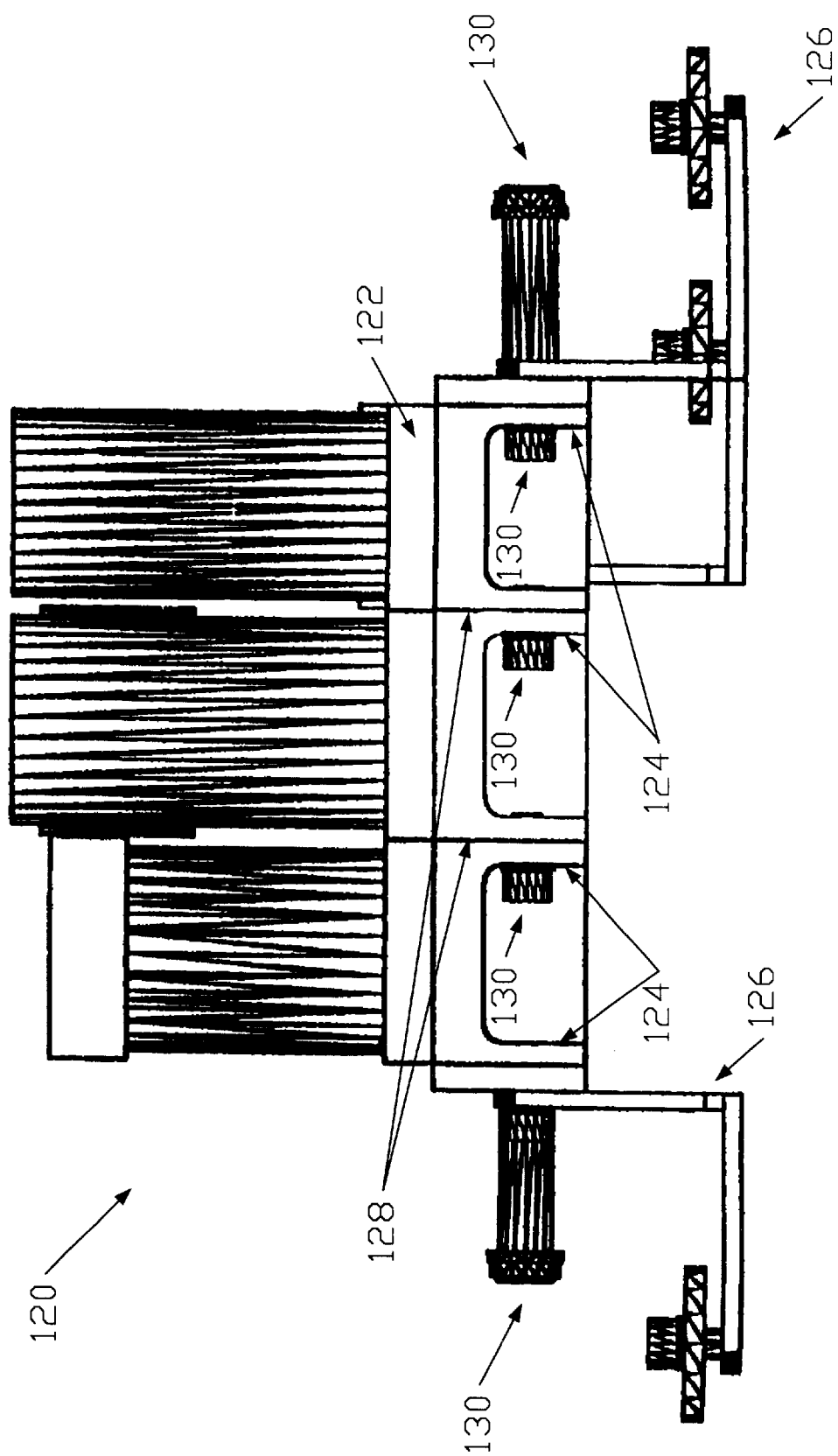
FIG. 3A is a cross-sectional view of a modular block assembly that uses localized bolting of individual blocks, in which individual bolts are obstructed by other portions of each block.
Figure 3B:
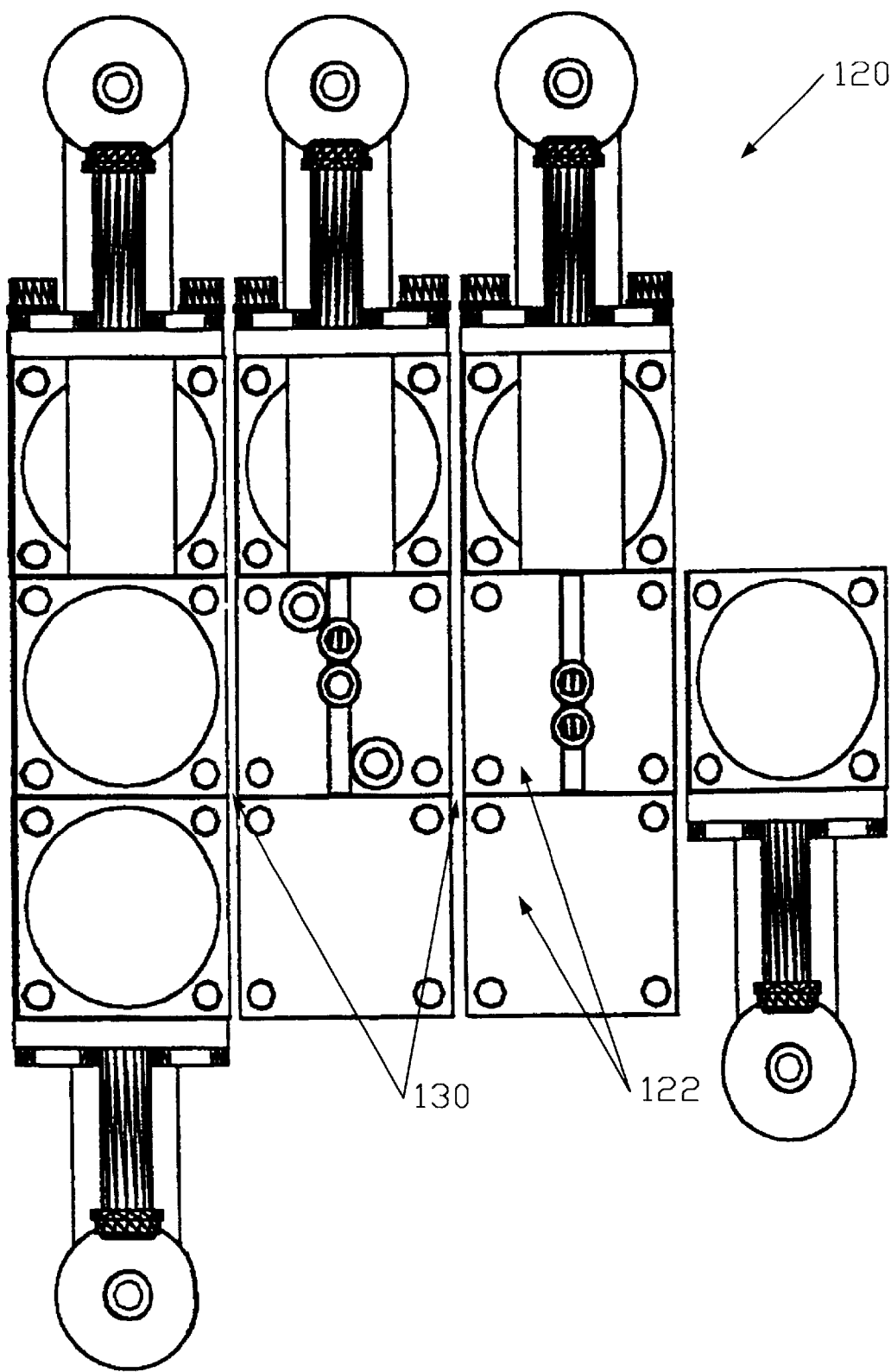
FIG. 3B is a top view of the substrate design shown in FIG. 3A.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Top-Accessible Modular Block

A top-accessible modular block configured to direct fluid flow therethrough is provided. The top-accessible modular block (may also be referred to as modular substrate or pod) preferably includes a top surface, a first axial interface flange and a first fluid flow path. The first axial interface flange preferably includes a first axial connection location configured to allow the modular block to be coupled to a laterally adjacent modular block. The axial connection location preferably includes an exterior surface and an interior surface. The interior surface of the axial connection location is preferably substantially parallel to the exterior surface of the axial connection location and unobstructed by other portions of the modular block so that the interior surface of the axial connection location is accessible from the top surface of the modular block. This configuration preferably allows the axial connection location to be accessed from directly above the top surface of modular block.

The first fluid flow path is preferably configured to transport fluid flow through the modular block. The first fluid flow path preferably includes a first axial bore hole defined in an exterior surface of the axial interface flange. The first fluid flow path is preferably arranged adjacent to and partially within the axial interface flange.

The axial connection location preferably includes an axial fastener receiving element configured to receive a local side-to-side fastener for coupling the modular block to a laterally adjacent modular block. The axial fastener receiving element preferably has an interior opening defined in the interior surface of the axial interface flange and an exterior opening defined in the exterior surface of the axial interface flange. The interior opening of the axial fastener receiving element is preferably unobstructed by other portions of the modular block so that the interior opening of the axial fastener receiving element is accessible from the top surface. The interior and exterior openings of the axial fastener receiving elements are preferably parallel.

The first axial interface flange may contain multiple axial fastener receiving elements. In an embodiment, the first axial interface flange includes a pair of first axial connection locations. The pair of first axial connection locations may be arranged on opposite sides of the first axial bore hole, and preferably are symmetrically arranged on opposite sides of the first axial borehole. The first axial connection locations preferably each extend from an exterior surface to an interior surface of the first axial interface flange.

In an embodiment, the top-accessible modular block may include multiple axial interface flanges. Preferably, the top-accessible modular block includes a first and second axial interface flange, each having an interior and an exterior surface. A second axial interface flange may have several features similar to those of a first axial interface flange. The first axial interface flange and the second axial interface flange may be lateral structures of the modular block to which laterally adjacent modular blocks may be coupled. The first and second axial interface flanges are preferably arranged in opposing directions. The first axial interface flange is preferably configured to be oriented in the direction from which fluid flow exits the modular block when the block is incorporated in a chemical delivery system. The second axial interface flange is preferably configured to be oriented in the direction in which fluid flow enters the modular block when the block is incorporated in a chemical delivery system.

The top-accessible modular block may include multiple fluid flow paths. Preferably, the modular block includes a first fluid flow path and a second fluid flow path. A second fluid flow path may be configured similarly to a first fluid flow path. The second fluid flow path is preferably configured to transport fluid flow through the modular block. The second axial interface flange is preferably arranged adjacent to and around a portion of the second fluid flow path. The first fluid flow path preferably includes a first axial bore hole defined in the exterior surface of the first axial interface flange and a first top bore hole defined in the top surface of the modular block. Similarly, the second fluid flow path preferably includes a second axial bore hole defined in the exterior surface of the second axial interface flange and a second top bore hole defined in the top surface of the modular block. Axial fluid path bore holes are preferably aligned in the center of their respective axial interface flanges or slightly off-center, but may be located elsewhere. The first and second fluid flow paths may or may not be configured to be in fluid communication within the modular block.

Each fluid flow path includes a bore and at least one bore hole. The fluid flow path bore is preferably smooth. A sealing interface is preferably arranged around each bore hole. Sealing interfaces are preferably configured as counterbore sealing cavities slightly recessed below the exterior surface in which the bore hole is defined. The sealing interfaces are preferably configured to mate with an appropriately sized seal gasket of a sealing member. The diameters of all sealing interfaces and bore holes of a top-accessible modular block are preferably equal.

It should be understood that a modular block may have more than two fluid flow paths (as can be seen from the Drawings). Likewise, a modular block can have more than one axial bore hole per interface flange, and more than two or three top bore holes (perhaps five or more). Preferably, however, a top-accessible modular block has one axial bore hole per axial interface flange, between one to three top bore holes, and, if the block is a top layer modular block, a bottom bore hole. Such a configuration preferably allows the modular block to accomplish its desired function without being unnecessarily large.

The first axial interface flange may include one or more first axial connection locations. Preferably, the first axial interface flange includes a pair of first axial connection locations symmetrically arranged on opposite sides of the first axial bore hole. The second axial interface flange may include one or more second axial connection locations. Preferably, the second axial interface flange includes a pair of second axial connection locations symmetrically arranged on opposite sides of the second axial bore hole. The first and second axial connection locations are preferably configured to allow the top layer modular block to be coupled to a laterally adjacent modular block. In a preferred embodiment, the first axial connection locations each include a first axial fastener receiving element configured to receive a local side-to-side fastener for coupling the modular block to a laterally adjacent modular block. Likewise, the second axial connection locations each preferably include second axial fastener receiving elements configured to receive a local side-to-side fastener for coupling the modular block to a laterally adjacent modular block.

In an embodiment, the axial fastener receiving elements may be configured as channels extending from an interior surface of an axial interface flange to an exterior surface. Each axial fastener receiving element may include an exterior opening defined in an exterior surface and an interior opening defined in an interior surface of the axial interface flange in which it is defined. The interior opening of at least one of the first axial fastener receiving elements may be unobstructed by other portions of the modular block so that the interior opening of at least one of the first axial fastener receiving elements is accessible from the top surface. Preferably, the interior opening of at least one of the second axial fastener receiving elements may be unobstructed by other portions of the modular block so that the interior opening of at least one of the second axial fastener receiving elements is accessible from the top surface. More preferably, the interior openings of all first and second axial fastener receiving elements are unobstructed by other portions of modular block so that the interior openings of all first and second axial fastener receiving elements are accessible from the top surface. Alternately, the interior openings of one or more of the first or second axial fastener receiving elements may be substantially obstructed by other portions of the modular block from the top surface.

The first axial interface flange is preferably configured such that local side-to-side fasteners may be inserted through the interior opening of first axial fastener receiving elements located in the first axial interface flange into the exterior opening of the second fastener receiving elements located in the second axial interface flange of a laterally adjacent modular block. Similarly, the second axial interface flange is preferably configured such that local side-to-side fasteners can be inserted through the interior openings of first axial fastener receiving elements of a laterally adjacent modular block into the exterior openings of second axial fastener receiving elements located in the second axial interface flange. To help accomplish this, the channels of the first and second axial fastener receiving elements may be polarized. In an embodiment, the channels of the second axial fastener receiving elements are threaded. In addition, the channels of the first axial fastener receiving elements are preferably substantially untextured. Consequently, a local side-to-side fastener may pass without significant resistance through a first axial fastener receiving element without significant resistance to be threadably inserted into a second axial fastener receiving element of a laterally adjacent modular block.

Distances between a lowermost portion of each of the axial fastener receiving elements and the top surface of the modular block are each preferably at most as great as (i.e., no more than) a distance between a lowermost portion of the first fluid flow path and the top surface of the modular block. That is, the lowermost portion of each of the axial fastener receiving elements is preferably not below the lowermost portion of the first fluid flow path. This feature may help prevent the modular block from being unnecessarily thick. More preferably, the distance between a lowermost portion of each of the axial fastener receiving elements and the top surface of the modular block is less than a distance between a lowermost portion of the first fluid flow path and the top surface of the modular block The exterior surfaces of the axial interface flanges are preferably devoid of protrusions. That is, while certain minor topographical disparities may exist, no portion of the exterior surface preferably substantially protrudes from the general exterior surfaces. Such a feature may aid in removing a modular block without compromising the seals of adjacent modular blocks, since being devoid of protrusions, the block may easily be moved upward once decoupled without disturbing the seals of seals of non-laterally adjacent coupled modular blocks or substantially moving the modular blocks from which it was decoupled. There may be, however, recesses or holes formed in the axial interface flange exterior surface, such as for an axial connection location or for an axial borehole, but is preferably nothing that would substantially restrict the upward movement of two laterally adjacent blocks.

The modular block further preferably includes a fluid flow path wall arranged around at least a horizontal section of the first fluid flow path and adjacent to the first and second axial interface flanges. Preferably, the width of the fluid flow path wall along the length of the fluid flow path wall is less than a center-to-center spacing between the first one and the second one of the plurality of axial fastener receiving elements. The fluid flow path wall may be considered to include the portion of the modular block between the axial interface flanges and around and laterally outward from the horizontal portion of the first fluid flow path. So if the width of the fluid flow path wall is, along its entire length, less than a center-to-center spacing between the first one and the second one of the plurality of axial fastener receiving elements, portions of the first and second axial interface flanges immediately laterally spaced from the outer boundaries of the upper fluid flow path walls may not be directly connected by another portion of the modular block. Consequently, a gap may exist between the first and second axial interface flanges such that a direct path may be taken through the outer boundaries of the modular block from a point above a top surface of the modular block to a point below a bottom surface of the modular block. Such a feature preferably ensures that sufficient room to access the axial fastener receiving elements exists. In addition, by reducing the quantity of material contained in the modular block, the modular block may be made lighter than conventional blocks.

Top-accessible blocks may be incorporated in a multilayer modular block assembly configured to direct fluid flow in multiple, horizontally transverse directions. The modular block assembly may include a plurality of vertically adjacent top-accessible modular blocks. Preferably, the modular block assembly includes a top layer modular block and a bottom layer modular block. Both the top layer modular block and the bottom layer modular block are preferably configured to direct fluid flow therethrough. When connected as parts of the multilayer modular block assembly, the top layer modular block is preferably configured to transport fluid flow in a first direction and the second layer modular block is preferably configured to transport fluid flow in a second direction horizontally transverse to the first direction.

In addition to having one or more of the features described above, a top-accessible top layer modular block is preferably configured to interface with a chemical control component mounted above its top surface. In an embodiment, the top layer modular block includes a plurality of component fastener receiving elements configured to receive fasteners for mounting a chemical control element above the top surface of the modular block. Preferably, the top layer modular block includes four component fastener receiving elements defined in the top surface of the top layer modular block. Each component fastener receiving element may be arranged near a respective corner of the modular block. The center-to-center spacing between the chemical control components preferably complies with an applicable SEMI standard regarding surface mount chemical control components. Preferably, the center-to-center spacing between laterally spaced component fastener receiving elements is less than about 1.2 in., and is more preferably about 1.188 in. Furthermore, the top fluid path bore holes of a top layer block are preferably configured to transport fluid between the top layer block and a chemical control component.

The top layer modular block is preferably configured to be mounted to a support structure (e.g. a mounting palette) without the use of a mounting bracket. In an embodiment, the top layer block preferably includes a plurality of mounting fastener receiving elements configured to receive a mounting fastener for mounting the modular block to a support structure without using a mounting bracket. Preferably, the top layer modular block includes an interface web configured between the first and second axial interface flanges, wherein the plurality of mounting fastener receiving elements are arranged within the interface web. Each of the plurality of mounting fastener receiving elements is preferably accessible from directly above the modular block. In a preferred embodiment, each of the plurality of mounting fastener receiving elements is arranged on a line with one of a plurality of first axial fastener receiving elements and one of a plurality of second axial fastener receiving elements.

The top layer modular block is preferably configured to be coupled to a vertically adjacent modular block. In an embodiment, the top layer modular block includes intermediate fastener receiving elements configured to receive top-to-bottom fasteners for coupling the top layer modular block to a vertically adjacent modular block. Preferably, the top layer modular block includes an interface web configured between the first and second axial interface flanges and below a top surface of the top layer modular block. The intermediate fastener receiving elements are preferably holes arranged in the interface web and configured to receive top-to-bottom fasteners. The intermediate fastener receiving elements are preferably accessible from directly above the top layer modular block. In an embodiment, a plurality of intermediate fastener receiving elements is arranged along a centerline of the modular block. Preferably, each of the plurality of intermediate fastener receiving elements is arranged on a line with two of the component fastener receiving elements. Such a configuration preferably helps to ensure that there is no mechanical interference between components.

In addition to having one or more of the features described above, a top-accessible lower layer modular block is preferably configured to be coupled to a vertically adjacent modular block. In an embodiment, the lower layer modular block includes intermediate fastener receiving elements configured to receive top-to-bottom fasteners for coupling the top layer modular block to a vertically adjacent modular block. Preferably, the lower layer modular block includes a fluid flow path wall arranged around a first fluid flow path. The intermediate fastener receiving elements preferably are holes defined in the fluid flow path wall directly above the first fluid flow path wall. The intermediate fastener receiving elements of a lower layer modular block are preferably accessible from directly above the top layer modular block.

As explained above, the dimensions of the top-accessible modular block and features of the modular blocks preferably comply with applicable SEMI standard. For example, the width, length, and thickness of the modular block preferably all comply with an applicable SEMI standard regarding the width, length, and depth of modular chemical delivery blocks. Preferably, a top-accessible modular block has a length of at most about two inches, a width of at most about two inches, and a thickness of less than about one inch. These dimensions may significantly reduce the amount of space occupied by a modular chemical delivery system incorporating such blocks. Furthermore, these and other dimensions of the modular block preferably avoid compromising the mechanical structure of the device under required loads/torque when the modular block is coupled to another modular block or component. Even at such relatively small dimensions, however, the top-accessible modular chemical delivery block may handle gas flows of up to, e.g., 50 SLM, and may further be able to handle flows of up to, e.g., 200 SLM.

A modular chemical delivery system incorporating top-accessible modular blocks is also provided. The system preferably includes a plurality of top-accessible modular blocks each configured to direct fluid flow therethrough. Each of the plurality of top-accessible modular blocks may include one or more features of the top-accessible modular blocks described above.

In an embodiment, each of the plurality of modular blocks preferably includes a first axial interface flange comprising a first axial connection location configured to allow the modular block to be coupled to a laterally adjacent modular block. The first axial connection location preferably includes an interior surface and an exterior surface. The interior surface of the first axial connection location is preferably unobstructed by any other portion of the modular block from the top surface. Each of the plurality of modular blocks also preferably includes a second axial interface flange that includes a second axial connection location configured to allow the modular block to be coupled to a laterally adjacent modular block.

Adjacent modular blocks of the modular chemical delivery system may be coupled, and components may be coupled to modular block of the modular chemical delivery system, using fasteners. Fasteners may include any of the variety of elements capable of coupling laterally and/or vertically adjacent modular blocks and may include screws and bolts and/or nuts. The fasteners are preferably threaded. The threading may be any of a variety of types, including UNF and metric. In addition, a washer may be positioned on the shaft of a fastener; the washer is preferably a lock washer. When a fastener upon which the lock washer is arranged is fully inserted into a fastener receiving element of the modular block, the lock washer is preferably interposed between a head of the fastener and a surface of the modular block. The use of such fasteners preferably avoids the need to make connections in the system using welded fittings.

In an embodiment, the system further includes a plurality of local side-to-side fasteners. Each fastener of the plurality of local side-to-side fasteners preferably couple ones of the plurality of modular blocks to other, laterally adjacent ones of the plurality of modular blocks. Preferably, each of the plurality of local side-to-side fasteners includes a head and a shaft. The shaft of each of the plurality of local side-to-side fasteners is preferably adjacent the second axial interface flange of one of the plurality of modular blocks and does not extend beyond a centerline of a respective one of the plurality of modular blocks perpendicular to the respective shaft of each of the plurality of local side-to-side fasteners.

The features of each of the plurality of modular blocks preferably allows for easy reconfiguration of the blocks within the system. In an embodiment, each of the plurality of modular blocks are configured to allow for removal of the local side-to-side fasteners via access from directly above each of the plurality of modular blocks. Preferably, each of the plurality of modular blocks is configured such that decoupling one of the plurality of laterally adjacent blocks from a laterally adjacent block does not compromise the integrity of sealing joints existing between any other ones of the plurality of modular blocks. In addition, the system may further include a mounting (support) structure. The plurality of modular blocks is preferably configured to be mounted to the mounting structure without the use of a mounting bracket.

In an embodiment, the system includes a semiconductor processing chamber. The chamber can be any of the variety of the specialized chambers used in semiconductor processing, including, but not limited to, etch chambers and deposition chambers. Preferably, the system is configured to transport fluid flow from the plurality of modular blocks to the semiconductor processing chamber for use in semiconductor processing. By using suitably configured assemblies of top layer and lower layer modular blocks, the system can be configured to transport fluid flow in multiple, horizontally transverse directions.

As stated above, each of the plurality of modular blocks may be coupled to another, laterally adjacent one of the plurality of modular blocks, preferably by local side-to-side fasteners. Fluid flow paths of coupled ones of the plurality of modular blocks are preferably sealably connected by sealing joints formed therebetween. Each of the plurality of modular blocks preferably includes an axial fluid flow path bore hole defined in a lateral surface of the modular block (preferably an axial interface flange) and a sealing interface arranged around the axial fluid flow path bore hole. Sealing interfaces are preferably configured as described above. The system further a plurality of sealing members (e.g., seals) arranged between and in contact with coupled ones of the plurality of modular blocks. The sealing members may be "C" seals. Each of the sealing elements preferably includes a sealing gasket configured to interface with the sealing interfaces of the plurality of modular blocks. Coupled ones of the plurality of modular blocks are preferably each directly in contact with a respective side of one of the plurality of sealing members such that a sealing joint is formed.

A modular chemical delivery system may further include a plurality of modular block assemblies, each configured to transport fluid flow in multiple, horizontally transverse directions. In an embodiment, the modular chemical delivery system includes a plurality of top layer blocks and a plurality of lower layer blocks. The system further includes a plurality of top-to-bottom fasteners. Preferably, ones of the plurality of top layer modular blocks are coupled to vertically adjacent ones of the plurality of lower layer blocks by ones of the plurality of top-to-bottom fasteners. Top-to-bottom fasteners preferably couple ones of the plurality of top layer blocks and the plurality of lower layer blocks through intermediate fastener receiving elements in each top layer and lower layer modular block. Each of the plurality of top layer modular block is preferably configured to allow removal of ones of the plurality of top-to-bottom fasteners via access from directly above each of the plurality of top layer modular blocks. In a preferred embodiment, a first top layer block of the plurality of top layer blocks is vertically adjacent to a first lower layer block of the plurality of lower layer modular blocks. The first top layer block is configured to transport fluid flow in a first direction parallel to the top surface, and the first lower layer block is configured to transport fluid flow in a second direction horizontally transverse to the first direction. Preferably, the first lower layer block is configured to transport fluid flow to the top layer modular block.

The modular chemical delivery system preferably includes a plurality of chemical control elements. As explained above, top layer modular blocks are preferably configured to interface with chemical control elements. The chemical control component can be any of the variety used in chemical delivery systems; suitable chemical control components include valves, pressure regulators, pressure transducers, filters, purifiers, and MFCs. Each chemical control component is preferably mounted upon the top surface of a top layer modular block using chemical control component fasteners. The chemical control component fasteners may be threadably inserted into component fastener receiving elements to securely mount the chemical control components. The modular chemical delivery system may be part of a gas panel.

Figure 4A:
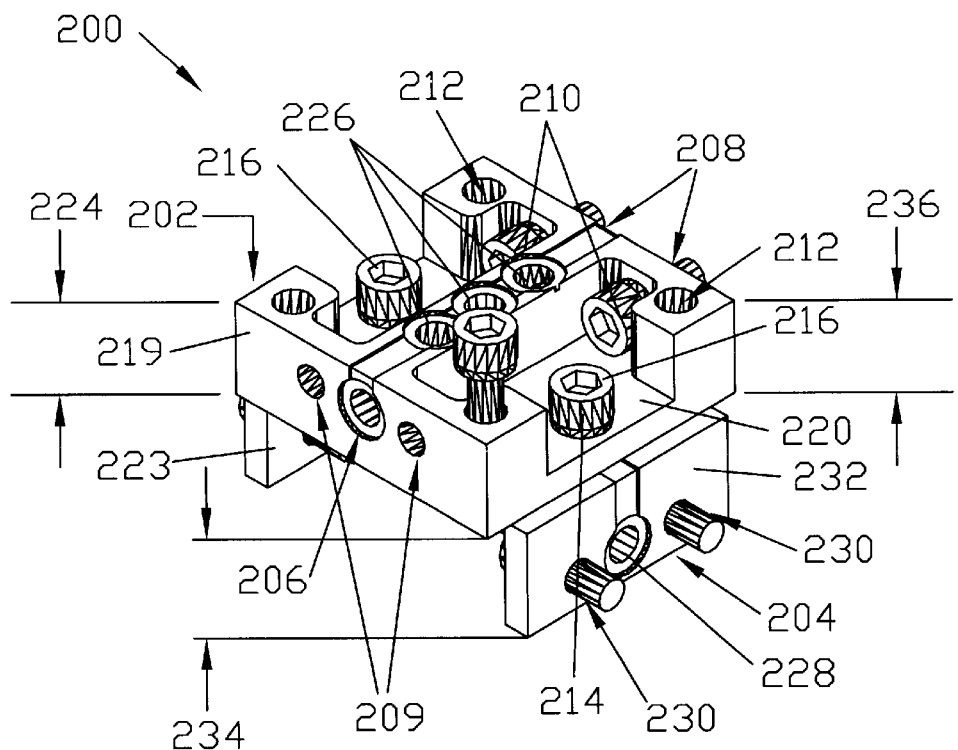
FIG. 4A is a perspective view of a modular block assembly with both directional and transverse directional flow regimes in accordance with an embodiment.
Figure 4B:
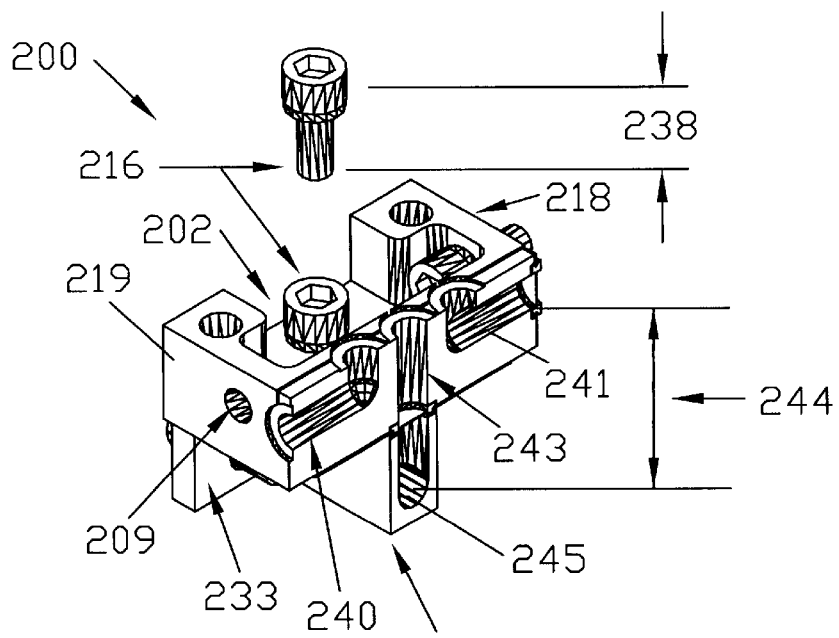
FIG. 4B is a cutaway cross-sectional view of the modular block assembly of FIG. 4A.

Exemplary embodiments of a top-accessible modular block, a top-accessible multilayer modular block assembly, and a modular chemical delivery system having one or more of the above-described features are shown in the Drawings. FIGS. 4A and 4B present perspective and cross-sectional views, respectively, of a multilayer modular block assembly 200 in accordance with an embodiment. Modular block assembly 200 is preferably configured to direct fluid flow in multiple, horizontally transverse directions. Modular block assembly 200 preferably includes top layer modular block 202 and bottom layer modular block 204 (may also be referred to as a secondary layer to provide transverse flow).

Top layer modular block 202 preferably includes a first axial interface flange 218 and a second axial interface flange 219. Interface web 220 may be arranged between first axial interface flange 218 and second axial interface flange 219. As shown, interface web 220 is preferably below a top surface of top layer modular block 202. First axial interface flange 218 preferably includes a pair of first axial connection locations 208. First axial connection locations 208 are preferably symmetrically arranged on opposite sides of an axial bore hole. Second axial interface flange 219 preferably includes second axial connection locations 209. Preferably, second axial interface flange 219 includes a pair of second axial connection locations 209 symmetrically arranged on opposite sides of an axial bore hole.

First and second axial connection locations 208 and 209 are preferably configured to allow top layer modular block 202 to be coupled to a laterally adjacent modular block. The interior surfaces of axial connection locations 208 and 209 are preferably substantially parallel to the respective exterior surfaces of the axial connection locations. In a preferred embodiment, first axial connection locations 208 each include a first axial fastener receiving element configured to receive a local side-to-side fastener for coupling top layer modular block 202 to a laterally adjacent modular block. Likewise, second axial connection locations 209 each preferably include a second axial fastener receiving element configured to receive a local side-to-side fastener for coupling top layer modular block 202 to a laterally adjacent modular block. Exemplary local side-to-side fasteners 210 are shown in FIGS. 4A and 4B.

In an embodiment, the axial fastener receiving elements may be channels extending from an interior surface of an axial interface flange to an exterior surface. Each axial fastener receiving element may include an exterior opening defined in an exterior surface and an interior opening defined in an interior surface. The interior opening of at least one of the first axial fastener receiving elements may be unobstructed by other portions of top layer modular block 202 so that the interior opening of the at least one of the first axial fastener receiving elements is accessible from the top surface. The interior and exterior openings of each axial fastener receiving element are preferably substantially parallel. First axial interface flange 218 is preferably configured such that local side-to-side fasteners can be inserted through the interior opening of the first axial fastener receiving elements of modular block 202 into the exterior opening of the second fastener receiving elements of a laterally adjacent modular block. In an embodiment, the channels of the first axial fastener receiving elements defined in second interface flange 219 are substantially untextured. Second axial interface flange 219 is preferably configured such that local side-to-side fasteners can be inserted through the interior openings of first axial fastener receiving elements of a laterally adjacent modular block into the exterior openings of second axial fastener receiving elements of modular block 202. In an embodiment, the channels of the second axial fastener receiving elements defined in second interface flange 219 are threaded.

Top layer modular block 202 includes at least one fluid flow path for transporting fluid flow therethrough. Top layer modular block 202 may include fluid flow paths 240, 241, and 243. Fluid flow paths 240 and 241 each have an axial fluid path bore hole 206 defined in a lateral (exterior) surface of modular block 202 and a top fluid path bore hole 226 defined in a top surface of modular block 202. Top layer modular block 202 is preferably configured such that fluid flow from, e.g., a laterally adjacent modular block enters the modular block at second axial interface flange 219 and exits the modular block to, e.g., a laterally adjacent modular block at first axial interface flange 218. Fluid flow path 243 has a top fluid path bore hole 226 in a top surface of modular block 202 and a bottom fluid path bore hole in a bottom surface of modular block 202. Top layer modular block 202 is preferably configured such that fluid flow from, e.g., lower layer modular block 204 enters through the bottom fluid flow path bore hole and exits through the top fluid flow path bore hole 226 of fluid flow path 243.

Top layer modular block 202 is preferably configured to interface with a chemical control component mounted above its top surface. Preferably, top layer modular block 202 contains four component fastener receiving elements 212 (may also be referred to a fastener locations for mounting surface components). Each component fastener receiving element is preferably configured to receive fasteners for mounting a chemical control component above, and preferably upon the top surface of modular block 202. Preferably, component fastener receiving elements 212 are configured to receive control component fasteners 214.

Lower layer modular block 204 preferably includes a first axial interface flange 232 and a second axial interface flange 233. First axial interface flange 232 preferably includes a pair of first axial connection locations 230. First axial connection locations 230 may be configured in a manner similar to first axial connection locations 208. Second axial interface flange 233 preferably includes second axial connection locations (not visible). The second axial connection locations of second axial interface flange 233 may be configured in a manner similar to second axial connection locations 209. In a preferred embodiment, first axial connection locations 230 each include a first axial fastener receiving element configured to receive a local side-to-side fastener (e.g., local side-to-side fasteners 230) for coupling lower layer modular block 204 to a laterally adjacent modular block.

Lower layer modular block 204 includes at least one fluid flow path for transporting fluid flow therethrough. Lower layer modular block 204 may include fluid flow path 245. Fluid flow path 245 has a top fluid path bore hole 226 in a top surface of modular block 204 and an axial fluid path bore hole 228 (may also be referred to as a lower axial seal locations) in the exterior surface of first axial interface flange 232. Lower layer modular block 204 is preferably configured to transport fluid flow to, e.g., top layer modular block 204 through the top fluid flow path bore hole of fluid flow path 245.

Top layer modular block 202 may be coupled to lower layer modular block 204 using top-to-bottom fasteners 216. Top-to-bottom fasteners 216 (may also be referred to as intermediate fastener hardware or multiple layer fastener hardware) are preferably arranged within intermediate fastener receiving elements of top layer modular block 202 and intermediate fastener receiving elements of lower layer modular block 204. Preferably, top-to-bottom fasteners 216 are threadably engaged with the intermediate fastener receiving elements in lower layer modular block 204.

The thicknesses of each block within modular block assembly 200 should sufficiently thick to provide proper clearance for the chemical control component fasteners 214 when inserted in component fastener receiving elements 212 and to provide sufficient room for its axial bore holes to be properly sealed when coupled to an modular block laterally adjacent to a respective axial bore hole. The depth 238 of component fastener receiving elements 212 may be 0.3 in. to 0.33 in. Both top layer modular block 202 and bottom layer modular block 204 preferably have depths 224 and 234, respectively, that are sufficiently thick to provide proper clearance for the chemical control component fasteners 214 and the component fastener receiving elements 212 into which the fasteners will be inserted. Depths 224 and 234 also preferably comply with an applicable SEMI standard, preferably SEMI 2787.1.

And as stated above, modular block assembly 200 preferably provides axial connection locations on both top layer modular block 202 and lower layer modular block 204 to allow the blocks to be coupled to other blocks in a modular chemical delivery system. Depths 224 and 234 are also sufficiently thick to provide space for the axial connection locations. Likewise, top layer and bottom layer modular blocks 202 and 204 are preferably sufficiently thick to provide the surface area for the axial connection locations without violating industry compliance standards for minimal wall thickness of the flow paths listed in an applicable ASTM (American Society For Testing and Materials, West Conshohocken, Pa.) specification (e.g., A-269, A-270, and A-632 (0.035 in. wall thickness)).

Consequently, thickness 224 of top layer modular block 202 is preferably at least about 0.5 in., and thickness 234 of lower layer modular block 204 is at least about 0.55 in. As explained above, it is generally desirable to limit the height of a modular chemical delivery system. Preferably, thickness 224 of top layer modular block 202 is at most about, and thickness 234 of lower layer modular block 204 is at most about 1 in. The combined thickness of modular block assembly 236 (may also be referred to as stacking height) is preferably at least about 1.05 and at most about 2 in.

Limiting the thickness of top layer modular block 202 and lower layer modular block 204 may have additional benefits. The length of vertical fluid flow path 244 is in large part determined by the thicknesses of top layer modular block 202 and lower layer modular block 204. In general, the longer the length of vertical flow path 244 is, the longer the dry down time when an inert gas carrier is used to dry out the moisture content of the chemical system will be. Consequently, it may be beneficial to keep the thicknesses of top layer modular block 202 and lower layer modular block 204 below, e.g., 1 in.

Figure 5A:
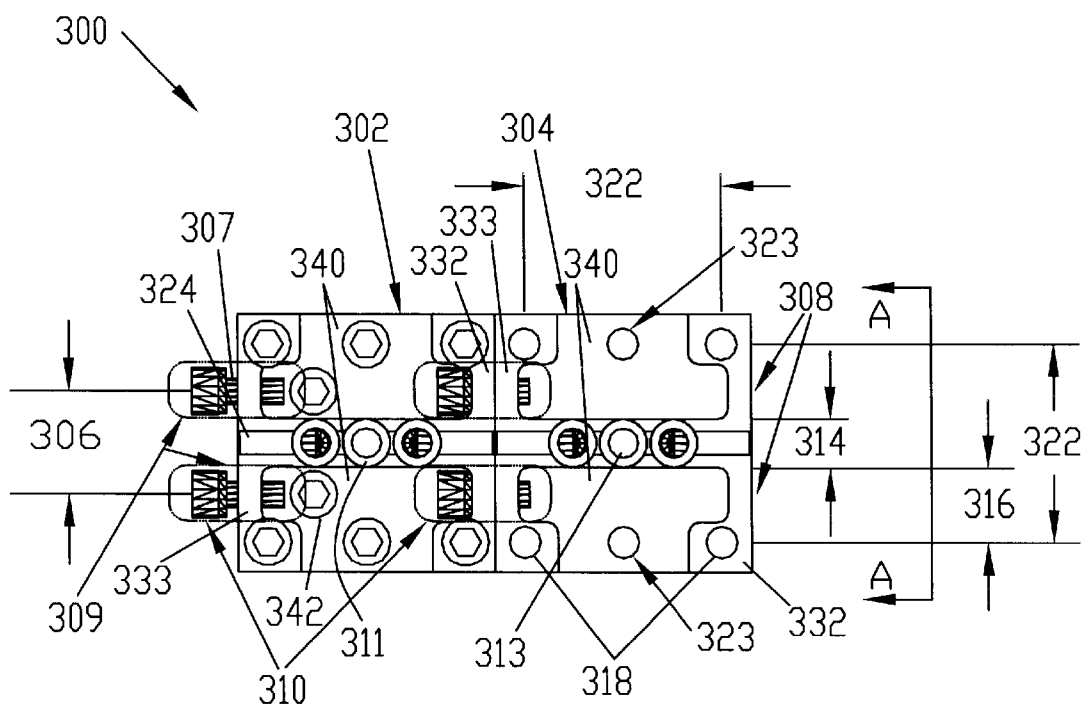
FIG. 5A is a top view of a modular block assembly in which a top layer modular block is coupled to a laterally adjacent top layer block in accordance with an embodiment.
Figure 5B:
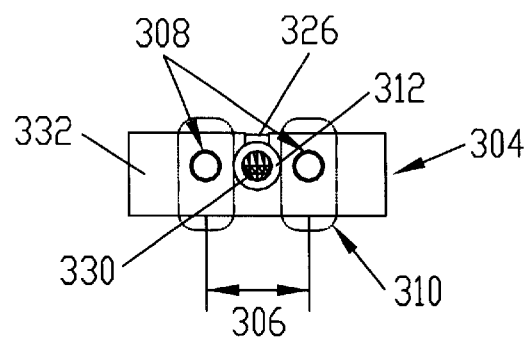
FIG. 5B is side view of the modular block assembly of FIG. 5A taken along line A—A.

FIG. 5A presents a top view of modular block assembly 300, and FIG. 5B presents a side view of the modular block assembly shown in FIG. 5A taken along line A—A. Modular block assembly 300 includes top layer modular block 302, which is coupled to a laterally adjacent modular block 304. Except where otherwise indicated, top layer modular blocks 302 and 304 may be configured similarly to top layer modular block 202.

Both modular blocks 302 and 304 include a first axial interface flange 332 and a second axial interface flange 333. Each first axial interface flange 332 preferably includes a pair of first axial connection locations 308. Top fluid flow path bore holes 313 are defined in the top surfaces of modular blocks 302 and 304. Top sealing interfaces 311 are preferably arranged around each top fluid flow path bore hole 313. Top sealing interfaces 311 are preferably counter bore sealing cavities. Axial fluid flow path bore holes are defined in the exterior surfaces of axial interfaces 332 and 333. An axial sealing interfaces 312 is preferably arranged around each axial fluid flow path bore hole. Axial sealing interfaces 312 are preferably configured similarly to top sealing interfaces 311. Interface webs 340 preferably extend between the first and second axial interface flange of each modular block. Intermediate fastener receiving elements 323 are preferably arranged in interface webs 340. Mounting fasteners 342 may be positioned within in mounting fastener receiving elements arranged in interface webs 240. Top seal cavity ribs 324 are preferably arranged along the top surface of modular blocks 302 and 304. For both modular blocks 302 and 304, top seal cavity ribs 324 are preferably contiguous with leak test ports 326 of modular blocks 302 and 304.

The dimensions of the various connection locations, bore holes and like elements for modular blocks 302 and 304 are preferably configured such that there is minimal, and preferably no, mechanical interference therebetween. This goal is preferably achieved while maintaining top accessibility of the modular blocks. To this end, the diameter of top sealing interfaces 311 of top bore holes is preferably about 0.290 in. Likewise, the diameter 314 of axial sealing interfaces 312 is also preferably about 0.290 in.

Given the preferred dimensions described above, the areas in which fasteners can be placed will be limited if mechanical interference is to be avoided. For example, local side-to-side fasteners 307 are preferably restricted to area 310; that is, when installed the fasteners preferably do not extend beyond this area. The center-to-center spacing 306 of first axial receiving elements 308 and second axial receiving elements 309 (may also be referred to as top surface axial connections) may be one that ensures that the local side-to-side fasteners, when inserted, do not interfere with other features of each modular block, such as the axial bore holes. Preferably, the center-to-center spacing 306 is 0.620 in. Such a spacing may aid in preventing mechanical interference between components of the modular blocks. The distance 316 between an intermediate fastener receiving element 323 and a sealing interface 312 of an axial bore hole 330 may be one that avoids causing mechanical interference and/or the violating structural integrity of a modular block by requiring the milling to areas very near the mounting fastener receiving elements; preferably, distance 316 is maximally 0.33 in. The center-to-center spacing 322 of component fastener receiving elements 318 (may also be referred to as top component mounting hole locations) is preferably less than about 1.2 in., and more preferably is 1.188 in.

Figure 6:
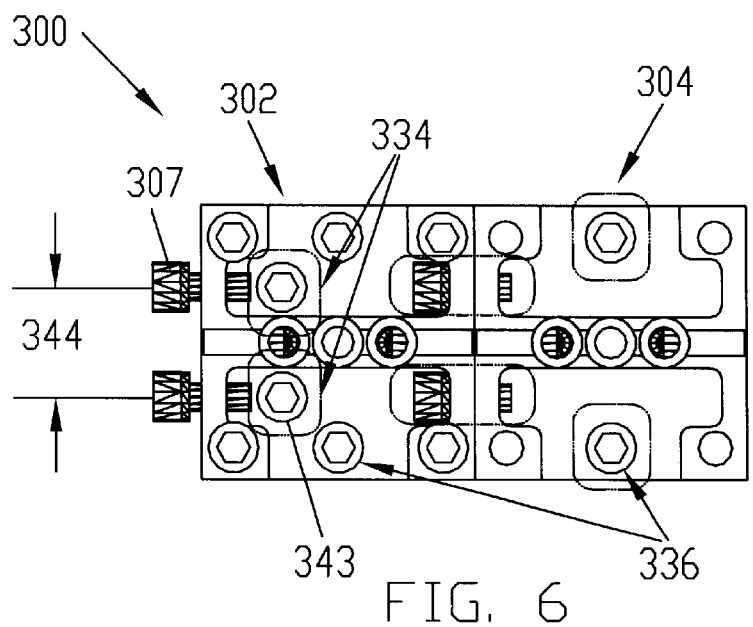
FIG. 6 is a top view of the modular block assembly of FIG. 5A after mounting a second one of the top layer blocks to an underlying lower layer block.

FIG. 6 is a top view of the modular block assembly shown in FIG. 5A after mounting one of the top layer blocks to an underlying lower layer block. As shown in FIG. 6, modular block 302 may be coupled to an underlying lower layer block (not shown) by top-to-bottom fasteners 336 (may also be referred to as intermediate mounting fasteners). Mounting fastener receiving elements 343 (may also be referred to as amounting holes) are shown arranged in mounting fastener receiving elements (not visible). For the reasons of preventing mechanical interference discussed above, the mounting fastener receiving elements are preferably restricted to areas 334 (delineated by the dotted lines around mounting fastener receiving elements 343). Restricting the mounting fastener receiving elements to this location will preferably avoid interference with components such as local side-to-side fasteners 307.

Figure 7A:
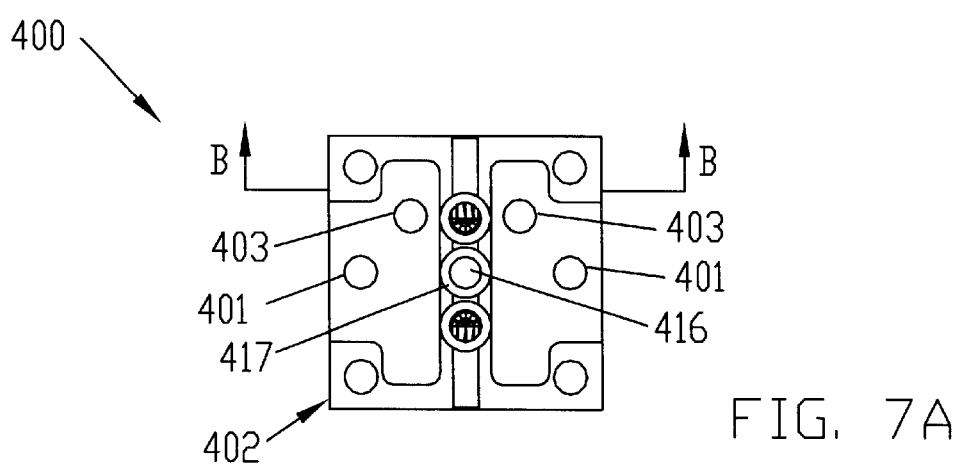
FIG. 7A is a top view of a modular block similar to those blocks shown in FIG. 6.
Figure 7B:
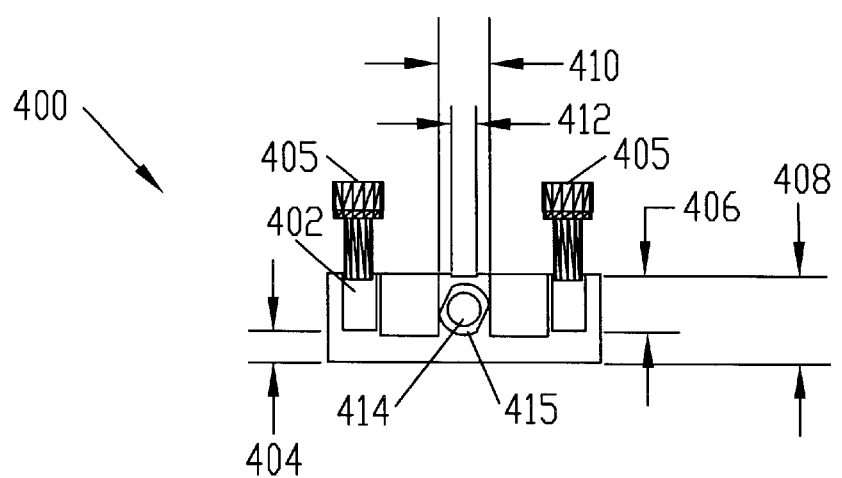
FIG. 7B is a cross-sectional view of one of the modular blocks shown in FIG. 7A taken along line B—B.

FIG. 7A presents a top view of a modular block similar to those modular blocks shown in FIG. 6, and FIG. 7B presents a side view along line C—C of the modular block shown in FIG. 7A. Modular block 400 is preferably a top layer block configured to interface with a chemical control component. Consequently, modular block 400 preferably has four component fastener receiving elements 402 (may also be referred to as top surface mount chemical delivery component fasteners). Component fastener receiving elements 402 are preferably configured to receive chemical control component fasteners 405. Chemical control component fasteners 405 may be four-inch threaded fasteners. The tap depth 406 of each component fastener receiving element (may also be referred to as top surface threaded tap depth) is preferably sufficient to prevent over-travel of the top surface of fasteners 405 when inserted. Preferably, tap depth 406 is 0.200–0.330 in. (5.08 mm–7.62 mm) to provide a safe clearance margin for chemical control component fasteners 405.

Modular block 402 also preferably includes mounting fastener receiving elements 403 and intermediate fastener receiving elements 401. Top bore holes 416 are defined in the top surface of modular block 400. Top sealing interfaces 417 are preferably arranged around top bore holes 412. Axial bore hole 414 is defined in an exterior surface of modular block 400. Axial sealing interface 415 is preferably arranged around axial bore hole 414. Both axial sealing interface 415 and top sealing interfaces 417 are preferably configured as counterbore sealing cavities. The bore diameter 412 for both axial bore hole 414 and top bore holes 416 is preferably about 0.180 in. The sealing interface diameter 410 (may also be referred to as sealing counterbore diameter) for both axial sealing interface 415 and top sealing interfaces 417 is preferably about 0.290 in. Modular block 400 includes a fastening interface flange 404 (may also be referred to as a mechanical interface flange) that is preferably about 0.150 in. thick. Top layer modular block 400 has a depth 408 of preferably about 0.500 in.

Figure 8:
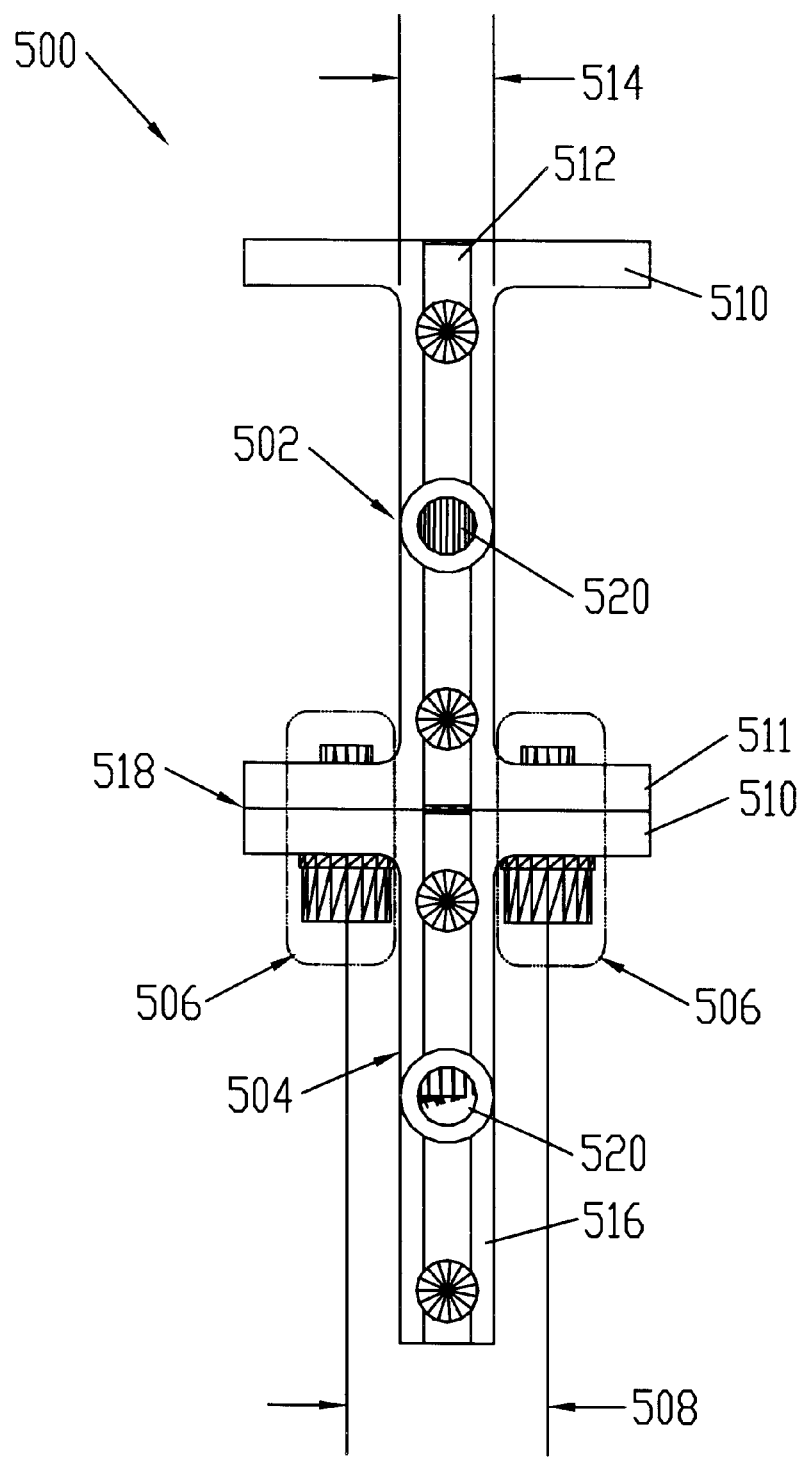
FIG. 8 is a top view of a lower layer modular block assembly in accordance with an embodiment.

FIG. 8 is a top view of lower layer modular block assembly 500. Modular block assembly 500 includes lower layer modular blocks 502 and 504. Modular block 502 preferably has a first axial interface flange 510 and a second axial interface flange 51 1. Modular block 504 preferably has a first axial interface flange. Modular block 504 prefer- ably has a first axial bore hole (not visible) in its first axial interface, but since modular block 504 is not configured to be coupled to a laterally adjacent modular block opposite modular block 502, modular block 504 preferably does not have additional axial bore holes. A seal joint 518 is preferably formed between modular blocks 502 and 504. Top bore holes 520 are preferably defined in the top surfaces of modular blocks 502 and 504. Fluid flow path wall 516 is arranged around the fluid flow path bores of modular block 504. Lower seal cavity rib 512 extends along the top surfaces of modular blocks 502 and 504.

As described above, modular blocks such as modular blocks 502 and 504 may be sized such that mechanical interference between components is avoided. When installed for coupling modular block 502 to modular block 504, local side-to-side fasteners (also known as bottom axial fasteners) preferably do not extend beyond the delineated by area 506. Additionally, the center-to-center spacing 508 of the first axial connection locations of modular block 504 and the first and second axial connection locations of modular block 502 is may be a distance that avoids interfering with the other features of the modular blocks, such as sealing interface diameters of a respective axial bore holes. Preferably, the center-to-center spacing 508 is about 0.620 in. Sealing interface diameter 514 is preferably about 0.290 in.

Figure 9A:
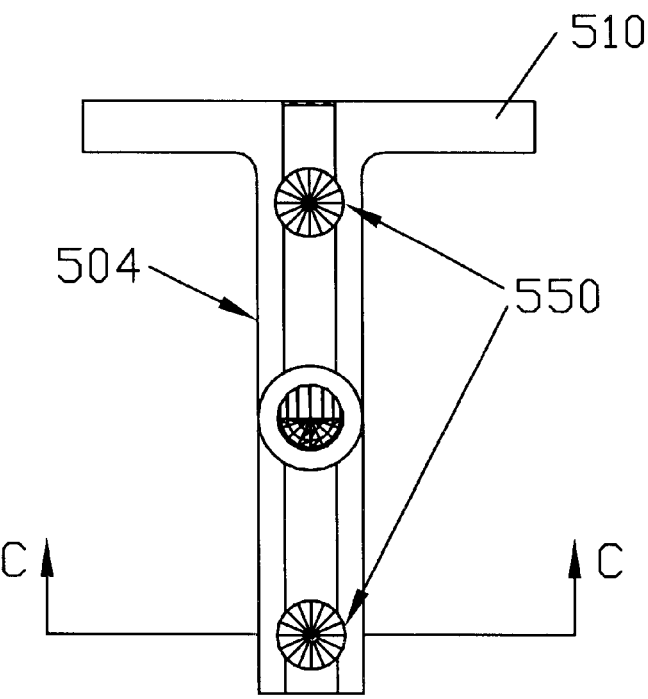
FIG. 9A is a top view of one of the lower layer modular blocks shown in FIG. 8.
Figure 9B:
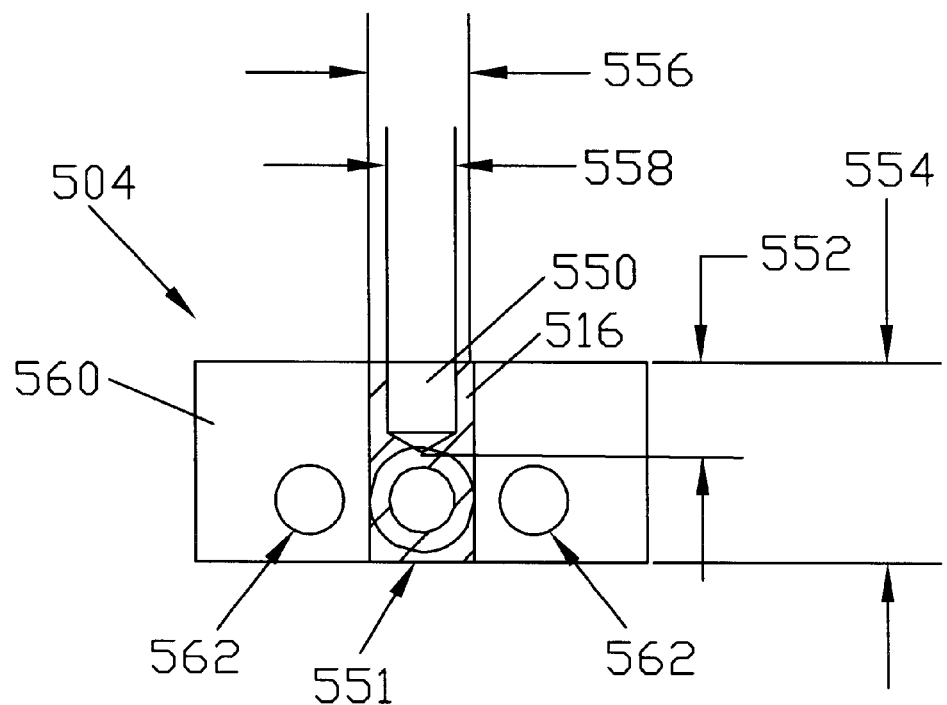
FIG. 9B is a cross sectional view of the lower layer modular block shown in FIG. 9A taken along line C—C.

FIG. 9A is a top view of one of the lower layer blocks shown in FIG. 8, and FIG. 9B is a cross-sectional view along line C—C of the lower layer block shown in FIG. 9A. Lower layer modular block 504 has a first axial interface flange 510. First axial interface flange 510 preferably has a pair of first axial connection locations 562, each having an first axial fastener receiving element. Each first axial fastener receiving element is preferably a substantially untextured channel. Lower layer modular block 504 further includes intermediate fastener receiving elements 550.

Intermediate fastener receiving elements 550 (may also be referred to as threaded taps) are preferably configured to receive a top-to-bottom fastener for coupling lower layer modular block 504 to a vertically adjacent top layer modular block. Intermediate fastener receiving elements 550 preferably are arranged within fluid flow path wall 516 above fluid flow path bore 551. Preferably, intermediate fastener receiving elements 550 provide a safe clearance margin 552 sufficient deep to prevent over-travel of the top surface of the top-to-bottom fasteners when inserted. Preferably, safe clearance margin 552 is about 0.250 in. The bottom of intermediate fastener receiving element 550 is preferably adjacent the top of fluid flow path bore 551.

To prevent mechanical interference between any of its components lower layer modular block 504 preferably has a thickness 554 of at least about 0.550 in., and preferably less than about 1 in. Additionally, fluid flow path bore 551 preferably has a wall thickness of about 0.035 in.+/–0.005 in. Sealing interface diameter 556 is preferably about 0.290 in. Bore diameter 558 is preferably about 0.180 in. Beneficially, all of these dimensions may be achieved without violating the wall thickness of fluid path bore 551.

Figure 10A:
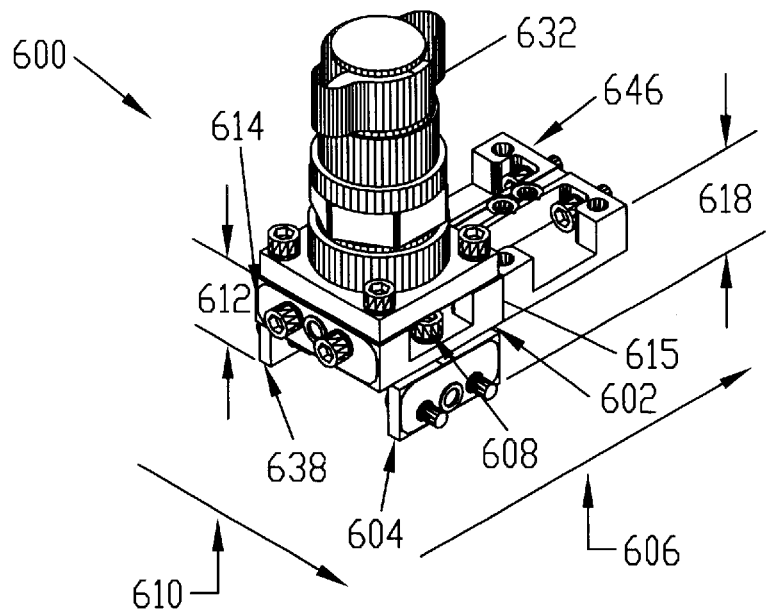
FIG. 10A is a perspective view of a multi-layer modular block assembly in accordance with an embodiment.
Figure 10B:
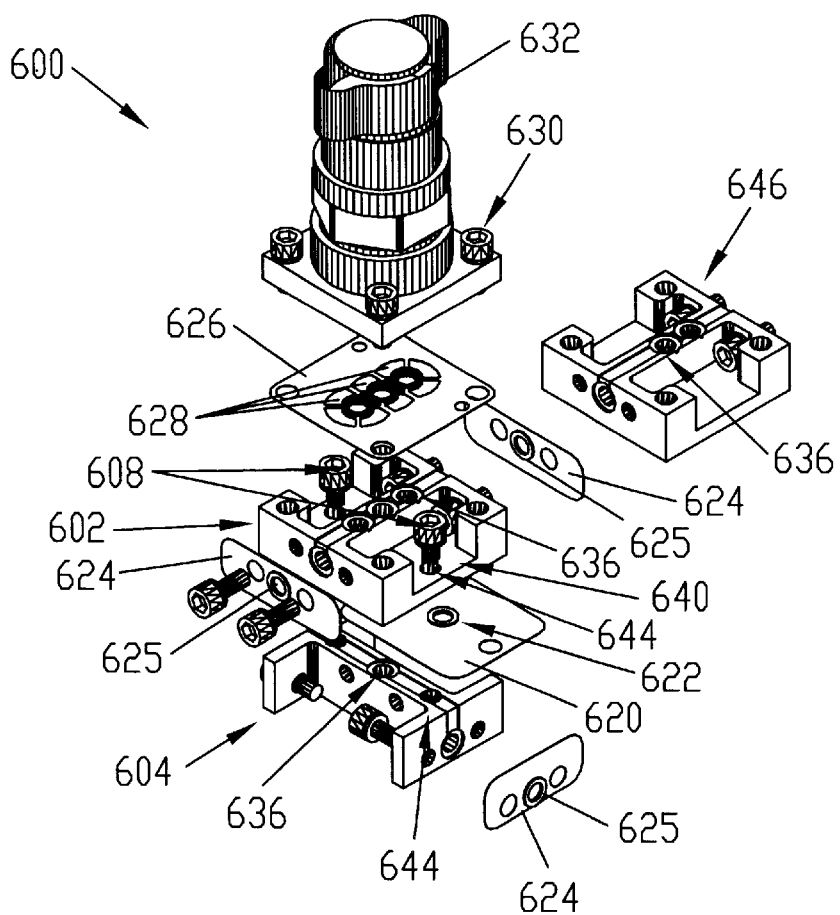
FIG. 10B is an exploded view of the modular block assembly shown in FIG. 10A.

FIG. 10A is a perspective view of a multilayer modular block assembly in accordance with an embodiment, and FIG. 10B is an exploded view of modular block assembly shown in FIG. 10A. Multilayer modular block assembly 600 is configured to direct fluid flow in multiple, horizontally transverse directions. The modular block assembly may include a plurality of vertically adjacent top-accessible modular blocks. Preferably, modular block assembly 600 includes top layer modular block 602 and bottom layer modular block 604, both configured to direct fluid flow therethrough. When connected as within modular block assembly 600, top layer modular block 602 is preferably configured to transport fluid flow in a first direction and lower layer modular block 604 is preferably configured to transport fluid flow in a second direction horizontally transverse to the first direction. Preferably, top layer block 602 is configured to transport fluid flow along directional flow line 606, and lower layer block 604 is configured to transport fluid flow along transverse directional flow line 610.

Top layer modular block 602 is preferably configured to interface with chemical control component 632 mounted above the top surface of top layer block 602. Chemical control component 632 is preferably mounted above the top surface of top layer block 602 using chemical control component fasteners 630 threadably inserted into a plurality of component fastener receiving elements (may also be referred to as chemical delivery mounting hole locations) defined in the top surface of modular block 602. Top layer modular block includes top fluid path bore holes preferably configured to transport fluid between top layer modular block 602 and chemical control component 632 (may also be referred to chemical delivery surface mount controls).

Top layer modular block preferably includes intermediate fastener receiving elements configured to receive top-to-bottom fasteners 608 for coupling the top layer modular block to lower layer block 604. Top-to-bottom fasteners are preferably inserted through intermediate fastener receiving elements 644 in top layer modular block 602 and into intermediate fastener receiving elements 644 in lower layer block 604 to fasten top layer block 602 to lower layer modular block 604. Top layer modular block 602 preferably includes an interface web 640 configured between first and second axial interface flanges and below a top surface. Preferably, intermediate fastener receiving elements 644 of top layer modular block 602 are preferably holes arranged in the interface web 640 and configured to receive top-to-bottom fasteners 608.

Modular block assembly 600 further includes single direction flow block 646. Single direction flow block 646 may be configured similarly to a top layer modular block such as top layer modular block 602. Single direction flow block 646, however, is preferably not configured to be coupled with a vertically adjacent modular block, and thus preferably does not have intermediate fastener receiving elements or a bottom fluid flow path borehole.

Fluid flow paths of coupled modular blocks of modular block assembly 600 are preferably sealably connected by sealing joints 615 formed therebetween. Each modular block of modular block assembly 600 preferably includes a pair of axial fluid flow path bore holes defined in exterior surfaces of respective axial interface flanges of each modular block. A axial sealing interface is preferably arranged around each axial fluid flow path bore hole. Each modular block also preferably includes at least one top fluid flow path bore hole 636 (gas seal porting locations) defined in the respective top surface of each block. Top sealing interfaces are preferably arranged around the top fluid flow path bore holes. Axial and top sealing interfaces are preferably configured as counterbore sealing cavities.

Sealing members (e.g., seals) may be arranged between and in contact with coupled ones of the plurality of modular blocks to sealably connect the adjacent fluid flow paths of each modular block. Each sealing element preferably includes a sealing gasket configured to interface with the sealing interfaces of the fluid plow paths it is configured to sealably connect. Intermediate seal 620 is preferably configured to sealably connect fluid flow paths of top layer modular block 602 and lower layer modular block 604. Intermediate seal gasket 622 is preferably configured to interface with the top sealing interface of lower layer modular block 604 and a bottom sealing interface (not visible) of top layer modular block 602. Axial seals 624 are preferably configured to sealably connect fluid flow paths laterally adjacent modular blocks, such as top layer modular block 602 and single direction flow block 646. Axial seal gaskets 625 are preferably configured to interface with the axial sealing interfaces of the blocks whose fluid flow paths it seals. A sealing joint 615 is preferably formed between top layer modular block 602 and single flow direction modular block 646 when the two blocks are coupled together. Component interface seal 626 is preferably configured to sealably connect the fluid flow paths of top layer modular block 602 to those of chemical control component 632. Component interface seal gaskets 628 are preferably configured to interface with the top sealing interfaces of top layer modular block 602 and the respective sealing interfaces of chemical control component 632.

The overall thickness 618 (may also be referred to as total staking height) of modular block assembly 600 is preferably between about 1 in. and 2 in., and is more preferably about 1.054 in. The distance from top of process stream 614 to bottom of block assembly 600 (may also be referred to as center height) is preferably less than the overall thickness 618 and may be less than about 1 in.

A method of using a modular chemical delivery system is also provided. The method preferably involves transporting fluid flow through a plurality of top-accessible modular chemical delivery blocks. Each of the plurality of modular blocks preferably includes a first axial interface flange having a first axial connection location configured to allow the modular block to be coupled to a laterally adjacent modular block. The first axial connection location preferably includes an interior surface and an exterior surface. The interior surface of the first axial connection location is preferably unobstructed by any other portion of the modular block from the top surface. Each of the plurality of modular blocks further preferably includes a second axial interface flange comprising a second axial connection location configured to allow the modular block to be coupled to a laterally adjacent modular block. The modular chemical delivery system may include a plurality of local side-to-side fasteners. Each of the plurality of local side-to-side fasteners couples ones of the plurality of modular blocks to other, laterally adjacent ones of the plurality of modular blocks.

Laterally adjacent ones of the plurality of modular blocks may be coupled such that sealing joints are formed therebetween. Transporting fluid flow through the plurality of modular blocks preferably involves transporting fluid flow from a fluid flow path of one modular block to a fluid flow path of another modular block through a sealing joint. The method may further involve transporting fluid flow from the plurality of modular blocks to a semiconductor processing chamber.

In an embodiment, the first axial connection location preferably includes a first axial fastener receiving element configured to receive a local side-to-side fastener for coupling the modular block to a laterally adjacent modular block. The first axial fastener receiving element preferably includes an interior opening defined in the interior surface of the first axial interface flange. The interior opening of the first axial fastener receiving element is preferably unobstructed by other portions of the modular block so that the interior opening of the first axial fastener receiving element is accessible from the top surface. In addition, the second axial connection location preferably includes a second axial fastener receiving element configured to receive a local side-to-side fastener for coupling the modular block to an adjacent modular block. Each of the plurality of local side-to-side fasteners is preferably arranged within the first axial fastener receiving element of one of said plurality of modular blocks and within the second axial fastener receiving element of another, laterally adjacent one of said plurality of modular blocks.

In addition, each of the plurality of modular blocks comprises a fluid flow path axial bore hole defined in a lateral surface of the modular block and a sealing interface arranged around the fluid flow path axial bore hole. A plurality of sealing elements is preferably arranged between and in contact with coupled ones of the plurality of modular blocks. Each of the sealing elements may include a sealing gasket configured to interface with the sealing interfaces of the plurality of modular blocks. Laterally adjacent blocks are directly in contact with the sealing member to form the sealing joints. Preferably, transporting fluid flow through a plurality of modular blocks further includes transporting fluid flow from a fluid flow path of one modular block to a fluid flow path of another modular block through a sealing member between the modular blocks.

In another embodiment, a chemical control component is mounted upon a first one of the plurality of modular blocks. The method further involves transporting fluid flow into the first one of the plurality of modular blocks through a first axial bore hole in a lateral surface of the first one of the plurality of modular blocks; transporting fluid flow from the first one of the plurality of modular blocks into the chemical control component through a first top fluid flow path opening in a top surface of the first one of the plurality of modular blocks; and transporting fluid flow from the chemical control component into the first one of the plurality of modular blocks through a second top fluid flow path opening in the top surface of the first one of the plurality of modular blocks. Any of a variety of methods can be used to carry out the transporting of fluid flow, including pumping.

An embodiment of a method of using a modular chemical delivery system having one or more of the above described-elements may used to transport fluid flow through the modular chemical delivery system shown in FIG. 11. Modular chemical delivery system 700 includes a plurality of top-accessible top layer modular blocks coupled to a plurality of top-access lower layer blocks. One of the plurality of top layer modular blocks is top layer modular block 714. One of the plurality of lower layer modular blocks is lower layer modular block 716. As can be seen in FIG. 11, not all top layer blocks of a modular chemical delivery system will be coupled to a lower layer block; a top layer block of this type has been earlier referred to as a single flow direction modular block. Modular chemical delivery system 700 also preferably includes a support structure, mounting palette 704, to which the modular blocks of system 700 are mounted.

Modular chemical delivery system 700 is preferably configured to transport fluid flow through the plurality of top layer modular in multiple, horizontally transverse directions. Chemical control component 702 is shown mounted upon top layer modular block 714. Fluid flow may enter system 700 through fluid flow inlet 705 attached to top layer modular block 714. Modular chemical delivery system is further configured to transport fluid flow into modular block 714, into chemical control component 702, back into modular block 714, and out of modular block 714 into a laterally adjacent modular block. Furthermore, modular chemical delivery system 700 is preferably configured to transport fluid flow from the modular blocks to a semiconductor processing chamber 701. Transporting fluid from the modular blocks to semiconductor processing chamber 701 preferably occurs through fluid flow line 703. Fluid flow line 703 may include any number of piping sections, valves, and other components.

A method of removing modular chemical delivery blocks via access from directly above the modular chemical delivery blocks is also provided. A first modular block configured to direct fluid flow is preferably coupled by a local-side-to-side fastener to a laterally adjacent second modular block configured to direct fluid flow. The first modular block is removed from the second modular block by accessing the local side-to-side fastener from directly above the first modular block and removing the local side-to-side fastener from the second modular block and the first modular block. Fasteners may be removed using a variety of tools, such as a wrench, or by hand. By accessing the local side-to-side fastener from directly above the first modular block, the method reduces installation time and enables removal of the modular block even when lateral access to the block is limited. In addition, when the first modular block is part of a system including a plurality of modular blocks, the method preferably allows the first modular block to be removed without compromising the integrity of seals between all other ones of the plurality of modular blocks.

In an embodiment, the first modular block is a first top layer modular block having a top surface and a plurality of component fastener receiving elements configured to receive fasteners for mounting a chemical control component above the top surface of the first top modular block. The first top layer modular block is preferably coupled to an underlying lower layer block configured to direct fluid flow by a top-to-bottom fastener. The method then preferably includes removing the first top layer modular block from the underlying lower modular block by accessing the top-to-bottom fastener from directly above the first top modular block and removing the top-to-bottom fastener from the lower layer block and the first top layer block. Removing the local side-to-side fastener from the second modular block and the first top layer modular block may be performed prior to or subsequent to or even simultaneous with removing the top-to-bottom fastener from the lower layer block and the top layer block.

In addition, a chemical control component may be mounted on a top surface of the modular block. The method preferably then includes removing the chemical control component. The chemical control component is preferably removed prior to removing the local side-to-side fastener from the second modular block and the first modular block and prior to removing the top-to-bottom fastener from the lower layer block and the top layer block.

In a further embodiment, the top layer modular block and bottom layer modular block are mounted on a mounting structure by a mounting fastener. The method preferably then includes removing the top layer block and the lower layer block from the mounting structure. Removing the top layer block and the lower layer block from the mounting structure preferably involves accessing the mounting fastener from directly above the first modular block and removing the mounting fastener from the mounting structure. The above-described method may be repeated for a plurality of appropriately configured modular blocks.

Additionally, both the first and second modular blocks may be top layer or bottom layer modular blocks, or a top-accessible unified modular block, as desired. A second modular block configured as a unified modular block preferably includes a first fluid flow path for transporting fluid flow through the second modular block at least partially in a first direction. The first fluid flow path preferably has a first axial bore hole in a first exterior surface of the unified modular block. In addition, the second modular block may also include a first axial fastener receiving element having an opening defined in the first exterior surface and configured to receive local side-to-side fasteners for coupling the modular block to an laterally adjacent modular block. The second modular block may also include a second fluid flow path for transporting fluid flow through the second modular block at least partially in a second direction. The second fluid flow path preferably has a second axial bore hole in a second exterior surface of the unified modular block. The second modular block may also include a second axial fastener receiving element having an opening defined in the second exterior surface and configured to receive local side-to-side fasteners for coupling the modular block to an laterally adjacent modular block. The second direction is preferably horizontally transverse to the first direction, and more preferably is substantially horizontally perpendicular to the first direction. In an embodiment, removing the local side-to-side fastener from the second modular block and the first modular block includes removing the local side-to-side fastener from the second axial fastener receiving element of the second modular block.

In a further embodiment, a third modular block configured to direct fluid flow therethrough is laterally adjacent and coupled to the first modular block. The first modular may be removed from the third modular block by accessing a local side-to-side fastener coupling the first and third modular blocks from directly above and removing the fastener. Removing the first modular block from the both the laterally adjacent second modular block and the laterally adjacent third modular block, preferably occurs without substantially moving the second third modular blocks.

An embodiment of a method for removing modular chemical delivery blocks via access from directly above the modular chemical delivery block having one or more of the above-described features may be described by reference to the Drawings. As shown in FIG. 12, chemical control component 702 may be removed from top layer modular block 714. Control component fasteners 706 may be accessed from the top surface of the assembly top layer modular block and removed by using a wrench to loosen fasteners 706.

Figure 13:
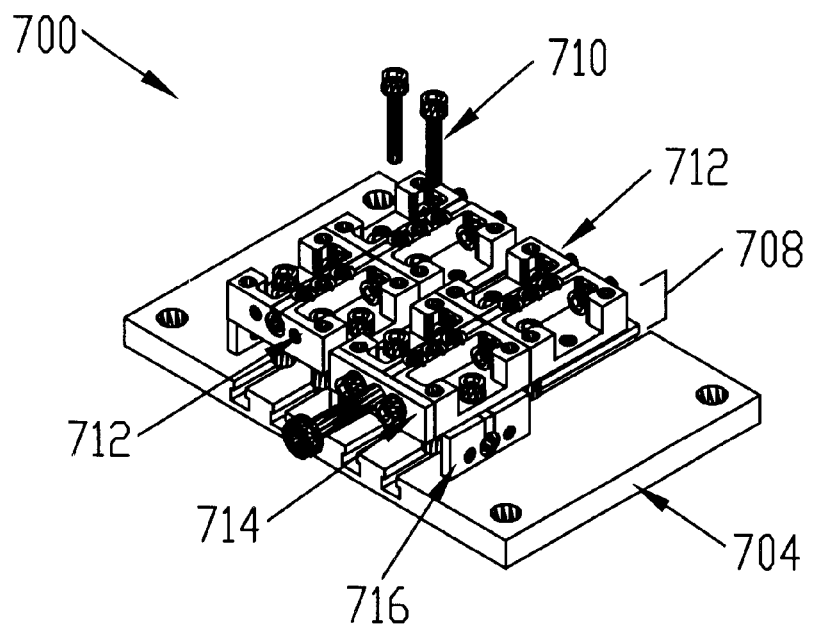
FIG. 13 is a perspective view of the modular chemical delivery system shown in FIG. 12, in which mounting fasteners for mounting the modular blocks are removed.
Figure 14:
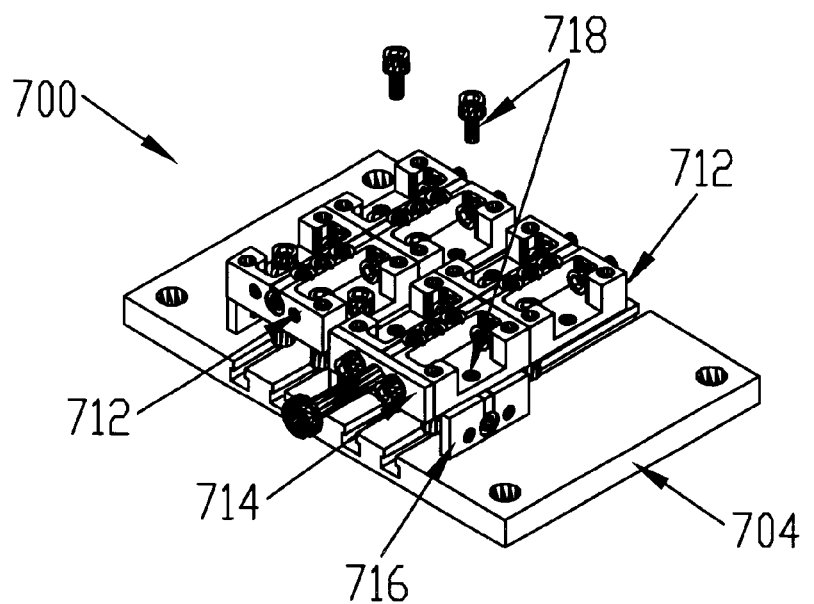
FIG. 14 is a perspective view of the modular chemical delivery system shown in FIG. 13, in which top-to-bottom fasteners are removed.

FIG. 13 shows a subsequent step in which mounting fasteners 710 may be removed. In part because mounting fasteners 710 are attached to mounting palette 704, without use of a mounting bracket, fasteners 710 may be easily removed via access from directly above the modular blocks. Such a method of removing mounting fasteners may be performed with more speed and with less difficulty than conventional methods. Sub-system mounting hardware 708, which includes mounting fasteners 710, is preferably strategically placed such that mechanical interference with multiple layer modular block systems and with adjacent gas paths is avoided. FIG. 14 shows a subsequent step in which top-to-bottom fasteners 718 are removed. Top-to-bottom fasteners 718 (may also be referred to as top-to-bottom connection fasteners) are preferably accessed and removed from directly above top layer modular block 714. Consequently, top layer modular block 714 is preferably no longer coupled to lower layer block 716.

Figure 15:
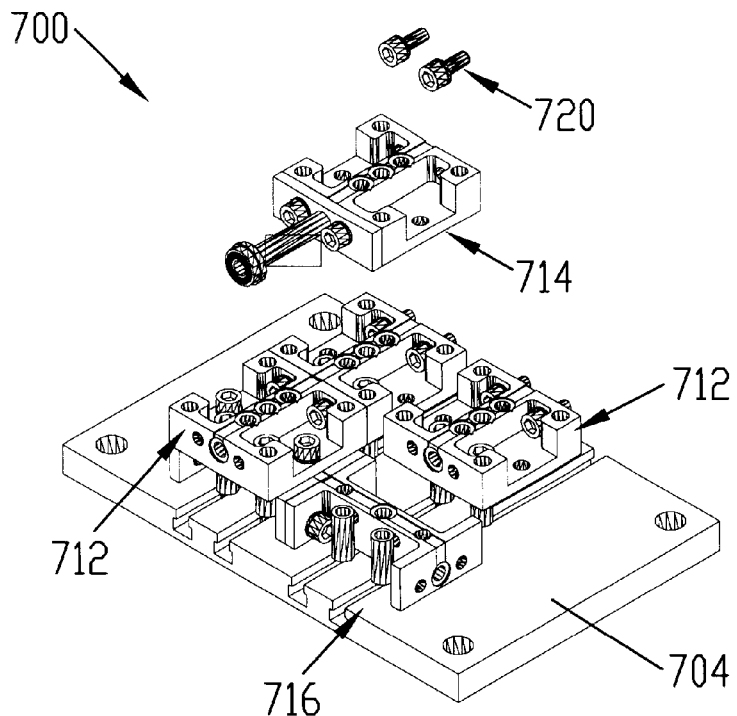
FIG. 15 is a perspective view of the modular chemical delivery system shown in FIG. 14, in which a top layer block is removed.

FIG. 15 shows a step in which top layer modular block 714 is removed. To allow for the removal of top layer modular block 714, local side-to-side fasteners 720 are preferably accessed from directly above top layer modular block 714 and then removed from a laterally adjacent modular block 712 and top layer modular block 714. Since top layer modular block 714 is preferably no longer coupled to any other modular blocks, it may be easily removed. In an alternate embodiment where top layer block 714 is attached directly to mounting palette 704, top layer modular block 714 may be removed directly from the mounting palette itself.

Figure 16:
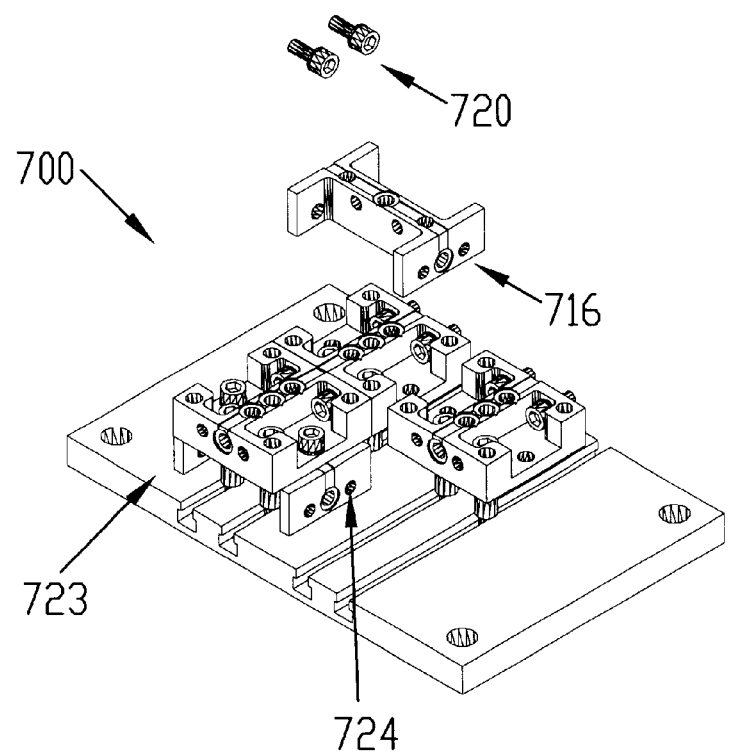
FIG. 16 is a perspective view of the modular chemical delivery system shown in FIG. 15, in which a lower layer block is removed.
Figure 17A:
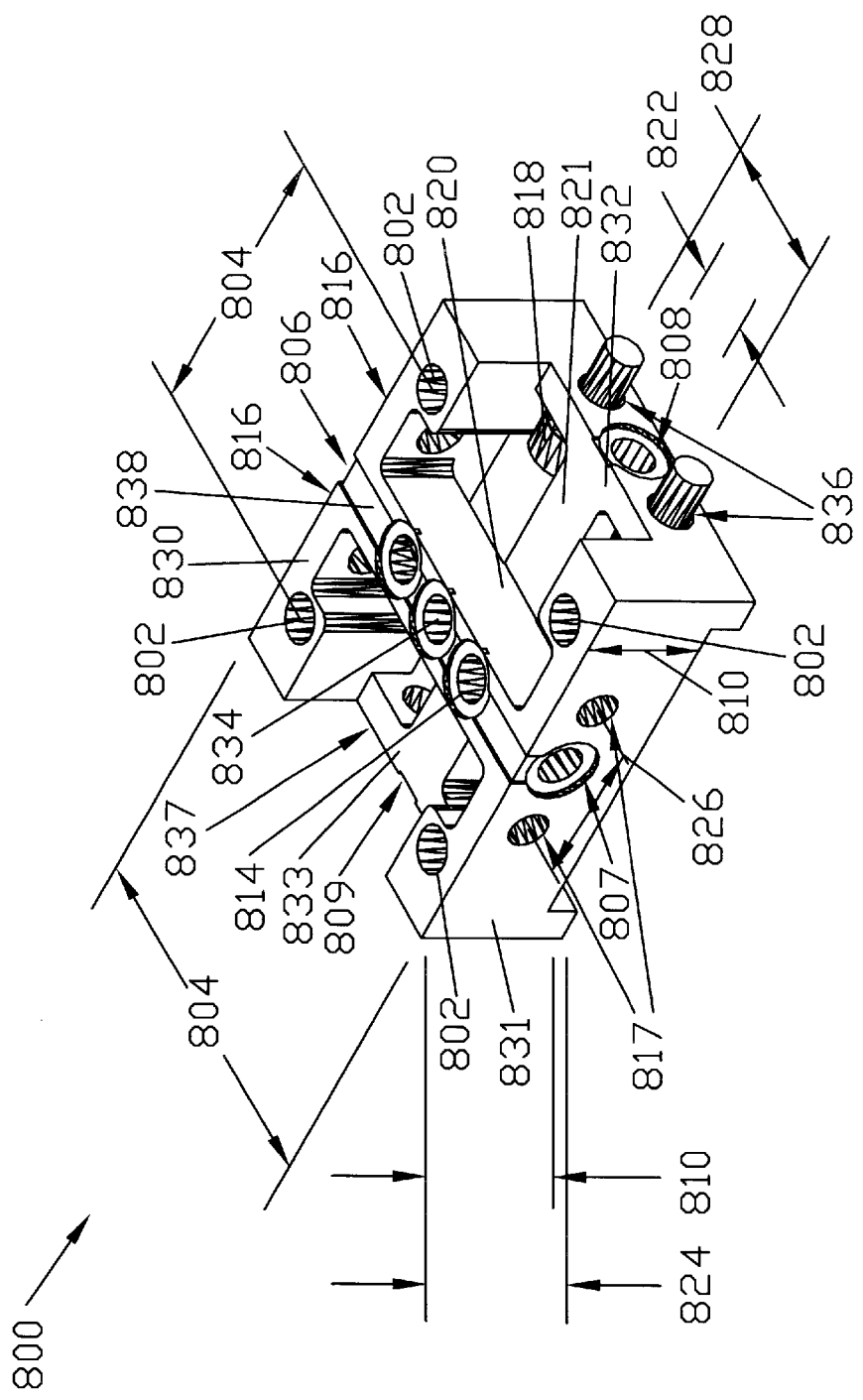
FIG. 17A is a perspective view of a unified modular chemical delivery block in accordance with an embodiment.
Figure 17B:
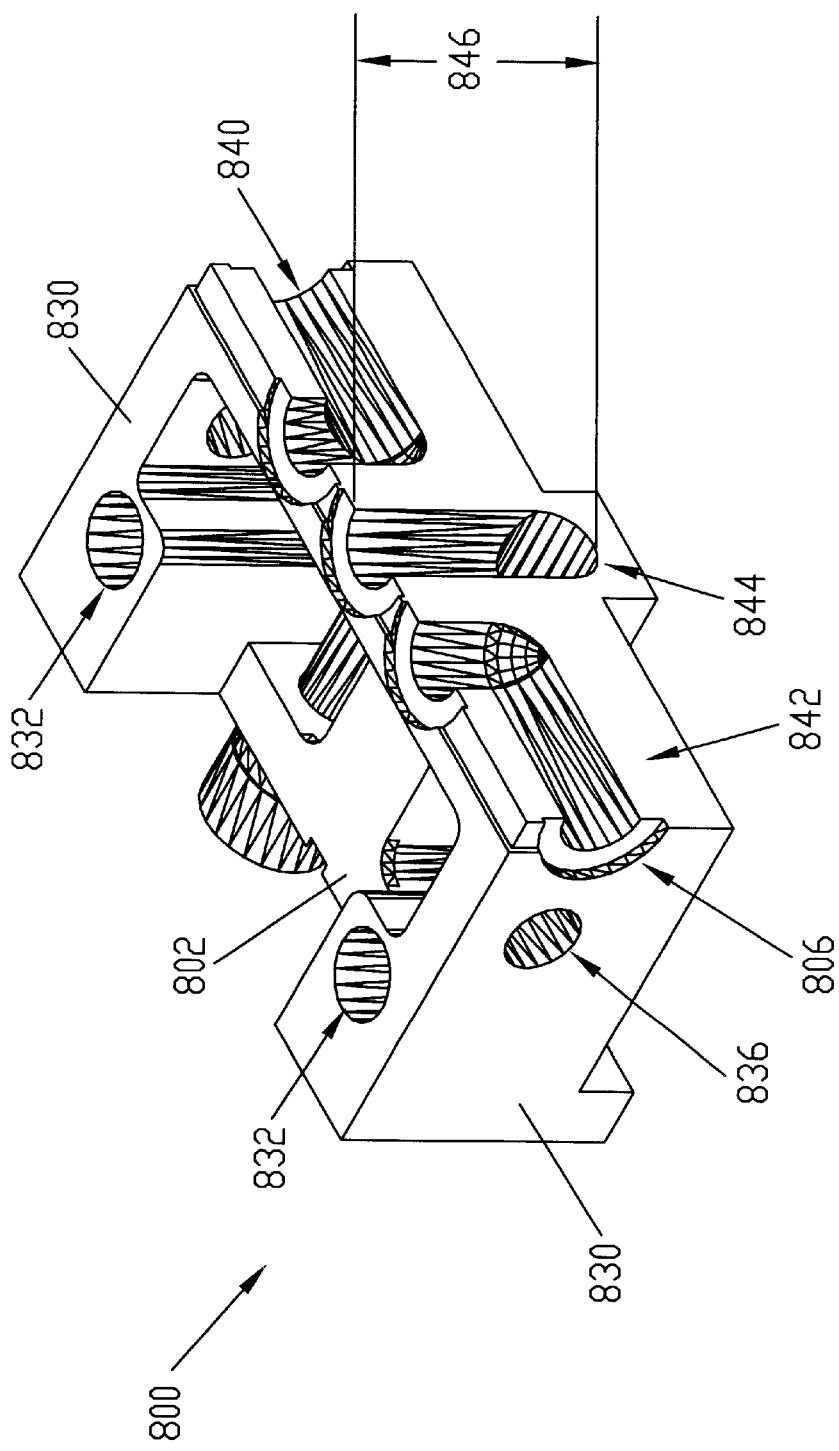
FIG. 17B is a cutaway cross-sectional view of the unified modular block shown in FIG. 17A.
Figure 17C:
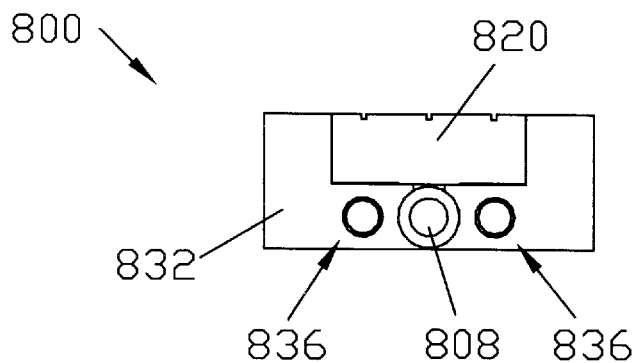
FIG. 17C is a side view of the unified modular block shown in FIG. 17A.
Figure 17D:
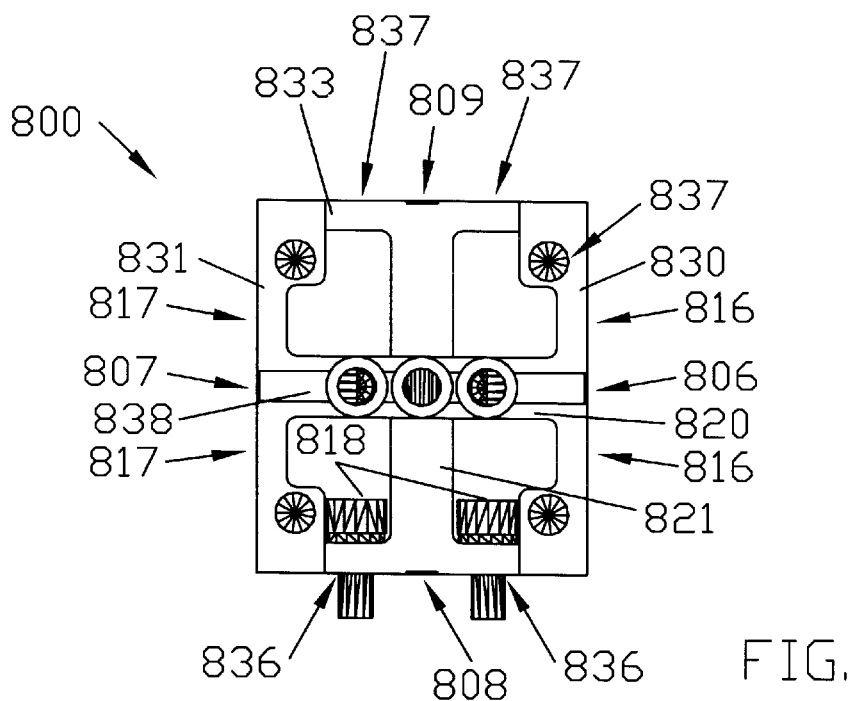
FIG. 17D is a top view of the unified modular block shown in FIG. 17A.
Figure 17E:
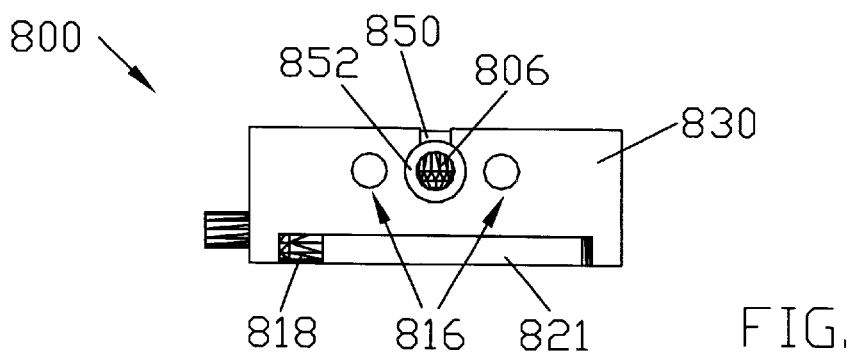
FIG. 17E is a front view of the unified modular block shown in FIG. 17A.

FIG. 16 shows a subsequent step in which lower layer modular block 716 is removed. To allow for the removal of lower layer modular block 716 (may also be referred to as an underlying bottom block or a bottom layer substrate block), local side-to-side fasteners are preferably accessed from directly above modular block 716 and removed, preferably using a wrench. The ability to remove all top layer and/or lower layer (dual or multiple layer) blocks until one has removed the entire multi-layer assembly down to the mounting palette via access from the top surface of the system is an advantage in assembly, disassembly, and reconfiguration of these modular chemical distribution systems. Further, this approach permits removal of an entire single or multiple layer modular block assembly portion of the chemical delivery system from the top working portion of the system with minimal exposure of the system blocks to atmospheric conditions (a known source for contamination of the internal system). This process can be repeated for connecting and disconnecting any number of blocks and layers of blocks, all through access from directly above each modular block. A method for assembling modular chemical delivery system by reversing the order of the above steps will be apparent to one skilled in the art having the benefit of this disclosure.

FIGS. 48A, 48B, 48C, and 48D are a perspective view, a top view, a front view, and a rear view, respectively, of top-accessible modular block 3800. Modular block 3800 may be used similarly to the modular blocks described above. Modular block 3800 is configured to transport fluid flow therethrough at rates of up, e.g., 200 SLM. The dimensions of modular block 3800 preferably comply with applicable SEMI standards, including SEMI 2787.1. In addition, the dimensions of modular block 3800 preferably serve to reduce or prevent mechanical interference between the components of modular block 3800.

Modular block 3800 preferably includes a first axial interface flange 3802 and a second axial interface flange 3803. First and second axial interface flanges each preferably have a thickness 3828. Thickness 3828 is preferably about 0.375 in. First axial interface flange 3802 preferably includes first inner axial connection locations 3808 and first outer axial connection locations 3810. Second axial interface flange 3803 preferably includes second inner axial connection locations 3809 and second outer axial connection locations 3811. Having both inner and outer axial connection locations may aid modular block 3800 in maintaining strong connections during operation, especially at high flow rates.

The first and second inner and outer axial connection locations preferably include an exterior surface and an interior surface. The interior surface of each of the axial connection locations is preferably substantially parallel to the exterior surface of the axial connection location and unobstructed by other portions of the modular block so that the interior surface of each of the axial connection locations is accessible from the top surface of the modular block. This configuration preferably allows each of the axial connection locations to be accessed from directly above the top surface of modular block 3800.

Each of the axial connection locations of modular block 3800 preferably includes an axial fastener receiving element configured to configured to receive a local side-to-side fastener for coupling modular block 3800 to a laterally adjacent modular block. The axial fastener receiving elements preferably each have an interior opening defined in the interior surface of the a respective first or second axial interface flange 3802 or 3803. The interior opening of the axial fastener receiving elements are preferably unobstructed by other portions of the modular block so that the interior opening of the axial fastener receiving elements are accessible from the top surface of modular block 3800.

The axial receiving elements of modular block 3800 may be polarized. In an embodiment, the axial fastener receiving elements of first inner axial connection locations 3808 may be substantially untextured. The axial fastener receiving elements of first outer axial connection locations 3809 may be threaded. The axial fastener receiving elements of second inner axial connection locations 3810 may be threaded. The axial fastener receiving elements of second outer axial connection locations 3811 may be substantially untextured.

Modular block 3800 preferably includes top bore holes 3816 defined in a top surface of modular block 3800. The center-to-center spacing 3832 of top bore holes 3816 is preferably about 0.455 in. Top sealing interfaces 3817 are preferably arranged around each top axial borehole. The distance 3830 between the top bore holes and the edge of the modular block is preferably about 0.560 in. A sealing rib 3820 preferably extends between the top bore holes. The width 3821 of sealing rib 3820 is preferably about 0.220. Modular block 3800 preferably includes first axial bore hole 3812 and second axial borehole 3813, which are defined in exterior surfaces of first and second axial interface flanges 3802 and 3803, respectively. Axial sealing interfaces 3814 may be arranged around each axial bore hole. The centers of first and second axial bore holes 3812 and 3813 are both preferably arranged a distance 3842 from the top of modular block 3800. Distance 3842 is preferably about 0.315 in. A first fluid flow path of modular block 3800 preferably extends from first axial bore hole 3812 to a top borehole 3816. A second fluid flow path of modular block 3800 preferably extends from second axial borehole 3813 to a top bore hole 3816. Leak test ports 3814 are preferably arranged in both first and second axial interface flanges above first axial bore hole 3812 and second axial borehole 3813. The width 3819 of leak test ports 3818 is preferably equal to the width 3821 of sealing rib 3820. Preferably, width 3819 is about 0.220 in.

Each pair of first and second inner and axial connection locations is preferably symmetrically arranged around the first and second axial bore holes 3812 and 3813, respectively. Each first and second inner axial connection location is preferably spaced a distance 3838 from a respective first or second axial borehole. Distance 3838 is preferably about 0.380 in. First and second inner axial connection locations are preferably arranged on a centerline of respective first and second axial bore holes 3812 and 3813. More preferably, first and second inner axial connection locations are located in a vertical center of respective first and second axial interface flanges 3802 and 3803.

Each pair of first and second outer axial connection locations is preferably symmetrically arranged around the first and second axial bore holes 3812 and 3813, respectively. Each first and second outer axial connection location is preferably spaced a distance 3840 from a respective first or second axial borehole. Distance 3840 is preferably about 0.607 in. First and second outer axial connection locations are preferably arranged below a centerline of respective first and second axial bore holes 3812 and 3813. More preferably, first and second outer axial connection locations are located a distance 3836 below a centerline of respective first and second axial bore holes 3808 and 3810. Distance 3836 is preferably about 0.041 in. Consequently, first and second outer axial connection locations are preferably arranged off a vertical centerline of respective first and second axial interface flanges 3802 and 3803.

Modular block 3800 preferably includes component fastener receiving elements 3806. Component fastener receiving elements 3806 are preferably configured to receive control component fasteners for mounting a chemical control component. The distance 3834 between each component fastener receiving element 306 and a centerline of modular block 3800 is preferably about 0.594 in.

Modular block 3800 preferably has a length 3822 of between 1 in. and 2 in., and more preferably about 1.547 in. Modular block 3800 preferably has a width 3824 of between 1 in. and 2 in., and more preferably about 1.547 in. In a preferred embodiment, length 3822 and width 3824 are substantially equal. The thickness 3826 of modular block 3800 is preferably less than about 1 in., and more preferably is about 0.63 in.

Unified Modular Block

Another embodiment includes a unified modular block configured to direct multi-directional fluid flow therethrough. A unified modular block as described herein preferably includes first and second fluid flow paths having first and second axial bore holes, respectively. The first fluid flow path may be configured to transport fluid flow through the unified modular block at least partially in a first direction, and the second fluid flow path may be configured to transport fluid flow through the modular block at least partially in a second direction horizontally transverse to the first direction. Preferably, the first and second directions are substantially horizontally perpendicular. In addition, the second and first directions are preferably substantially parallel to the top surface of the modular block.

The unified modular block may be further configured to be coupled to other modular blocks laterally adjacent to the first axial bore hole and the second axial bore hole. In an embodiment, the unified modular block includes a first axial connection location configured to allow the unified modular block to be coupled to another modular block laterally adjacent to the first axial bore hole. The unified modular block also preferably includes a second axial connection location configured to allow the unified modular block to be coupled to a modular block laterally adjacent to the second axial bore hole.

Preferably, a lowermost portion of the second fluid flow path is elevationally below a lowermost portion of the first fluid flow path. A first feature of a modular block may be considered lower than a second feature of the modular block if the first feature is elevationally further from the top surface of the modular block. Consequently, the lowermost portion of a fluid flow path may be considered the portion of a fluid flow path elevationally furthest below the top surface of the modular block.

In addition, the unified modular block preferably includes a first axial interface flange and a second axial interface flange. In a preferred embodiment, the first axial interface flange is oriented substantially perpendicular to the first direction and the second axial interface flange is oriented substantially perpendicular to the second direction. The first fluid flow path preferably has a first axial bore hole in the first axial interface flange, and the second fluid flow path preferably has a second axial bore hole in the second interface flange. The first and second fluid paths may or may not be configured to be in fluid communication within the unified modular block.

The first fluid flow path preferably includes a first top borehole in a top surface of said unified modular block. Likewise, the second fluid flow path preferably includes a second top borehole in a top surface of the unified modular block. In an embodiment, the first top bore hole is arranged in a center of the top surface of the unified modular block. In an alternate embodiment, the second top bore hole is arranged in a center of the top surface of the unified modular block.

A unified modular block may eliminate any need for intermediate fasteners and seals (i.e., seals and fasteners between laterally adjacent modular blocks). In a preferred embodiment, the unified modular block is free of intermediate fasteners and seals, thus avoiding the above-described disadvantages of such elements. Furthermore, the second fluid flow path of the unified modular block is preferably configured to transport fluid flow between the second axial borehole and a second top borehole defined in the top surface of the unified modular block without passing through a seal. As a result of these benefits, the likelihood of leakage or contamination of the fluid flow within a unified modular block may be greatly reduced.

A unified modular block configured to direct multi-directional fluid flow therethrough may also allow for access to an axial connection location from directly above the unified modular block. Preferably, a top-accessible unified modular block includes an axial connection location configured to allow the modular block to be coupled to a laterally adjacent modular block. The interior surface of the axial connection location is preferably substantially parallel to the exterior surface of the axial connection location and unobstructed by other portions of the modular block so that the interior surface of the axial connection location is accessible from the top surface. This configuration preferably allows the axial connection location to be accessed from directly above the modular block.

In a preferred embodiment, a top-accessible unified modular block includes a top surface and component fastener receiving elements configured to receive component mounting fasteners for mounting a chemical control component above the top surface of the unified modular block. The unified modular block also preferably includes a first axial interface flange having a first exterior surface and a first interior surface, and a second axial interface flange having a second exterior surface and a second interior surface. Preferably, an uppermost surface of the first axial interface flange is elevationally above an uppermost surface of the second axial interface flange. The unified modular block may further include a first fluid flow path for transporting fluid flow through the modular block at least partially in a first direction. The first fluid flow path preferably has a first axial bore hole in the first exterior surface and a first top bore hole in the top surface. The unified modular block may further include a second fluid flow path for transporting fluid flow through the modular block at least partially in a second direction. The second fluid flow path preferably has a second axial borehole in the second exterior surface and a second top borehole in the top surface.

Preferably, the second fluid flow path is at least partially arranged elevationally below the second fluid flow path. More preferably, a lowermost portion of the second fluid flow path is elevationally below a lowermost portion of the first fluid flow path. Such a feature may allow more space to access axial connection locations when coupling the modular block to a laterally adjacent modular block. The second direction is preferably horizontally transverse to the first direction, and both the second and first directions are substantially parallel to a top surface of the unified modular block.

The first axial interface flange preferably includes a plurality of first axial connection locations, and the second axial interface flange preferably includes a plurality of second axial connection locations. Axial connection locations may be located in the center of or off-center of the exterior surface of the axial interface flange on which they are located. The first axial connection locations each preferably include a first axial fastener receiving element defined in the first axial interface flange and configured to receive local side-to-side fasteners for coupling the modular block to a laterally adjacent modular block. More preferably, the plurality of first axial fastener receiving elements are symmetrically arranged on opposite sides of the first axial bore hole. The second axial connection locations each preferably include a second axial fastener receiving element defined in the second axial interface flange and configured to receive local side-to-side fasteners for coupling the modular block to a laterally adjacent modular block. More preferably, the plurality of second axial fastener receiving elements is symmetrically arranged on opposite sides of the second axial bore hole. Each of the plurality of first axial fastener receiving elements preferably contains an interior opening defined in the first interior surface of the first axial interface flange and an exterior opening defined in the exterior surface of the axial interface flange. The interior openings of each of the plurality of first axial fastener receiving elements are unobstructed by any other portion of the modular block from the top surface. Preferably, the interior and exterior openings of the axial fastener receiving elements are substantially parallel.

Distances between a lowermost portion of each of the first axial fastener receiving elements and the top surface of the modular block are each preferably at most as great as (i.e., no more than) a distance between a lowermost portion of the first fluid flow path and the top surface of the modular block. Similarly, distances between a lowermost portion of each of the second axial fastener receiving elements and the top surface of the modular block are each preferably at most as great as (i.e., no more than) a distance between a lowermost portion of the second fluid flow path and the top surface of the modular block. Such features may help prevent the unified modular block from being unnecessarily thick.

Preferably, first axial interface flanges are preferably configured to be oriented in the direction from which fluid flow exits the modular block when the block is incorporated in a chemical delivery system. Conversely, second axial interface flanges are preferably configured to be oriented in the direction in which fluid flow enters the modular block when the block is incorporated in a chemical delivery system. To facilitate coupling of modular block by insertion of a local side-to-side fastener through first axial receiving elements of one block into second axial receiving elements of a laterally adjacent modular block, each of the plurality of second axial fastener receiving elements preferably is a threaded channel defined in the second axial interface flange, and each of the plurality of first axial fastener receiving elements preferably is a substantially untextured channel defined in the first axial interface flange.

In an embodiment, the unified modular block further includes a plurality of first axial interface flanges of which the first axial interface flange is a first one. A second one of the plurality of first axial interface flanges is preferably oriented substantially perpendicular to the first direction, and includes second plurality of first axial fastener receiving elements configured to receive local side-to-side fasteners for coupling the modular block to an laterally adjacent modular block. Each of the second plurality of first axial fastener receiving elements is preferably a substantially untextured channel. Furthermore, the unified modular block preferably includes a plurality of first fluid flow paths of which the first fluid flow path is a first one. The unified modular block may also include a second one of the plurality of first fluid flow paths for transporting fluid flow through the modular block at least partially in the first direction. The second one of the plurality of first fluid flow paths preferably has a first axial bore hole in an exterior surface of the second one of said plurality of first axial interface flanges and a first top bore hole in the top surface of the unified modular block. Preferably, the first top bore hole of the second one of the plurality of first fluid flow paths is adjacent the first top bore hole of the first one of the plurality of first fluid flow paths.

The exterior surfaces of the first and second axial interface flanges are preferably devoid of protrusions. That is, while certain minor topographical disparities may exist, no portion of the exterior surface preferably substantially protrudes from the general exterior surfaces of the axial interface flanges. Such a feature may aid in removing a modular block without compromising the seals of adjacent modular blocks, since being devoid of protrusions, the block may easily be moved upward once decoupled without disturbing the seals of seals of non-laterally adjacent coupled modular blocks or substantially moving the modular blocks from which it was decoupled. There may be, however, recesses or holes formed in the axial interface flange exterior surface, such as for an axial connection location or for an axial borehole.

The first axial interface flange may be a first upper axial interface flange, and the second axial interface flange may be a second lower axial interface flange. The unified modular block may further include a second upper axial interface flange opposite the first upper axial interface flange and a first lower axial interface flange opposite the second lower axial interface flange. The unified modular block further preferably includes an upper fluid flow path wall arranged around at least a horizontal section of the first fluid flow path and adjacent to the first and second upper axial interface flanges. Preferably, the width of the upper fluid flow path wall along the length of the fluid flow path wall is less than a center-to-center spacing between the first one and the second one of the first plurality of axial fastener receiving elements. The upper fluid flow path wall may be considered to include the portion of the modular block between upper axial interface flanges and around and laterally outward from the horizontal portion of the first fluid flow path. So if the upper fluid flow path wall is, along its entire length, less thick than a center-to-center spacing the first one and the second one of the first plurality of axial fastener receiving elements, portions of the first and second upper axial interface flange immediately laterally spaced from the outer boundaries of the upper fluid flow path walls may not be directly connected by another portion of the unified modular block. Consequently, a gap may exist between the first and second axial interface flanges such that a direct path may be taken through the outer boundaries of the unified modular block from a point above a top surface of the modular block to a point below a bottom surface of the modular block. Such a feature preferably ensures that sufficient room to access the axial fastener receiving elements exists. In addition, by reducing the quantity of material contained in the modular block, the modular block may be made lighter than conventional blocks.

Furthermore, the unified modular block further preferably includes a lower fluid flow path wall arranged around the second fluid flow path. The unified modular block further preferably includes an lower fluid flow path wall arranged around at least a horizontal section of the second fluid flow path and adjacent to the first and second lower axial interface flanges. Preferably, the width of the lower fluid flow path wall along the length of the lower fluid flow path wall is less than a center-to-center spacing between the first one and the second one of a second plurality of axial fastener receiving elements arranged in the second lower axial interface flange. The lower fluid flow path wall may be considered to include the portion of the modular block between lower axial interface flanges and around and laterally outward from the horizontal portion of the second fluid flow path. Preferably, the upper surface of the lower fluid flow path wall is below the lower surface of the upper fluid flow path wall.

The dimensions of a unified modular block and its components preferably comply applicable SEMI standards. In a preferred embodiment, the unified modular block complies with SEMI 2787.1. For example, the unified modular block preferably includes four component fastener receiving elements configured to receive fasteners for mounting a chemical control component above the top surface. The center-to-center spacing between the chemical control components preferably complies with an applicable SEMI standard regarding surface mount chemical control components. In an embodiment, the center-to-center spacing between the chemical control components wherein a center-to-center spacing between laterally spaced component fastener receiving elements is less than about 1.2 in., and more preferably is 1.188 in. Furthermore, a width, a length, and a thickness of the modular block all comply with an applicable SEMI standard regarding modular chemical delivery blocks.

As stated above, a unified modular block may be made substantially less thick than a multilayer modular block assembly with a similar capability for multi-directional fluid flow. Preferably, the second fluid flow path comprises a vertical fluid flow segment. The length of the vertical fluid flow segment is less than one-third a length and a width of the unified modular block. In addition, a thickness of the unified modular block is less than one-half a length and a width of the unified modular block. The unified modular block preferably has a length of at least 1 in. and at most about 2 in., a width of at least 1 in. and at most about 2 in., a width of at most about 2 inches, and a thickness of less than about 1 inch. More preferably, the length and width of the modular block are less than about 1.55 in. In an embodiment, the spacing between a first one and a second one of the plurality of first axial fastener receiving elements is at least about 0.62 in., and may be 0.62 in. The spacing between a first one and a second one of the plurality of second axial fastener receiving elements is at least about 0.6 in., and may be 0.62 in.

Another embodiment provides a modular chemical delivery system incorporating a plurality of unified modular blocks each configured to provide multi-directional fluid flow therethrough. Each of the plurality of unified modular blocks preferably includes a first fluid flow path for transporting fluid flow through the modular block at least partially in a first direction. The first fluid flow path preferably has a first axial bore hole in a first exterior surface of the unified modular block. In addition, each of the plurality of unified modular blocks preferably includes a second fluid flow path for transporting fluid flow through the modular block at least partially in a second direction. The second direction may be horizontally transverse to the first direction, and both the first and second directions may be substantially parallel to a top surface of the unified modular block. The second fluid flow path preferably includes a second axial bore hole in a second exterior surface of the unified modular block. Each of the plurality of unified modular blocks may further include a first axial connection location configured to allow the modular block to be coupled to another modular block laterally adjacent to the first axial bore hole, and a second axial connection location configured to allow the modular block to be coupled to a modular block laterally adjacent to the second axial bore hole. The modular chemical delivery system further includes a plurality of local side-to-side fasteners. Local fasteners in general, and local side-to-side fasteners in particular, may be fasteners that couple only a pair of adjacent blocks. Preferably, fasteners of the plurality of local side-to-side fasteners couple ones of the plurality of unified modular blocks to other, laterally adjacent ones of the plurality of unified modular blocks.

In an embodiment, the first axial connection location of each of the plurality of modular blocks preferably includes a first axial fastener receiving element having an opening defined in the first exterior surface and configured to receive fasteners for coupling the modular block to a laterally adjacent modular block. Likewise, the second axial connection location of each of the plurality of modular blocks preferably includes a second axial fastener receiving element having an opening defined in the second exterior surface and configured to receive fasteners for coupling the modular block to an laterally adjacent modular block. Each of the plurality of fasteners may be arranged within the first axial fastener receiving element of one of said plurality of modular blocks and within the second axial fastener receiving element of another of said plurality of unified modular blocks such that each of the plurality of modular blocks is coupled to at least one other, laterally adjacent modular block. Sealing joints are preferably formed between laterally adjacent modular blocks to connect at least one of the fluid flow paths of each coupled one of the plurality of unified modular blocks.

In an embodiment, first, second and third coupled ones of the plurality of unified modular blocks are coupled such that the first fluid flow path of the first coupled one of the plurality of unified modular blocks is connected to the first fluid flow path of the second coupled one of the plurality of unified modular blocks. In addition, the second fluid flow path of the first coupled one of the plurality of unified modular blocks may be connected to the second fluid flow path of the third coupled one of the plurality of unified modular blocks. Furthermore, the first coupled one of the plurality of unified modular blocks may include a third fluid flow path for transporting fluid flow through the modular block at least partially in the first direction. The third fluid flow path of the plurality of unified modular blocks preferably includes a third axial bore hole in a third exterior surface of the first coupled one of the plurality of unified modular blocks. The system may then further include a single flow direction modular block having a first fluid flow path. The single flow direction modular block is preferably coupled to the first coupled one of the plurality of unified modular blocks such that the first fluid flow path of the single flow direction modular block is connected to the third fluid flow path of the first coupled one of the plurality of unified modular blocks.

In a preferred embodiment, coupled ones of a plurality of unified modular blocks each include a sealing interface arranged around each fluid flow path bore hole. The sealing interfaces may each be configured as counterbore sealing cavities. Preferably, the system includes a plurality of sealing elements arranged between and in contact with coupled ones of the plurality of modular blocks. Each of the sealing elements preferably includes a sealing gasket configured to interface with the sealing interfaces of the plurality of modular blocks. Coupled ones of the plurality of unified modular blocks are preferably directly in contact with the sealing member to form the sealing joints. Each of the plurality of modular blocks is preferably configured such that decoupling one of the plurality of laterally adjacent modular blocks from a laterally adjacent modular block does not compromise the integrity of sealing joints existing between any other ones of the plurality of modular blocks.

Furthermore, each of the plurality of unified modular blocks is preferably configured to interface with a surface mounted chemical control component. Preferably, each of the plurality of unified modular blocks includes a plurality of component fastener receiving elements configured to receive fasteners for mounting a chemical control component above the top surfaces of each of the pluralities of modular blocks. The system may also include a semiconductor processing chamber. The chamber can be any of the variety of the specialized chamber used in semiconductor processing, including, but not limited to, etch chambers and deposition chambers. In a preferred embodiment, the system is configured to transport fluid flow from the plurality of unified modular blocks to the semiconductor processing chamber.

Exemplary embodiments of a unified modular block and a modular chemical delivery system having one or more of the above-described features are shown in the Drawings. FIGS. 17A, 17B, 17C, 17D, and 17E present a perspective view, a cutaway cross-sectional view, a side view, a top view, and a front view, respectively, of unified modular flow block 800. Unified modular block 800 is configured to direct multi-directional fluid flow therethrough. Unified modular block 800 may be configured as a three port tee modular block.

Unified modular block 800 preferably includes first upper axial interface flange 830 and second upper axial interface flange 831, each having an exterior surface and an interior surface. Unified modular block 800 also preferably includes first lower axial interface flange 832 and second lower axial interface flange 833. Preferably, uppermost surfaces of the first and second upper axial interface flanges are elevationally above an uppermost surface of the first and second lower axial interface flanges.

Unified modular block 800 preferably includes upper fluid flow wall 820 and lower fluid flow wall 821. Upper fluid flow path wall 820 preferably contains fluid flow paths 840 and 842. Fluid flow path 840 preferably has a first axial bore hole 806 (may also be referred to as a top axial seal connection) defined in first upper axial interface flange 830 and a top fluid path bore hole 834 defined in a top surface of modular block 800. Fluid flow path 842 preferably has a second axial bore hole 807 defined in second upper axial interface flange 831 and a top fluid path bore hole 834 defined in a top surface of modular block 800. Fluid flow may enter fluid flow paths 840 or 842 in a first direction. Lower fluid flow path wall 821 includes a pair of fluid flow paths (not visible) having first and second axial bore holes 808 and 809, respectively, in the lower axial interface flanges. Lowermost portions of the fluid flow paths within lower fluid flow path Act wall 821 are preferably elevationally below lowermost portion of fluid flow paths 840 and 841. Fluid flow path 844 is arranged within both upper fluid flow path wall 820 and lower fluid flow path wall 821. Fluid flow path 844 may be considered to form a contiguous fluid flow path with the fluid flow paths within lower fluid flow path wall 821. Fluid flow path 844 preferably has a top fluid path bore hole 834 in a top surface of modular block 800. Fluid flow may enter or exit fluid flow path 844 in a second direction horizontally transverse to the first direction from a lower axial fluid flow path bore hole 808 or 809 in one of the lower axial interface flanges. Preferably, the second direction is substantially horizontally perpendicular to the first direction. In addition, the second and first directions are preferably substantially parallel to the top surface of the modular block. First and second upper axial interface flange 830 and 831 are preferably oriented substantially perpendicular to the first direction, and first and second lower axial interface flanges 832 and 833 are preferably oriented substantially perpendicular to the second direction.

Unified modular block 800 is preferably configured to be coupled to other modular blocks laterally adjacent to its axial bore holes. Consequently, unified modular block 800 may include first axial connection locations to allow the modular block to be coupled to another modular block laterally adjacent to a first axial bore hole. Preferably, unified modular block 800 includes second upper axial connection locations 816 and first lower axial connection locations 836. The unified modular may also include second axial connection locations configured to allow the modular block to be coupled to a modular block laterally adjacent to a second axial bore hole. Preferably, unified modular block 800 includes second upper axial connection locations 817 and second lower axial connection locations 837. (Axial connection locations may also be referred to as axial connections.)

Unified modular block 800 is preferably free of intermediate fasteners and seals, thus avoiding the above-described disadvantages of such elements. Furthermore, fluid flow path 844 is preferably configured to transport fluid flow between a first or second lower axial borehole and a top borehole defined in the top surface of unified modular block 800 without passing through a seal.

Unified modular block 800 is preferably a top-accessible unified modular block; that is unified modular block 800 preferably affords access to an axial connection location from directly above itself. Preferably, the interior surfaces of first upper and lower axial connection locations 816 and 836 are substantially parallel to the respective exterior surface of the axial connection locations and unobstructed by other portions of unified modular block 800 so that the interior surfaces of the first axial connection locations are accessible from the top surface of unified modular block 800. Furthermore, the interior surfaces of the second upper and lower axial connection locations 817 and 837 are preferably substantially parallel to the respective exterior surface of the axial connection locations and unobstructed by other portions of unified modular block 800 so that the interior surfaces of the second axial connection locations are accessible from the top surface of unified modular block 800. First upper and lower axial connection locations 816 and 836 each preferably include a first axial fastener receiving element defined in first upper and lower axial interface flanges 830 and 832, respectively, and configured to receive local side-to-side fasteners for coupling unified modular block 800 to a laterally adjacent modular block. The plurality of first axial fastener receiving elements are preferably symmetrically arranged on opposite sides of the first axial bore holes 806 and 808 (may also be referred to as a bottom axial connection). Each of the plurality of first axial fastener receiving elements preferably contains an interior opening defined in the first interior surface and an exterior opening defined in the second exterior surface of the first upper or lower axial interface flange. The interior openings of each of the plurality of first axial fastener receiving elements are preferably unobstructed by any other portion of modular block 800 from the top surface. In addition, the interior and exterior openings of each of the plurality of first axial fastener receiving elements are preferably substantially parallel.

Similarly, second upper and lower axial connection locations 833 and 837 each preferably include a second axial fastener receiving element defined in second upper or lower axial interface flanges, respectively, and configured to receive local side-to-side fasteners for coupling modular block 800 to a laterally adjacent modular block. Each of the plurality of second axial fastener receiving elements is symmetrically arranged on opposite sides of second axial bore holes 807 and 809. Each of the plurality of second axial fastener receiving elements preferably contains an interior opening defined in the second interior surface and an exterior opening defined in the second exterior surface of the second upper or lower axial interface flange. The interior openings of each of the plurality of second axial fastener receiving elements are preferably unobstructed by any other portion of modular block 800 from the top surface. Local side-to-side fasteners 818 (may also be referred to as lower axial or transverse axial fasteners) may be arranged within the first axial receiving elements of first axial connection locations 836. In addition, the interior and exterior openings of each of the plurality of second axial fastener receiving elements are preferably substantially parallel.

First axial interface flanges are preferably configured to be oriented in the direction from which fluid flow exits modular block 800 when the block is incorporated in a chemical delivery system. Conversely, second axial interface flanges are preferably configured to be oriented in the direction in which fluid flow enters the modular block when the block is incorporated in a chemical delivery system. To facilitate coupling of unified modular blocks by insertion of a local side-to-side fastener through first axial receiving elements of one block into second axial receiving elements of a laterally adjacent modular block, each of the plurality of second axial fastener receiving elements preferably is a threaded channel, and each of the plurality of first axial fastener receiving elements is a substantially untextured channel.

Unified modular block 800 preferably includes a top surface and component fastener receiving elements 802 (may also be referred to as top surface mount component fastener locations/holes or mechanical chemical gas delivery mounting hole locations) configured to receive component mounting fasteners for mounting a chemical control component above the top surface of the unified modular block. A top seal cavity rib 838 is preferably arranged along the top surface of unified modular block 800. Top seal cavity rib 834 is preferably contiguous with leak test ports 850.

Unified modular block 800 may be substantially less thick than a multilayer modular block assembly with a similar capability for multi directional fluid flow. Fluid flow path 844 may be considered a vertical flow segment within (i.e., it is oriented substantially vertically over its length. The length 846 of fluid flow path 844 is preferably less than one-third a length and a width of the unified modular block. In addition, a thickness of unified modular block 800 is less than one-half a length and a width of unified modular block 800.

The length and width of unified modular block 800 are preferably between line. and 2 in. More preferably, the length and width of unified modular block 800 are preferably between 1.547 and 1.75. In another embodiment, the length and width of unified modular block 800 are preferably between 1.586 and 1.647.

The depth of component fastener receiving elements 802 may be 0.3 in. to 0.33 in. Unified modular block 800 preferably has a thickness 824 sufficiently great to provide proper clearance for the chemical control component fasteners that may be inserted in component fastener receiving elements 802 and to comply with an applicable SEMI standard, preferably SEMI 2787.1.

And as stated above, unified modular block 800 preferably provides both upper and lower axial connection locations that allow the block to be coupled to other laterally adjacent blocks in a modular chemical delivery system. Preferably, thickness 824 is also sufficiently thick to provide space for these axial connection locations. Likewise, thickness 824 is preferably sufficient to provide the necessary surface area for all axial connection locations without violating compliance standards for minimal wall thickness of the fluid flow paths within the block provided in an applicable ASTM (American Society For Testing and Materials, West Conshohocken, Pa.) specification (e.g., A-269, A-270, and A-632 (0.035 in. wall thickness)).

In addition, top sealing interfaces 814 are preferably arranged about top fluid flow path bore holes 834. Axial sealing interfaces 852 are preferably arranged around each axial bore hole of modular block 800. Fluid path bore internal diameter 822 is preferably 0.18 in., and the diameters of all top sealing interfaces 814 and axial sealing interfaces 852 are preferably about 0.29 inches. Modular block 800 preferably has a thickness 824 capable of allowing for such feature sizes.

Consequently, the minimum mechanical interface depth 810 is preferably at least about 0.5 in. In addition, thickness 824 of unified block 800 is preferably at least about 0.6 in. and more preferably at least 0.63 in. As explained above, it is desirable to limit the height of a modular chemical delivery system. But if, for example, the depths of component fastener receiving elements 802 and/or the space required for the axial connection locations is smaller, than thickness 824 may be smaller as well.

Furthermore, thickness 824 of unified modular block 800 is preferably at most about 1 in. Limiting the thickness of unified modular block 800 may have additional benefits. The length of vertical fluid flow path 846 in large part determined by thickness 824 of unified modular block 800. In general, the longer the length of vertical flow path 846, the longer the dry down time when an inert gas carrier is used to dry out the moisture content of the chemical system will be. Consequently, it may be beneficial to keep the thicknesses of unified modular block 800 below, e.g., 1 in.

The dimensions of the various connection locations, bore holes and like elements for modular blocks 800 are preferably configured such that there is minimal, and preferably no, mechanical interference therebetween. This goal is preferably achieved while maintaining top accessibility modular block 800.

Given the preferred dimensions described above, the areas in which fasteners can be placed will be somewhat limited if mechanical interference is to be avoided. The a center-to-center spacing 826 of first and second upper axial receiving elements 816 and 817 and the center-to-center spacing 828 of first and second lower axial receiving elements 836 and 837 may be one that ensures that, when inserted, the local side to side fasteners do not interfere with other features of each modular block, such as the axial bore holes. Preferably, the center-to-center spacings 826 and 828 are at least about 0.6 in., and may be 0.620 in. The center-to-center spacing 804 of component fastener receiving elements 802 is preferably less than about 1.2 in., and more preferably is 1.188 in.

Figure 18A:
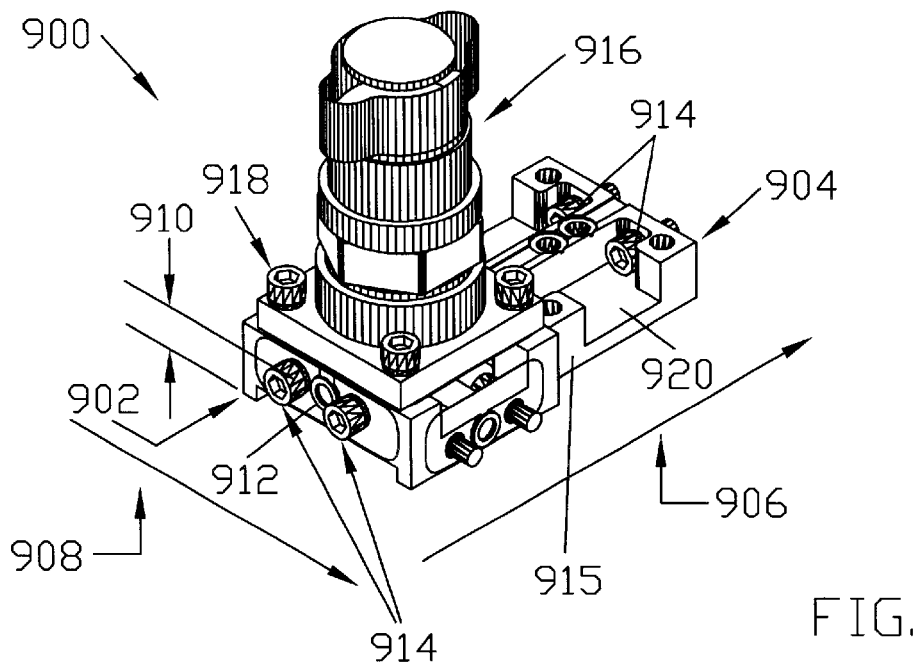
FIG. 18A is a perspective view of a modular block assembly in accordance with an embodiment.
Figure 18B:
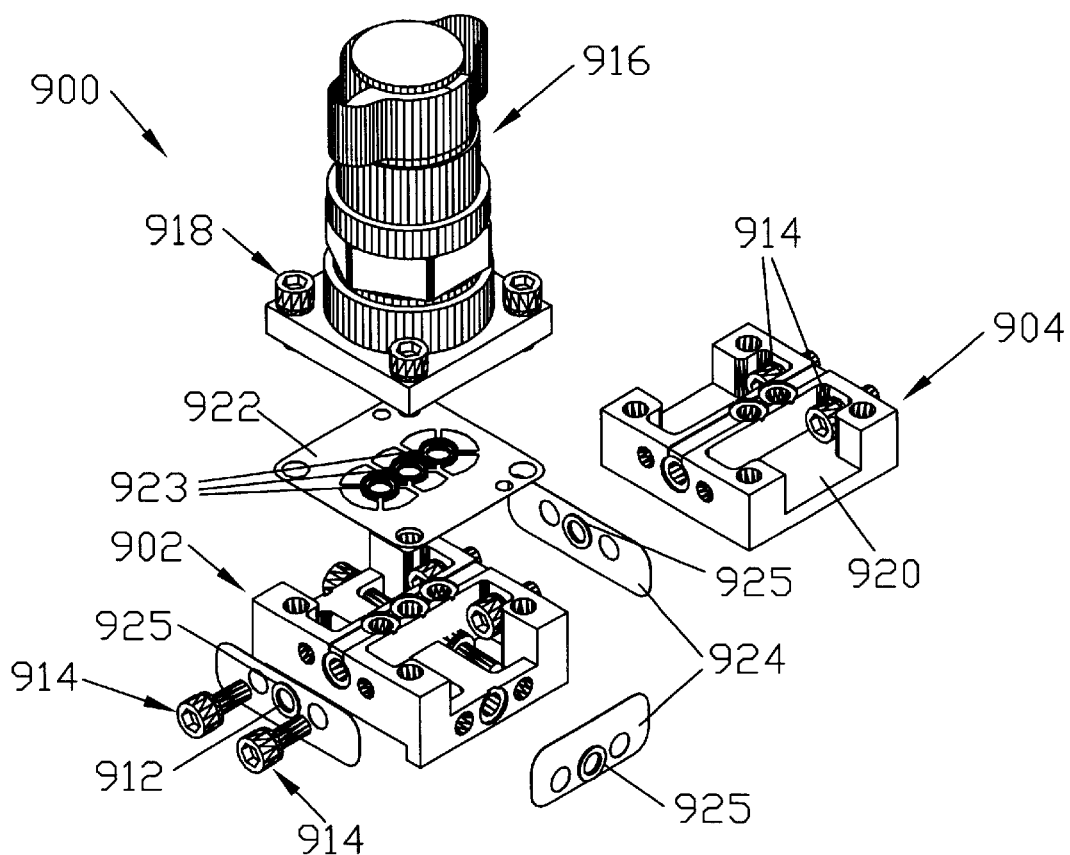
FIG. 18B is an exploded view of the modular block assembly shown in FIG. 18A.

Exemplary embodiments of a modular chemical delivery system incorporating one or more unified modular blocks and having one or more of the above-described features are shown in the Drawings. FIGS. 18A and 18B present a perspective and an exploded view of modular block assembly 900. Modular block assembly 900 is configured to direct fluid flow in multiple, horizontally transverse directions. Modular block assembly preferably includes unified modular block 902, which may coupled to single flow direction block 904. Unified modular block 902 may be configured similarly to unified modular block 800. Preferably, unified modular block 902 is configured to transport fluid flow therethrough along directional flow line 906 and along transverse directional flow line 908. Flow along directional flow line 906 may be a process flow, and flow along transverse directional line 908 may be a purge flow. Directional flow line 906 will preferably be parallel to the horizontal orientation of the uppermost fluid flow paths in modular block 900.

Single flow direction modular block 904 is preferably configured to transport fluid flow along directional flow line 906. Single flow direction block 904 is preferably configured similarly to single direction flow block 646. In order to be properly and securely coupled to unified modular block 902, single flow direction modular block 904 preferably has similar dimensions (e.g., center-to-center spacing of axial connection locations) as unified modular block 902.

Unified modular block 902 is preferably configured to interface with a chemical control component mounted above the top surface of unified modular block 902. Likewise, single flow direction block 904 is preferably configured to interface with a chemical control component mounted upon its top surface. Chemical control component 916 is preferably mounted above the top surface of unified modular block 902 using chemical control component fasteners 918 threadably inserted into a plurality of component fastener receiving elements defined in the top surface of modular block 902. Unified modular block 902 includes top fluid path bore holes preferably configured to transport fluid between unified modular block 902 and chemical control component 916.

Unified modular block 900 and single flow direction block 904 may be coupled together using fasteners such as local side-to-side fasteners 914. Fluid flow paths of coupled modular blocks of modular block assembly 900 are preferably sealably connected by sealing joints formed therebetween. Each modular block of modular block assembly 900 preferably includes a pair of axial fluid flow path bore holes defined in exterior surfaces of respective axial interface flanges of each modular block. A axial sealing interface is preferably arranged around each axial fluid flow path bore hole. Each modular block of modular block assembly 900 also preferably includes at least on top fluid flow path bore hole defined in the respective top surface of each block. Top sealing interfaces are preferably arranged around the top fluid flow path bore holes. Axial and top sealing interfaces are preferably configured as counterbore sealing cavities.

Sealing members (e.g., seals) may be arranged between and in contact with coupled ones of the plurality of modular blocks to sealably connect the adjacent fluid flow paths of each modular block. Each sealing element preferably includes a sealing gasket configured to interface with the sealing interfaces of the fluid plow paths it is configured to sealably connect. Axial seals 924 are preferably configured to sealably connect fluid flow paths laterally adjacent modular blocks, such as unified modular block 902 and single direction flow block 904. Axial seal gaskets 925 are preferably configured to interface with the axial sealing interfaces of the blocks whose fluid flow paths it seals. A sealing joint 915 is preferably formed between unified modular block 902 and single flow direction modular block 904 when the two blocks are coupled together. Component interface seal 922 is preferably configured to sealably connect the fluid flow paths of unified modular block 902 to those of chemical control component 916. Preferably, component interface seal 922 sealably connects the top fluid flow path bore holes of unified modular block 902 to bottom fluid flow path bore holes of chemical control component 916. Sealing joints 915 are preferably formed between laterally adjacent modular blocks to connect at least one of the fluid flow paths of each coupled one of the plurality of unified modular blocks. Component interface seal gaskets 923 are preferably configured to interface with the top sealing interfaces of top layer modular block 902 and the respective bottom sealing interfaces of chemical control component 916.

A further embodiment is directed to a method of using a modular chemical delivery system. The method involves transporting fluid flow through a plurality of unified modular blocks. Each of the plurality of modular blocks preferably includes a first fluid flow path for transporting fluid flow through the modular block at least partially in a first direction. The first fluid flow path preferably includes a first axial bore hole in a first exterior surface of the unified modular block. Each of the plurality of modular blocks also preferably includes a second fluid flow path for transporting fluid flow through the modular block at least partially in a second direction. The second direction is preferably horizontally transverse to the first direction. The second fluid flow path preferably has a second axial bore hole in a second exterior surface of the unified modular block. Additionally, each of the plurality of modular blocks may further include a first axial connection location configured to allow the modular block to be coupled to another modular block laterally adjacent to the first axial bore hole, and a second axial connection location configured to allow the modular block to be coupled to a modular block laterally adjacent to the second axial bore hole. A plurality of local side-to-side fasteners each preferably couples ones of the plurality of unified modular blocks to other, laterally adjacent ones of the plurality of unified modular blocks.

In an embodiment, the plurality of fasteners is a plurality of local side-to-side fasteners configured to couple laterally adjacent unified modular blocks and arranged such that each of the plurality of local side-to-side fasteners is accessible from directly above the top surface of each of the plurality of modular blocks. Additionally, each of the plurality of modular blocks is preferably coupled to at least one other, laterally adjacent, modular block. Sealing joints are preferably formed between laterally adjacent modular blocks to connect at least one of the fluid flow paths of each coupled one of the plurality of unified modular blocks. Transporting fluid flow through a plurality of unified modular blocks then preferably includes transporting a fluid flow from a fluid flow path of one of the plurality of unified modular blocks to a fluid flow path of another one of the plurality of modular blocks through a sealing joint formed between the modular blocks.

In an embodiment, a first one of the plurality of unified modular blocks is configured to interface with a chemical control component. Fluid flow may be transported into the first one of the plurality of unified modular blocks through a first axial bore hole in a lateral surface of the first one of the plurality of modular blocks. Then, the method may further include, transporting fluid flow from the first one of the plurality of unified modular blocks into the chemical control component through a first top fluid flow path bore hole in a top surface of the first one of the plurality of modular blocks. From the chemical control component, fluid flow may then be transported back into the first one of the plurality of unified modular blocks through a second top fluid flow path bore hole in the top surface of the first one of the plurality of modular blocks. Any of a variety of methods can be used to carry out the transporting of fluid flow, including pumping.

The method may further involve transporting fluid flow from the plurality of modular blocks to a semiconductor processing chamber. In an embodiment, a second fluid flow path of a first one of the plurality of unified modular blocks comprises a second top bore hole, and the method further includes transporting fluid flow from a second axial bore hole to the second top bore hole of the first one of the plurality of modular blocks without passing through a seal.

Figure 19:
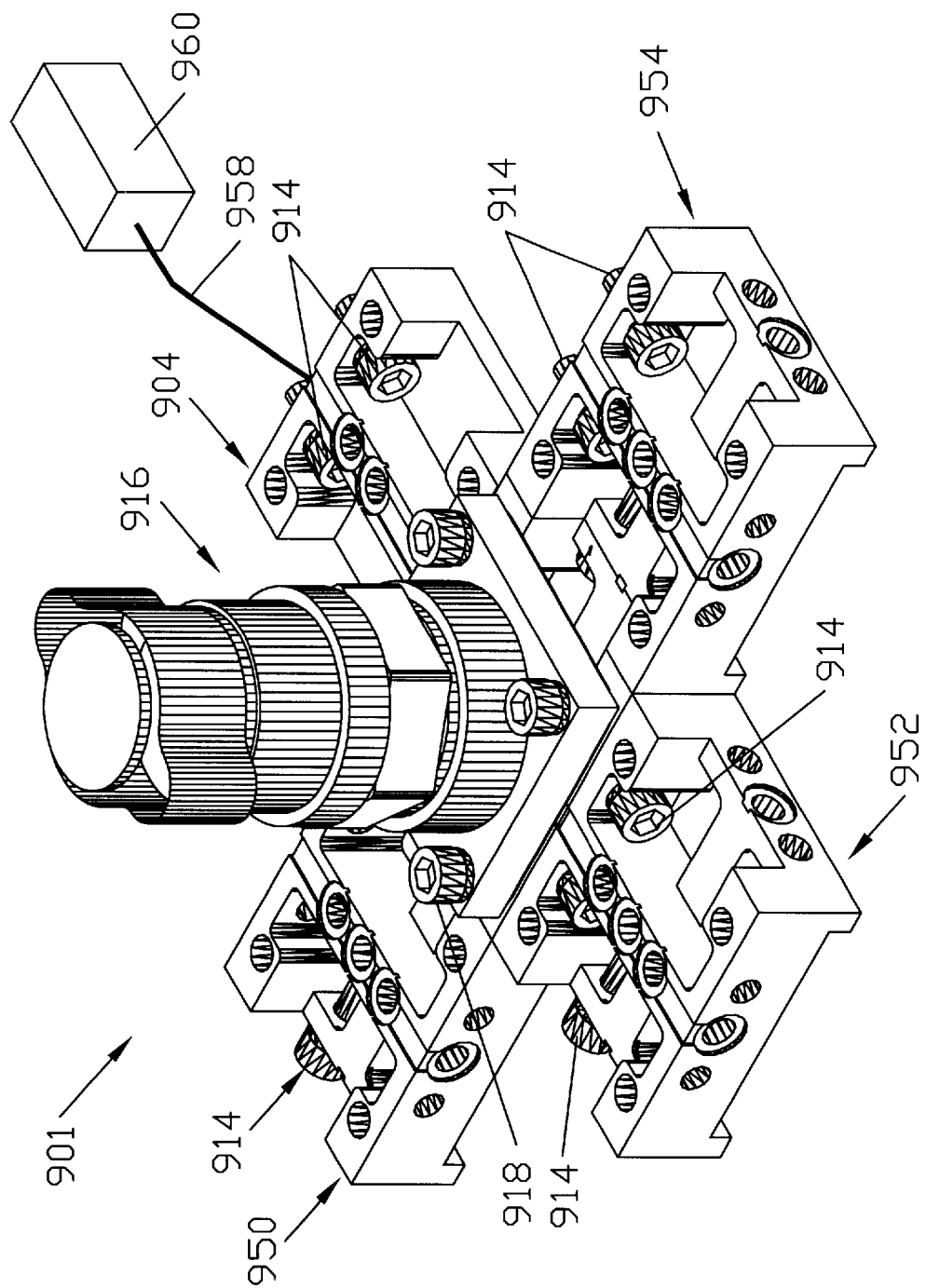
FIG. 19 is a perspective view of a chemical delivery system incorporating the modular block assembly of FIGS. 18A and 18B.

Embodiments of a modular chemical delivery system having one or more of the above-described elements are shown in the Drawings. FIG. 19 presents a perspective view of chemical delivery system 901. Modular chemical delivery system 901 incorporates modular block assembly 900. Chemical control component 916 is shown mounted by control component fasteners 916 onto unified modular block 902 (not visible). Single flow direction modular block 904 is preferably coupled to unified modular block 902 by local side-to-side fasteners 914. Unified modular block 902 may also be coupled to unified modular blocks 950, 952, and 954. Unified modular blocks 950, 952, and 954 are preferably configured similarly to unified modular block 900.

Unified modular blocks 902, 950, 952, and 954 may be coupled in a manner similar to how unified modular block 902 and single flow direction modular block 904 are coupled in FIGS. 18A & 18B. In a preferred embodiment, unified modular blocks 902, 950, 952, and 954 may be coupled such that a first fluid flow path of the unified modular block 902 is connected to a first fluid flow path of the unified modular block 954. In addition, a second fluid flow path of unified modular block 902 may be connected to a second fluid flow path of unified modular block 952. Furthermore, a third fluid flow path unified modular block 902 is preferably configured for transporting fluid flow through the modular block at least partially in the first direction. The third fluid flow path of the unified modular block 902 preferably includes a third axial bore hole in a third exterior surface of the first coupled one of the plurality of unified modular blocks. Single flow direction modular block 904 is preferably coupled to unified modular block 902 such that a first fluid flow path of the single flow direction modular block is connected to the third fluid flow path of unified modular block 902.

Fluid flow paths between unified modular blocks 902, 950, 952, and 954 may be sealably connected in a manner similar to that shown in FIGS. 18A and 18B for fluid flow paths of blocks 902 and 904. For example, each of the unified modular blocks may each include a sealing interface arranged around each fluid flow path bore hole. The sealing interfaces may each be configured as counterbore sealing cavities. Preferably, system 901 includes a plurality of sealing elements arranged between and in contact with coupled ones of the modular blocks. The sealing elements are preferably axial seals. Each of the sealing elements preferably includes a sealing gasket configured to interface with the sealing interfaces of the modular blocks. Coupled ones of the modular blocks shown in FIG. 19 are preferably directly in contact with the sealing member to form the sealing joints. Each of modular blocks 902, 950, 952, and 954 is preferably configured such that decoupling one of the modular blocks from a laterally adjacent modular block does not compromise the integrity of sealing joints existing between any other ones of the modular blocks.

System 901 may also include a semiconductor processing chamber 960. Fluid flow is preferably transported to semiconductor processing chamber 960 through fluid flow line 958. Fluid flow line 958 may include any number of piping sections, valves, and other components. In a preferred embodiment, system 901 may be configured to transport fluid flow from the coupled unified modular blocks to the semiconductor processing chamber.

An embodiment of a method of using a modular chemical delivery system having one or more of the above described-elements may used to transport fluid flow through modular chemical delivery system 901. Fluid flow may be transported through modular chemical delivery system 901 in multiple, horizontally transverse directions. Fluid flow may enter system 901 through axial bore holes of, e.g., unified modular blocks 950, 952, and 954. In an embodiment, fluid flow may be transported into modular block 950, from a fluid flow path of modular block 950 into a fluid flow path of modular block 902 through a sealing joint formed between the modular blocks. Preferably, fluid flow may then be transported into chemical control component 916 through a top borehole in the top surface of unified modular block 902. From control component 916, fluid flow may then be transported back into unified modular block 902 through a second top fluid flow path bore hole in the top surface of unified modular block 902. Any of a variety of methods can be used to carry out the transporting of fluid flow within system 901, including pumping.

The method may further involve transporting fluid flow from the modular blocks to semiconductor processing chamber 960 over fluid line 958. In addition, a second fluid flow path of a unified modular block 902 preferably has a second top bore hole, and the method preferably further includes transporting fluid flow from a second axial bore hole to the second top bore hole of unified modular block 902 without passing through a seal.

FIGS. 20A and 20B are a perspective view and a partial cross-sectional view, respectively, of unified modular block 1000. Unified modular block 1000 is preferably configured to be used as a 2-port inlet left modular block. Unified modular block 1000 preferably includes a first upper axial interface flange 1002. First upper axial interface flange 1002 preferably includes first upper axial connection locations 1006. Unified modular block 1000 also preferably includes a second lower axial interface flange 1005. Second lower axial interface flange 1005 preferably includes second lower axial connection locations 1009. Fluid flow path 1020 has an axial bore hole in an exterior surface of first upper axial interface flange 1002 and a top bore hole in the top surface of unified modular 1000. Fluid flow path 1021 has an axial bore hole in an exterior surface of second lower axial interface flange 1005 and a top bore hole in the top surface of unified modular 1000.

Figure 21B:
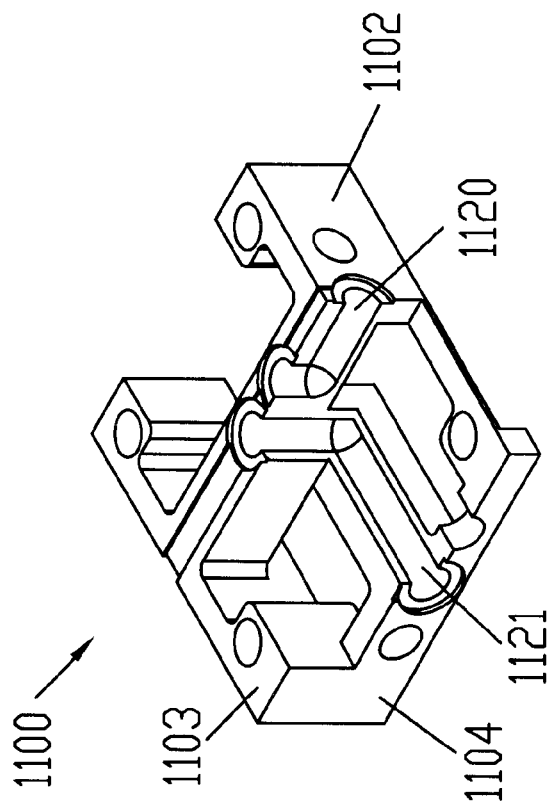
FIG. 21B is a partial cross-sectional view of the unified modular block of FIG. 21A.
Figure 21A:
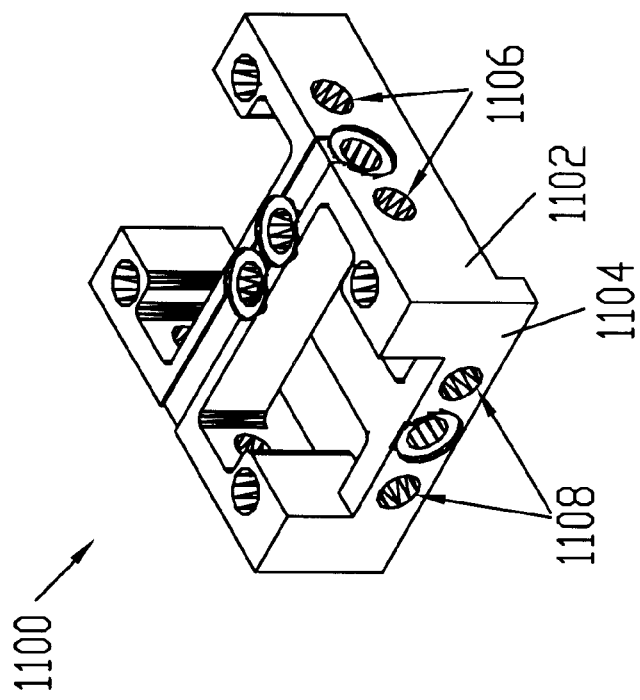
FIG. 21A is a perspective view of a unified modular block in accordance with an embodiment.

FIGS. 21A and 21B are a perspective view and a partial cross-sectional view, respectively, of unified modular block 1100. Unified modular block 1100 is configured to be used a 2-port inlet right modular block. Unified modular block 1100 preferably includes a first upper axial interface flange. First upper axial interface flange 1102 preferably includes first upper axial connection locations 1106. Unified modular block 1100 also preferably includes a first lower axial interface flange 1104 First lower axial interface flange 1104 preferably includes first lower axial connection locations 1108. Fluid flow path 1120 has an axial bore hole in an exterior surface of first upper axial interface flange 1102 and a top bore hole in the top surface of unified modular block 1100. Fluid flow path 1121 has an axial bore hole in an exterior surface of first lower axial interface flange 1104 and a top bore hole in the top surface of unified modular block 1100.

Figure 22B:
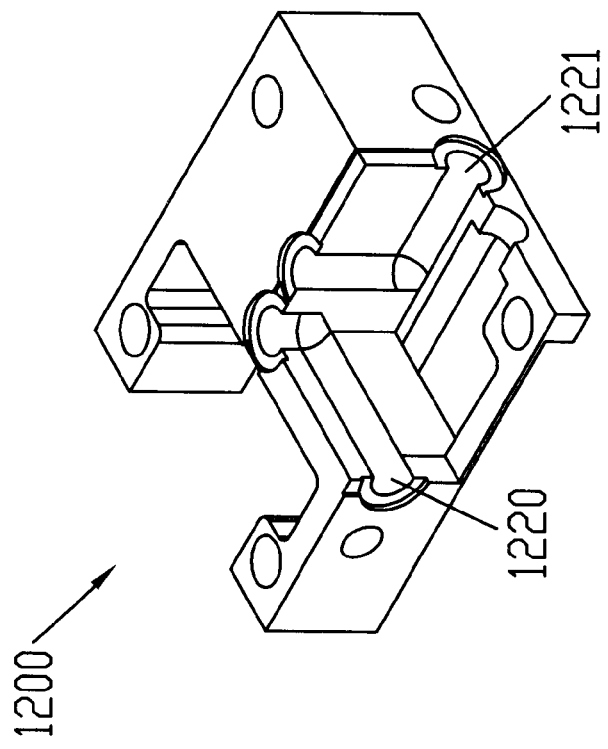
FIG. 22B is a partial cross-sectional view of the unified modular block of FIG. 22A.
Figure 22A:
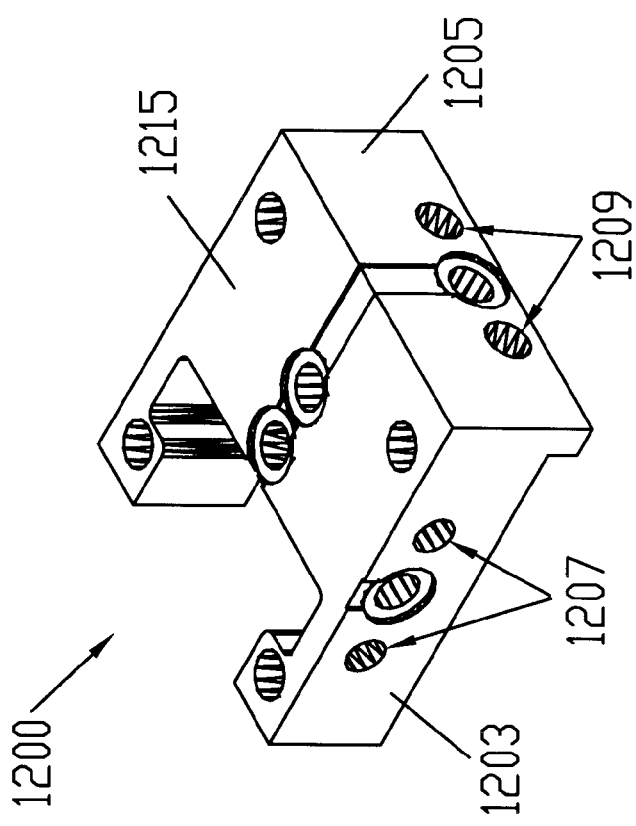
FIG. 22A is a perspective view of a unified modular block in accordance with an embodiment.

FIGS. 22A and 22B are a perspective view and a partial cross-sectional view, respectively, of unified modular block 1200. Unified modular block 1200 is configured to be used as a 2-port outlet right modular block. Unified modular block 1200 preferably includes and a second upper axial interface flange 1203. Second upper axial interface flange 1203 preferably includes first upper axial connection locations 1207. Unified modular block 1200 also preferably includes a second lower axial interface flange 1205. Second lower axial interface flange 1205 preferably includes second lower axial connection locations 1209. Interface web 1215 extends from first upper axial interface flange 1202 to second upper axial interface flange 1203. Both axial connection locations 1209 and one of axial connection locations 1207 are substantially obstructed by interface web 1215. Fluid flow path 1220 has an axial bore hole in an exterior surface of second upper axial interface flange 1203 and a top bore hole in the top surface of unified modular block 1200. Fluid flow path 1221 has an axial bore hole in an exterior surface of second lower axial interface flange 1205 and a top bore hole in the top surface of unified modular block 1200.

Figure 23B:
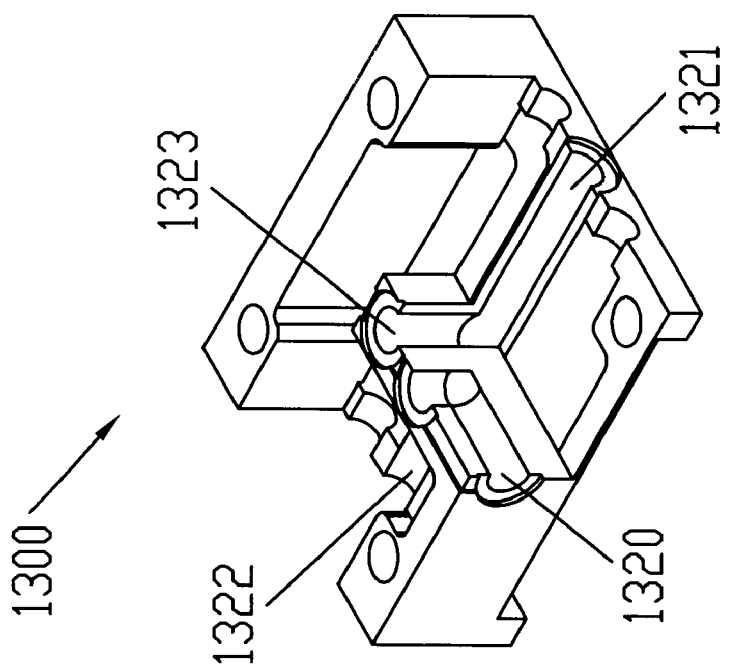
FIG. 23B is a partial cross-sectional view of the unified modular block of FIG. 23A.
Figure 23A:
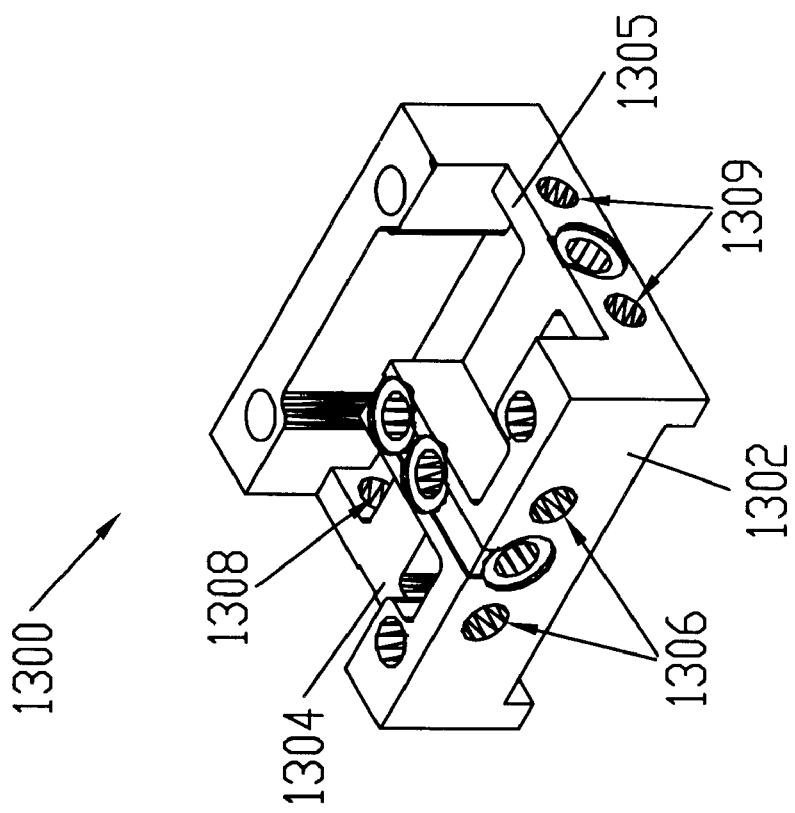
FIG. 23A is a perspective view of a unified modular block in accordance with an embodiment.

FIGS. 23A and 23B are a perspective view and a partial cross-sectional view, respectively, of unified modular block 1300. Unified modular block 1300 is configured to be used as a 2-port inlet tee modular block. Unified modular block 1300 preferably includes a first upper axial interface flange 1302. First upper axial interface flange 1302 preferably includes first upper axial connection locations 1306. Unified modular block 1300 also preferably includes a first lower axial interface flange 1304 and a second lower axial interface flange 1305. First lower axial interface flange 1304 preferably includes first lower axial connection locations 1308. Second lower axial interface flange 1305 preferably includes second lower axial connection locations 1309. Fluid flow path 1320 has an axial bore hole in an exterior surface of first upper axial interface flange 1302 and a top bore hole in the top surface of unified modular block 1300. Fluid flow path 1321 has an axial bore hole in an exterior surface of second lower axial interface flange 1305 and fluid flow path 1322 has an axial bore hole in an exterior surface of first lower axial interface flange 1304. Fluid flow path 1321 and fluid flow path 1322 are preferably in fluid communication and both lead into fluid flow path 1323, which has a top bore hole in the top surface of unified modular block 1300.

Figure 24B:
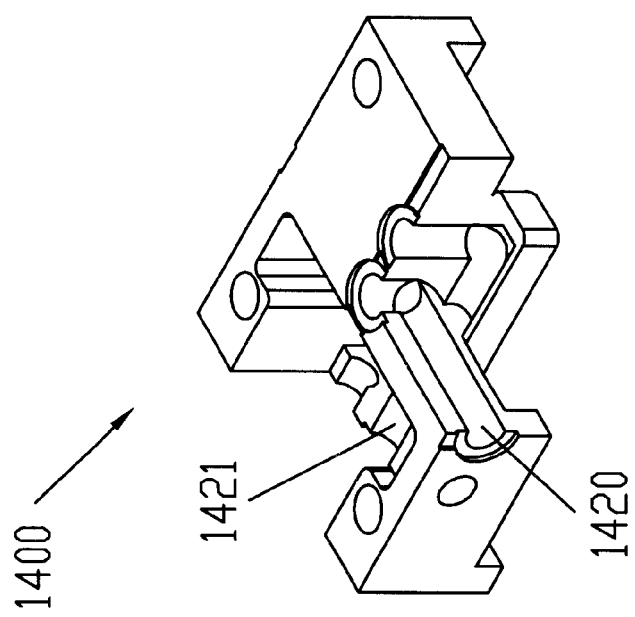
FIG. 24B is a partial cross-sectional view of the unified modular block of FIG. 24A.
Figure 24A:
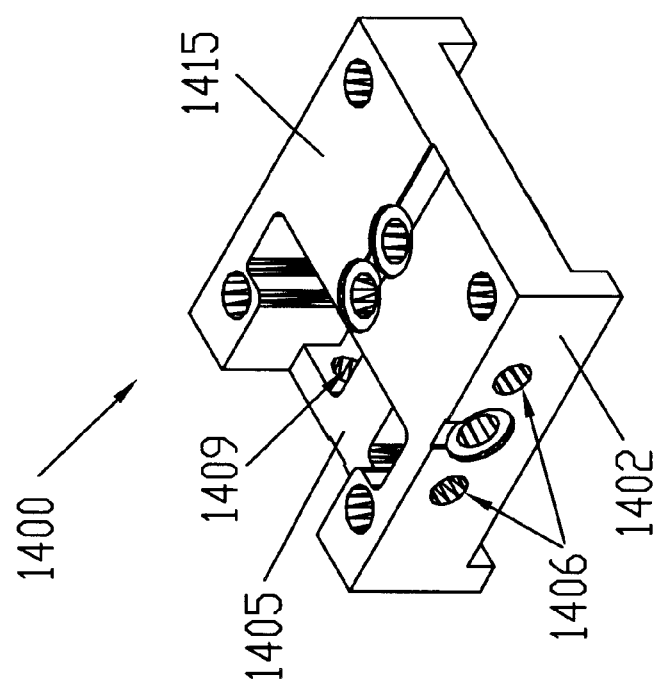
FIG. 24A is a perspective view of a unified modular block in accordance with an embodiment.

FIGS. 24A and 24B are a perspective view and a partial cross-sectional view, respectively, of unified modular block

1400. Unified modular block 1400 is configured to be used as a 2-port outlet left modular block. Unified modular block 1400 preferably includes a first upper axial interface flange 1402. First upper axial interface flange 1402 preferably includes first upper axial connection locations 1406. Unified modular block 1400 also preferably includes a second lower axial interface flange 1405. Second lower axial interface flange 1405 preferably includes second lower axial connection locations 1409. Interface web 1415 extends from first upper axial interface flange 1402 to second upper axial interface flange 1403. One of axial connection locations 1406 may be substantially obstructed by interface web 1415. Fluid flow path 1420 has an axial bore hole in an exterior surface of first upper axial interface flange 1402 and a top bore hole in the top surface of unified modular block 1400. Fluid flow path 1421 has an axial bore hole in an exterior surface of second lower axial interface flange 1405 and a top bore hole in the top surface of unified modular block 1400.

Figure 25B:
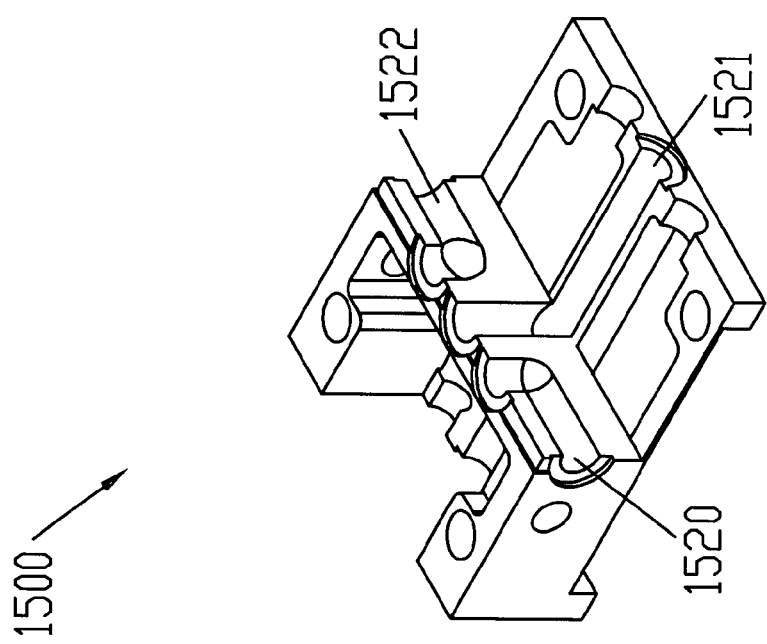
FIG. 25B is a partial cross-sectional view of the unified modular block of FIG. 25A.
Figure 25A:
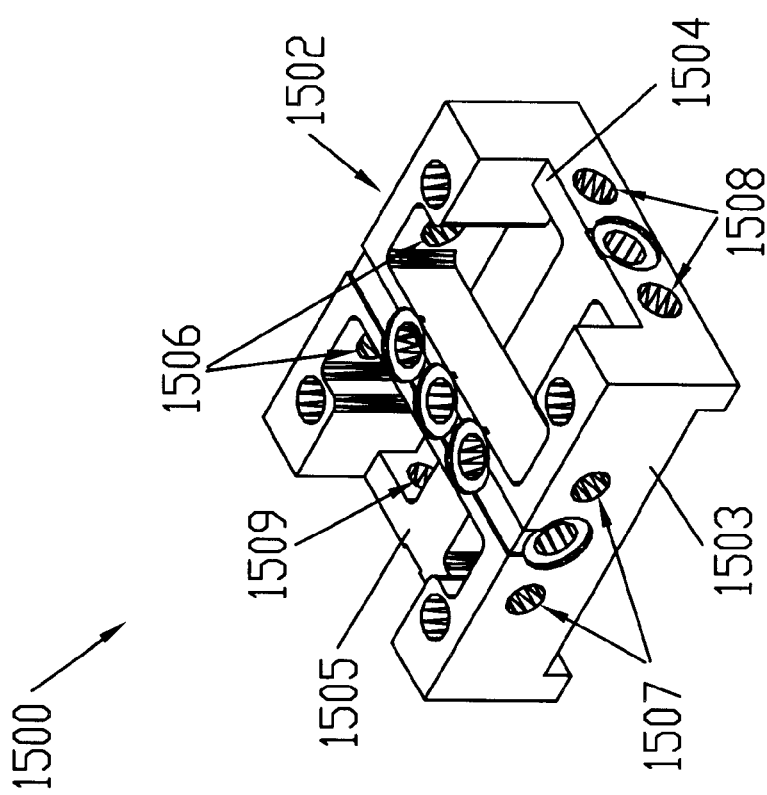
FIG. 25A is a perspective view of a unified modular block in accordance with an embodiment.

FIGS. 25A and 25B are a perspective view and a partial cross-sectional view, respectively, of unified modular block 1500. Unified modular block 1500 is configured to be used as a 3-port tee modular block. Unified modular block 1500 preferably includes a first upper axial interface flange 1502 and a second upper axial interface flange 1503. First upper axial interface flange 1502 preferably includes first upper axial connection locations 1506. Second upper axial interface flange 1503 preferably includes second upper axial connection locations 1507. Unified modular block 1500 also preferably includes a first lower axial interface flange 1504 and a second lower axial interface flange 1505. First lower axial interface flange 1504 preferably includes first lower axial connection locations 1508. Second lower axial interface flange 1505 preferably includes second lower axial connection locations 1509. Fluid flow path 1520 has an axial bore hole in an exterior surface of second upper axial interface flange 1503 and a top bore hole in the top surface of unified modular block 1500. Fluid flow path 1521 has an axial bore hole in an exterior surface of first lower axial interface flange 1504 and a top bore hole in the top surface of unified modular block 1500. Fluid flow path 1522 has an axial bore hole in an exterior surface of first upper axial interface flange 1502 and a top bore hole in the top surface of unified modular block 1500.

Figure 26B:
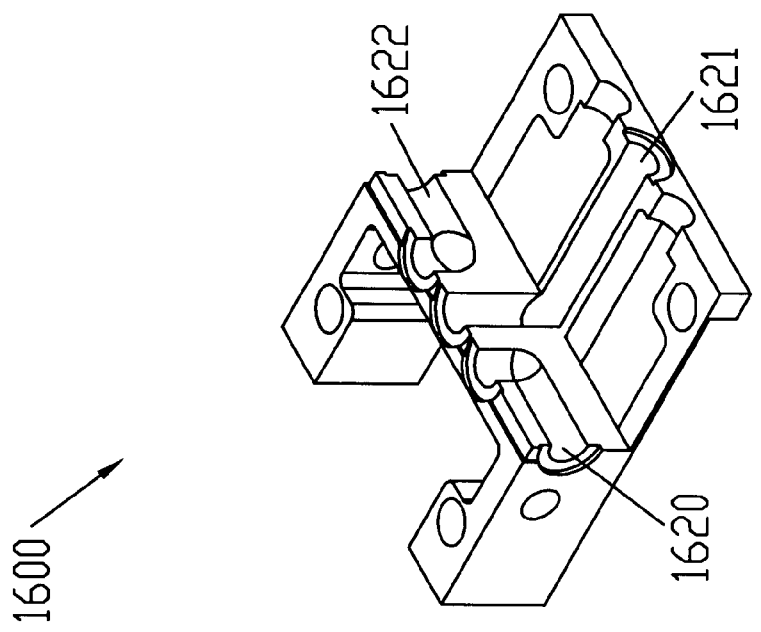
FIG. 26B is a partial cross-sectional view of the unified modular block of FIG. 26A.
Figure 26A:
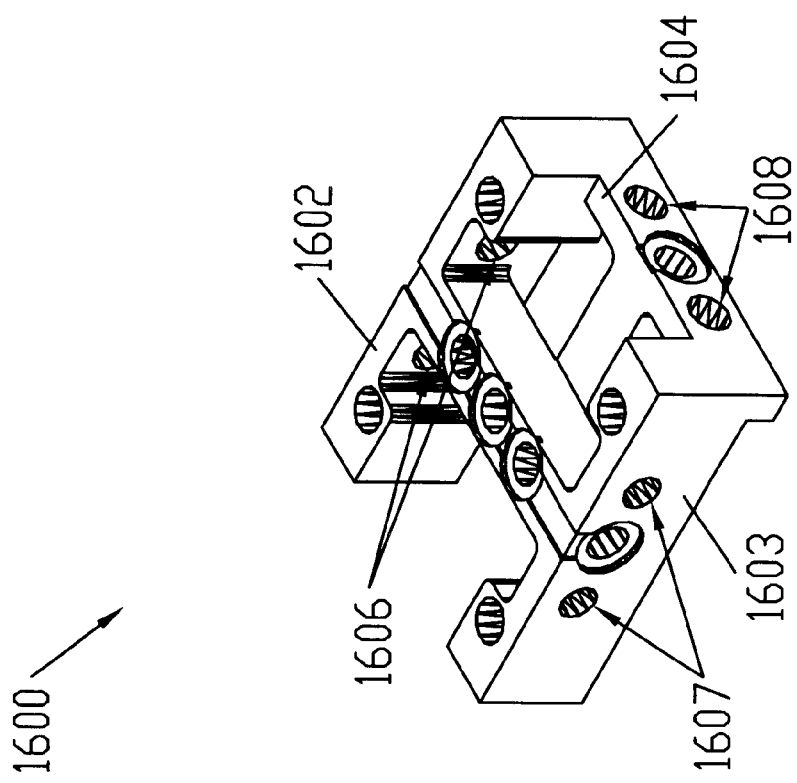
FIG. 26A is a perspective view of a unified modular block in accordance with an embodiment.

FIGS. 26A and 26B are a perspective view and a partial cross-sectional view, respectively, of unified modular block 1600. Unified modular block 1600 is configured to be used as a 3-port right modular block. Unified modular block 1600 preferably includes a first upper axial interface flange 1602 and a second upper axial interface flange 1603. First upper axial interface flange 1602 preferably includes first upper axial connection locations 1606. Second upper axial interface flange 1603 preferably includes second upper axial connection locations 1607. Unified modular block 1600 also preferably includes a first lower axial interface flange 1604. First lower axial interface flange 1604 preferably includes first lower axial connection locations 1608. Fluid flow path 1620 has an axial bore hole in an exterior surface of second upper axial interface flange 1603 and a top bore hole in the top surface of unified modular block 1600. Fluid flow path 1621 has an axial bore hole in an exterior surface of first lower axial interface flange 1604 and a top bore hole in the top surface of unified modular block 1600. Fluid flow path 1622 has an axial bore hole in an exterior surface of first upper axial interface flange 1602 and a top bore hole in the top surface of unified modular block 1600.

FIGS. 27A and 27B are a perspective view and a partial cross-sectional view, respectively, of unified modular block 1700. Unified modular block 1700 is configured to be used as a 3-port left modular block. Unified modular block 1700 preferably includes a first upper axial interface flange 1702 and a second upper axial interface flange 1703. First upper axial interface flange 1702 preferably includes first upper axial connection locations 1706. Second upper axial interface flange 1703 preferably includes second upper axial connection locations 1707. Unified modular block 1700 also preferably includes a second lower axial interface flange 1705. Second lower axial interface flange 1705 preferably includes second lower axial connection locations 1709. Fluid flow path 1720 has an axial bore hole in an exterior surface of first upper axial interface flange 1702 and a top bore hole in the top surface of unified modular block 1700. Fluid flow path 1721 has an axial bore hole in an exterior surface of second upper axial interface flange 1703 and a top bore hole in the top surface of unified modular block 1700. Fluid flow path 1722 has an axial bore hole in an exterior surface of second lower axial interface flange 1705 and a top bore hole in the top surface of unified modular block 1700.

Figure 28B:
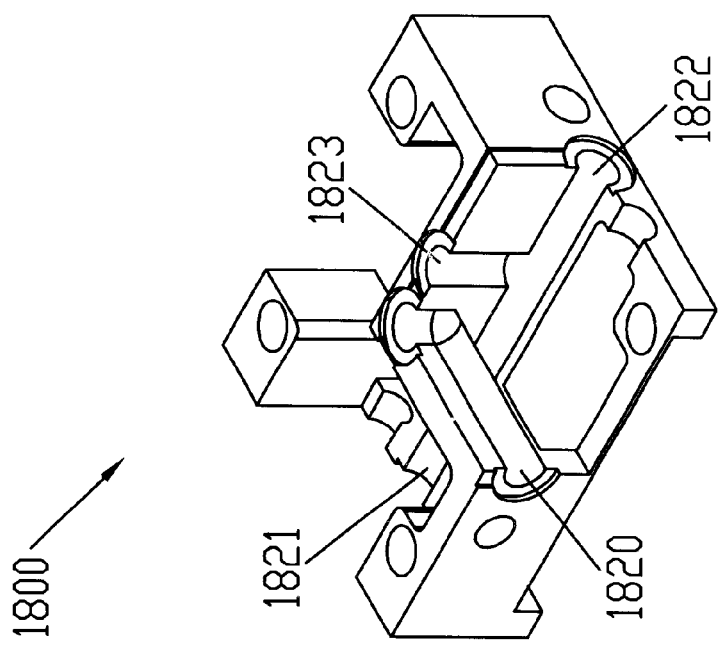
FIG. 28B is a partial cross-sectional view of the unified modular block of FIG. 28A.
Figure 28A:
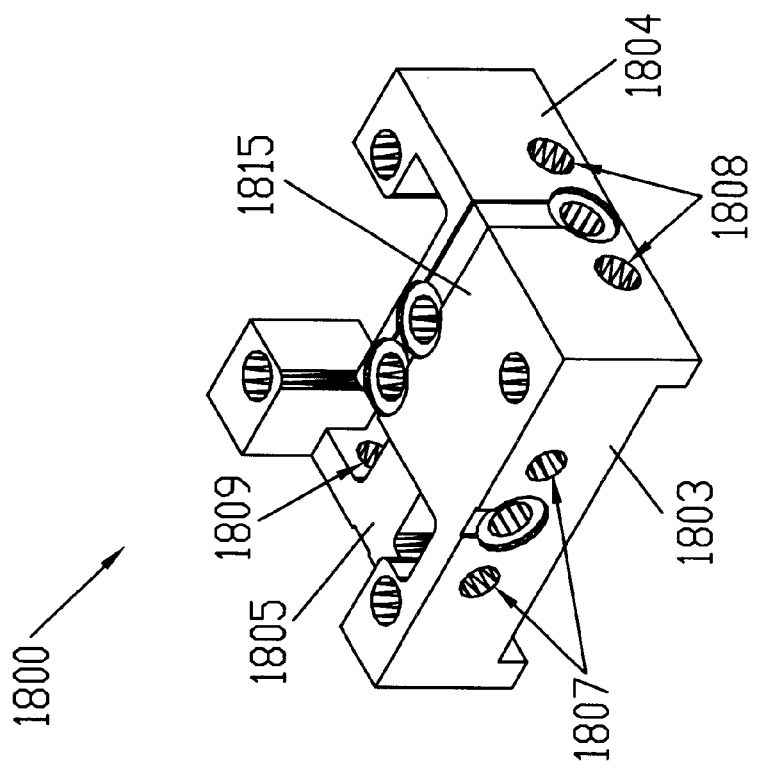
FIG. 28A is a perspective view of a unified modular block in accordance with an embodiment.

FIGS. 28A and 28B are a perspective view and a partial cross-sectional view, respectively, of unified modular block 1800. Unified modular block 1800 is configured to be used as a 2-port outlet tee modular block. Unified modular block 1800 preferably includes a second upper axial interface flange 1803. Second upper axial interface flange 1803 preferably includes second upper axial connection locations 1807. Unified modular block 1800 also preferably includes a first lower axial interface flange 1804 and a second lower axial interface flange 1805. First lower axial interface flange 1804 preferably includes first lower axial connection locations 1808. Second lower axial interface flange 1805 preferably includes second lower axial connection locations 1809. Interface web 1815 extends partially between first upper axial interface flange 1803 to second upper axial interface flange 1804. One of axial connection locations 1808 and one of axial connection locations 1807 are substantially obstructed by interface web 1815. Fluid flow path 1820 has an axial bore hole in an exterior surface of second upper axial interface flange 1803 and a top bore hole in the top surface of unified modular block 1800. Fluid flow path 1821 has an axial bore hole in an exterior surface of second lower axial interface flange 1805 and fluid flow path 1822 has an axial bore hole in an exterior surface of first axial interface flange 1804. Fluid flow path 1821 and fluid flow path 1822 are preferably in fluid communication, and both lead into fluid flow path 1823, which has a top bore hole in the top surface of unified modular block 1800.

Figure 29B:
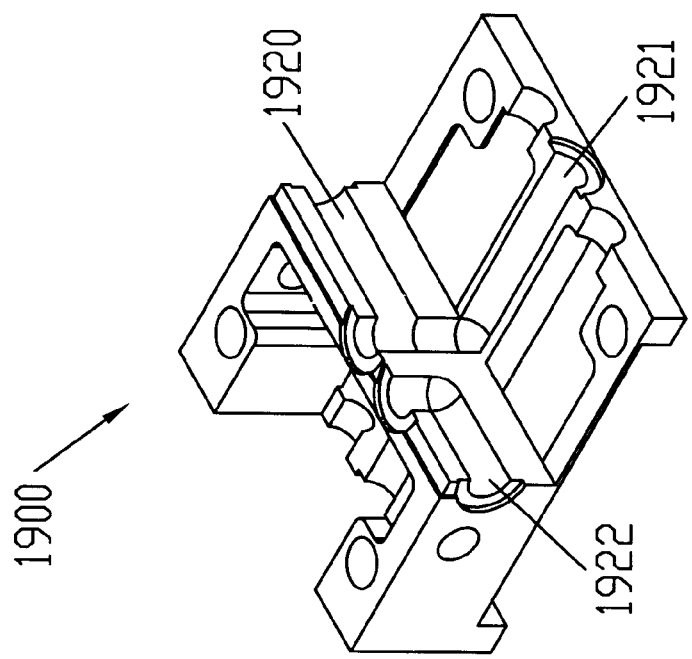
FIG. 29B is a partial cross-sectional view of the unified modular block of FIG. 29A.
Figure 29A:
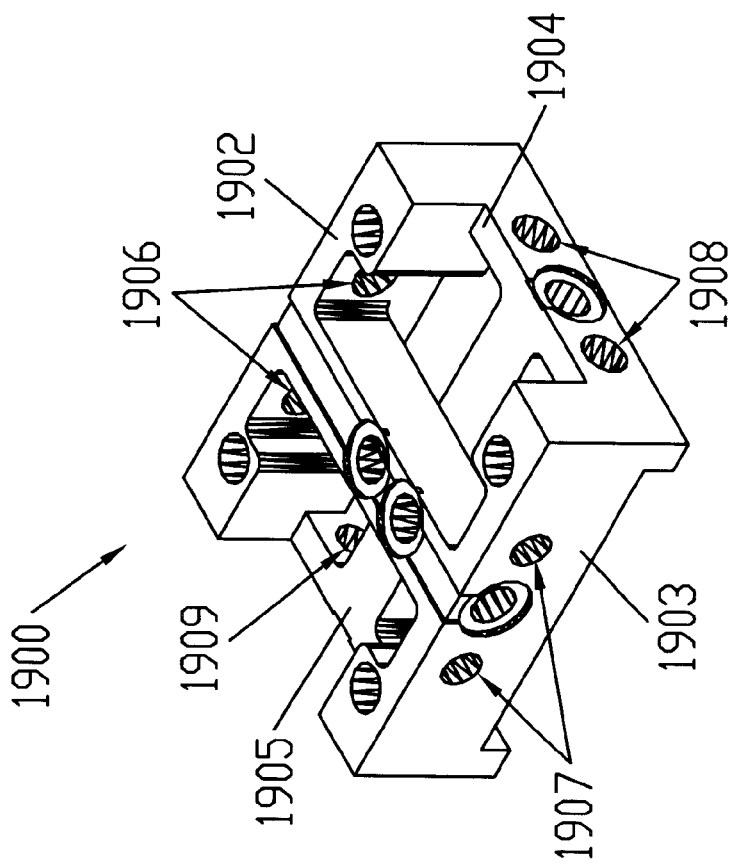
FIG. 29A is a perspective view of a unified modular block in accordance with an embodiment.

FIGS. 29A and 29B are a perspective view and a partial cross-sectional view, respectively, of unified modular block 1900. Unified modular block 1900 is configured to be used as a downstream header tee modular block. Unified modular block 1900 preferably includes a first upper axial interface flange 1902 and a second upper axial interface flange 1903. First upper axial interface flange 1902 preferably includes first upper axial connection locations 1906. Second upper axial interface flange 1903 preferably includes second upper axial connection locations 1907. Unified modular block 1900 also preferably includes a first lower axial interface flange 1904 and a second lower axial interface flange 1905. First lower axial interface flange 1904 preferably includes first lower axial connection locations 1908. Second lower axial interface flange 1905 preferably includes second lower axial connection locations 1909. Fluid flow path 1922 has an axial bore hole in an exterior surface of second upper axial interface flange 1903 and a top bore hole in the top surface of unified modular block 1900. Fluid flow path 1920 has an axial bore hole in an exterior surface of first upper axial interface flange 1902 and a top bore hole in the top surface of unified modular block 1900. Fluid flow path 1921 has an axial bore hole in an exterior surface of first lower axial interface flange 1904 is in fluid communication with fluid flow path 1920.

Figure 30B:
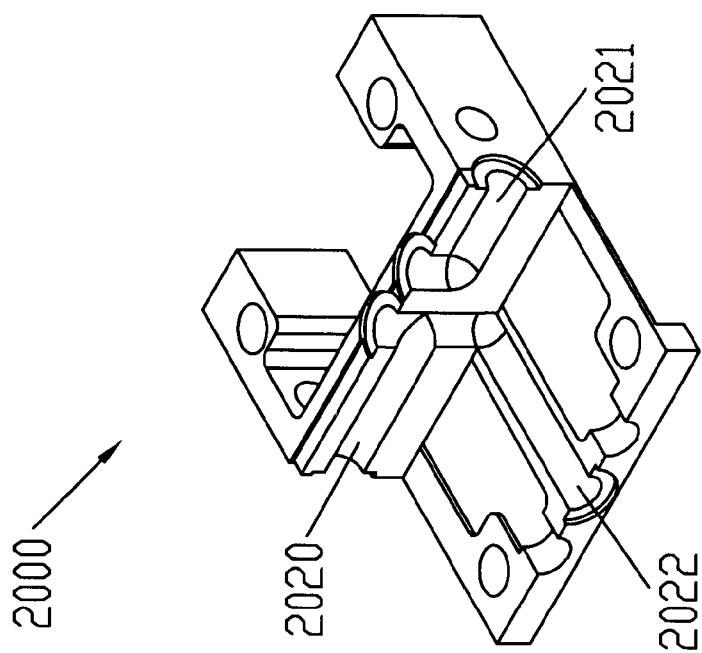
FIG. 30B is a partial cross-sectional view of the unified modular block of FIG. 30A.
Figure 30A:
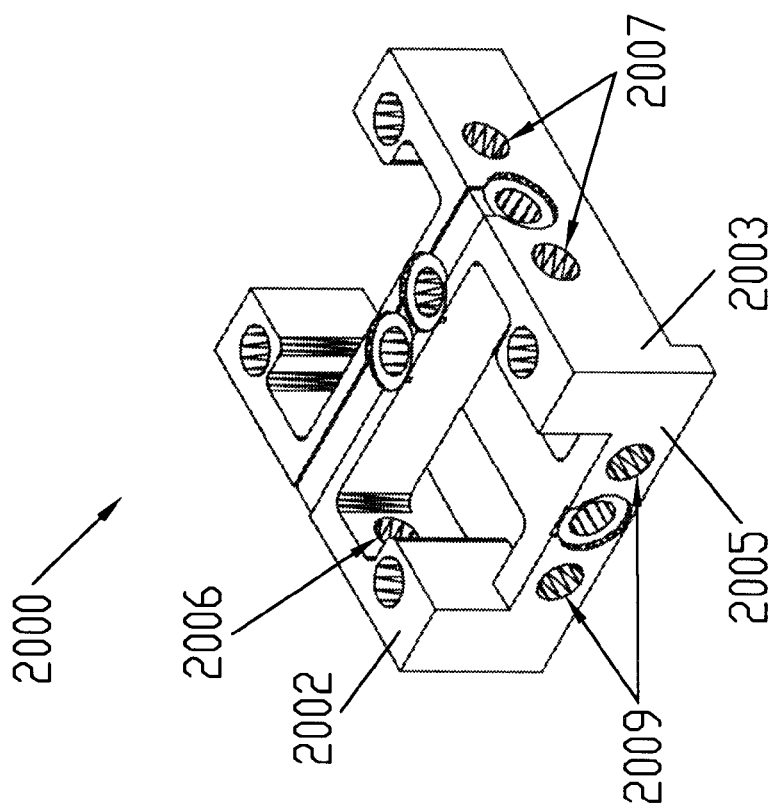
FIG. 30A is a perspective view of a unified modular block in accordance with an embodiment.

FIGS. 30A and 30B are a perspective view and a partial cross-sectional view, respectively, of unified modular block 2000. Unified modular block 2000 is configured to be used as a downstream header left modular block. Unified modular block 2000 preferably includes a first upper axial interface flange 2002 and a second upper axial interface flange 2003. First upper axial interface flange 2002 preferably includes first upper axial connection locations 2006. Second upper axial interface flange 2003 preferably includes second upper axial connection locations 2007. Unified modular block 2000 also preferably includes and a second lower axial interface flange 2005. Second lower axial interface flange 2005 preferably includes second lower axial connection locations 2009. Fluid flow path 2021 has an axial bore hole in an exterior surface of second upper axial interface flange 2003 and a top bore hole in the top surface of unified modular block 2000. Fluid flow path 2020 has an axial bore hole in an exterior surface of first upper axial interface flange 2002 and a top bore hole in the top surface of unified modular block 2000. Fluid flow path 2022 has an axial bore hole in an exterior surface of second lower axial interface flange 2005, and preferably is in fluid communication with fluid flow path 2020.

Figure 31B:
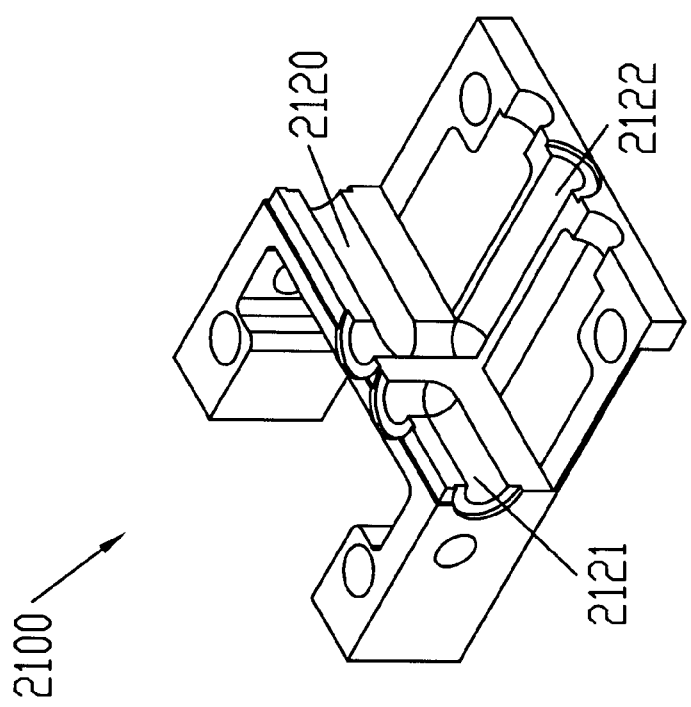
FIG. 31B is a partial cross-sectional view of the unified modular block of FIG. 31A.
Figure 31A:
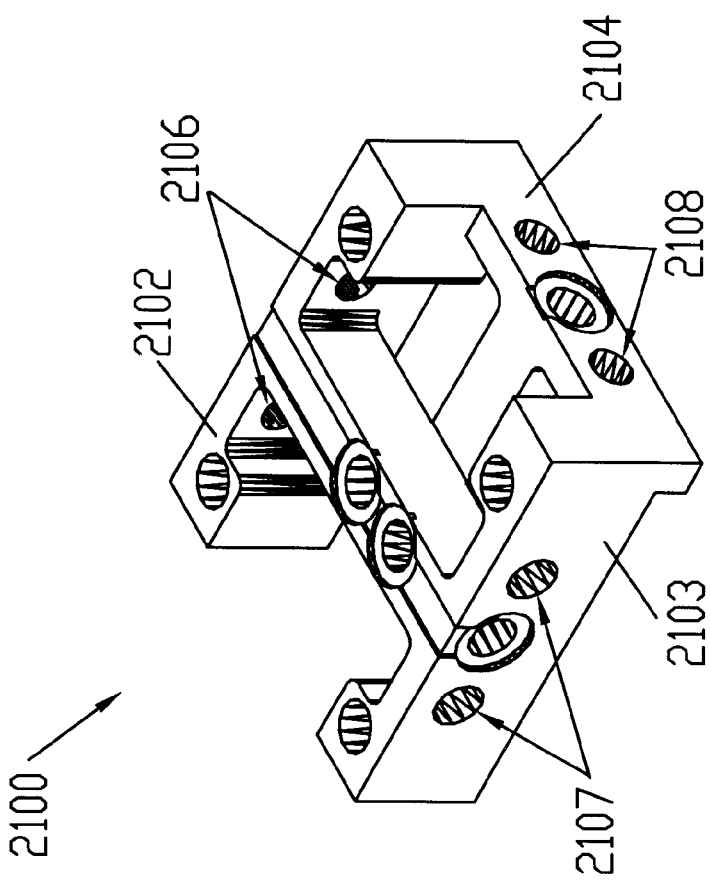
FIG. 31A is a perspective view of a unified modular block in accordance with an embodiment.

FIGS. 31A and 31B are a perspective view and a partial cross-sectional view, respectively, of unified modular block 2100. Unified modular block 2100 is configured to be used as a downstream header right modular block. Unified modular block 2100 preferably includes a first upper axial interface flange 2102 and a second upper axial interface flange 2103. First upper axial interface flange 2102 preferably includes first upper axial connection locations 2106. Second upper axial interface flange 2103 preferably includes second upper axial connection locations 2107. Unified modular block 2100 also preferably includes a first lower axial interface flange 2104. First lower axial interface flange 2104 preferably includes first lower axial connection locations 2108. Fluid flow path 2121 has an axial bore hole in an exterior surface of second upper axial interface flange 2103 and a top bore hole in the top surface of unified modular block 2100. Fluid flow path 2120 has an axial bore hole in an exterior surface of first upper axial interface flange 2102 and a top bore hole in the top surface of unified modular block 2100. Fluid flow path 2122 has an axial bore hole in an exterior surface of first lower axial interface flange 2104, and preferably is in fluid communication with fluid flow path 2120.

Figure 32B:
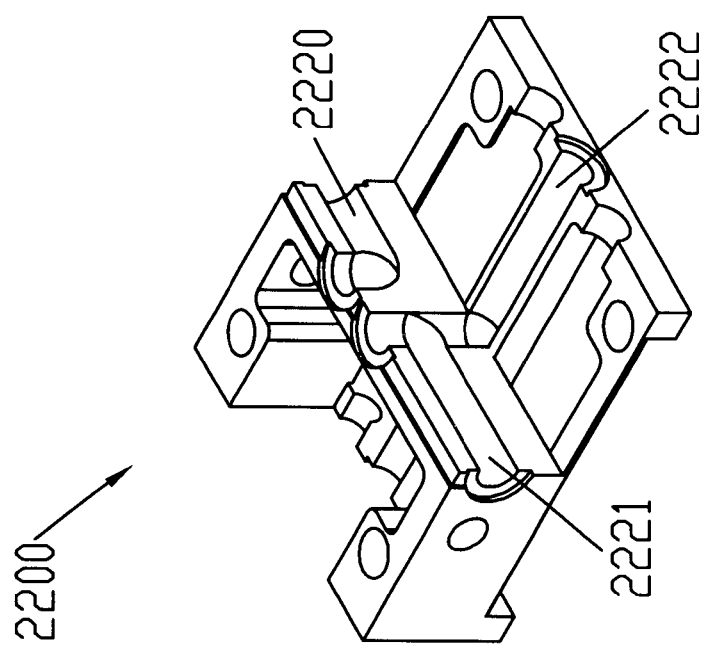
FIG. 32B is a partial cross-sectional view of the unified modular block of FIG. 32A.
Figure 32A:
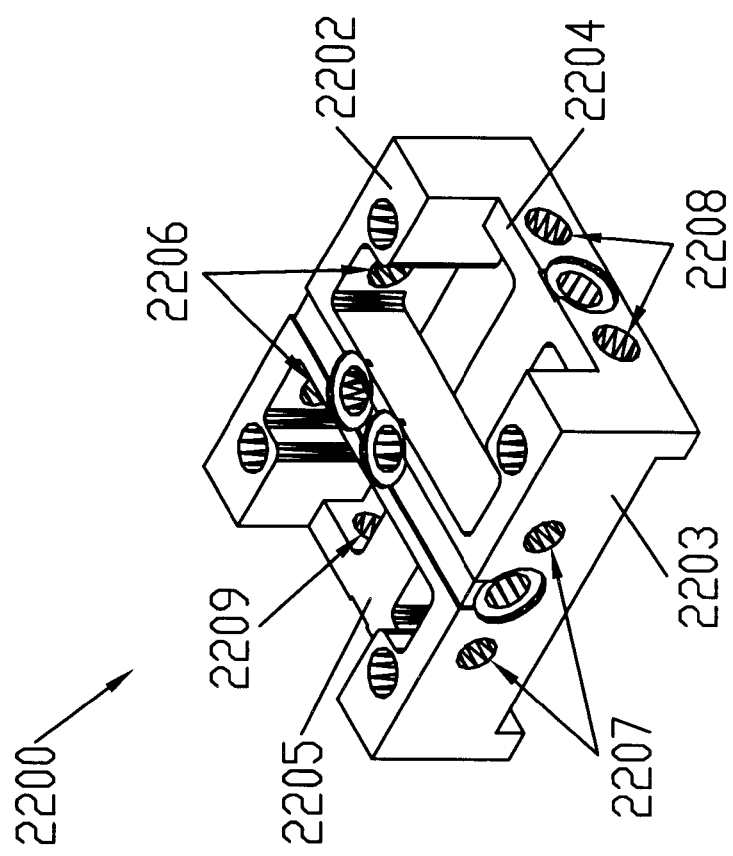
FIG. 32A is a perspective view of a unified modular block in accordance with an embodiment.

FIGS. 32A and 32B are a perspective view and a partial cross-sectional view, respectively, of unified modular block 2200. Unified modular block 2200 is configured to be used as an upstream header tee modular block. Unified modular block 2200 preferably includes a first upper axial interface flange 2202 and a second upper axial interface flange 2203. First upper axial interface flange 2202 preferably includes first upper axial connection locations 2206. Second upper axial interface flange 2203 preferably includes second upper axial connection locations 2207. Unified modular block 2200 also preferably includes a first lower axial interface flange 2204 and a second lower axial interface flange 2205. First lower axial interface flange 2204 preferably includes first lower axial connection locations 2208. Second lower axial interface flange 2205 preferably includes second lower axial connection locations 2209. Fluid flow path 2220 has an axial bore hole in an exterior surface of first upper axial interface flange 2202 and a top bore hole in the top surface of unified modular block 2200. Fluid flow path 2221 has an axial bore hole in an exterior surface of second upper axial interface flange 2203 and a top bore hole in the top surface of unified modular block 2200. Fluid flow path 2222 has an axial bore hole in an exterior surface of first lower axial interface flange 2204, and fluid flow path 2223 has an axial bore hole in an exterior surface of second lower axial interface flange 2205. Fluid flow path 2222 and fluid flow path 2223 are preferably in fluid communication, and both lead into fluid flow path 2221.

Figure 33B:
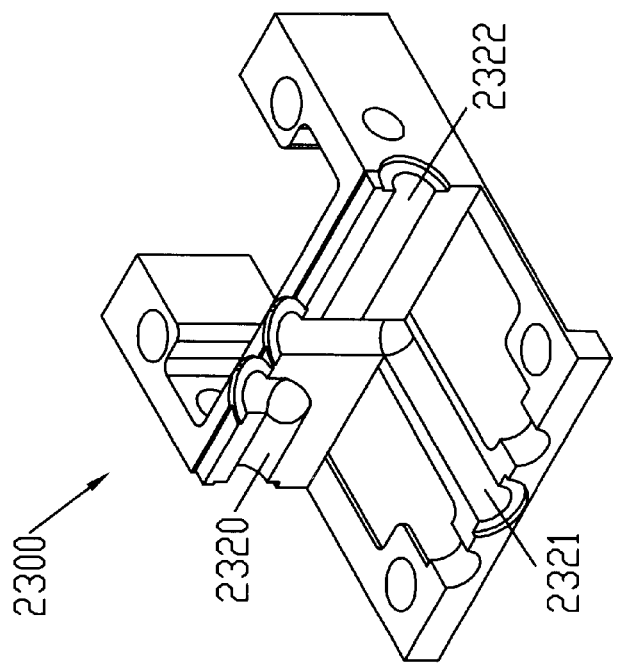
FIG. 33B is a partial cross-sectional view of the unified modular block of FIG. 33A.
Figure 33A:
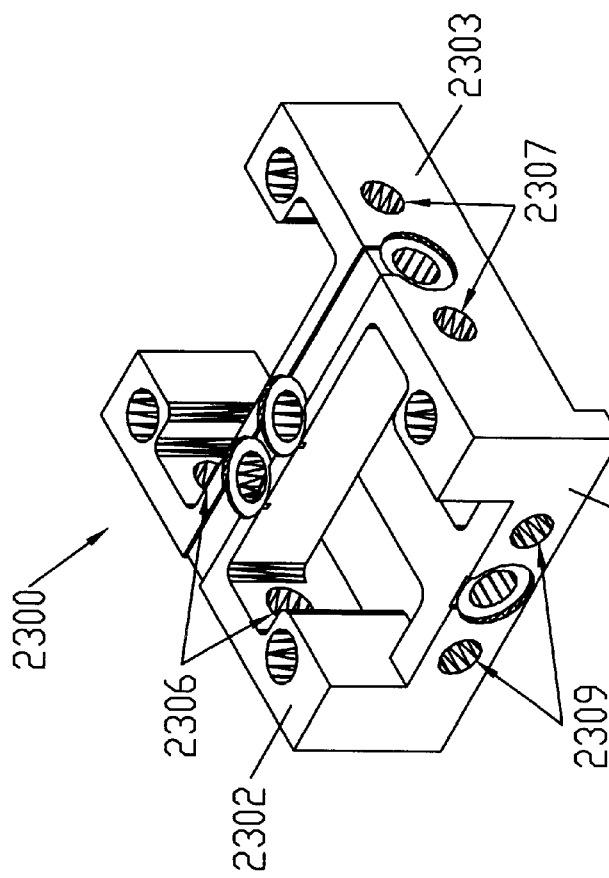
FIG. 33A is a perspective view of a unified modular block in accordance with an embodiment.

FIGS. 33A and 33B are a perspective view and a partial cross-sectional view, respectively, of unified modular block 2300. Unified modular block 2300 is configured to be used as an upstream header left modular block. Unified modular block 2300 preferably includes a first upper axial interface flange 2302 and a second upper axial interface flange 2303. First upper axial interface flange 2302 preferably includes first upper axial connection locations 2306. Second upper axial interface flange 2303 preferably includes second upper axial connection locations 2307. Unified modular block 2300 also preferably includes a second lower axial interface flange 2305. Second lower axial interface flange 2305 preferably includes second lower axial connection locations 2309. Fluid flow path 2320 has an axial bore hole in an exterior surface of first upper axial interface flange 2302 and a top bore hole in the top surface of unified modular block 2300. Fluid flow path 2322 has an axial bore hole in an exterior surface of second upper axial interface flange 2303and a top bore hole in the top surface of unified modular block 2300. Fluid flow path 2321 has an axial bore hole in an exterior surface of second lower axial interface flange 2305, and is preferably in fluid communication with fluid flow path 2322.

Figure 34B:
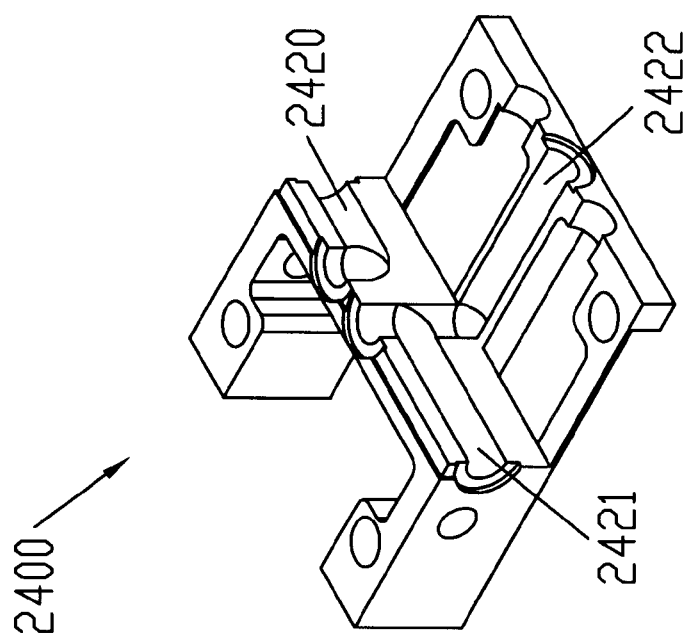
FIG. 34B is a partial cross-sectional view of the unified modular block of FIG. 34A.
Figure 34A:
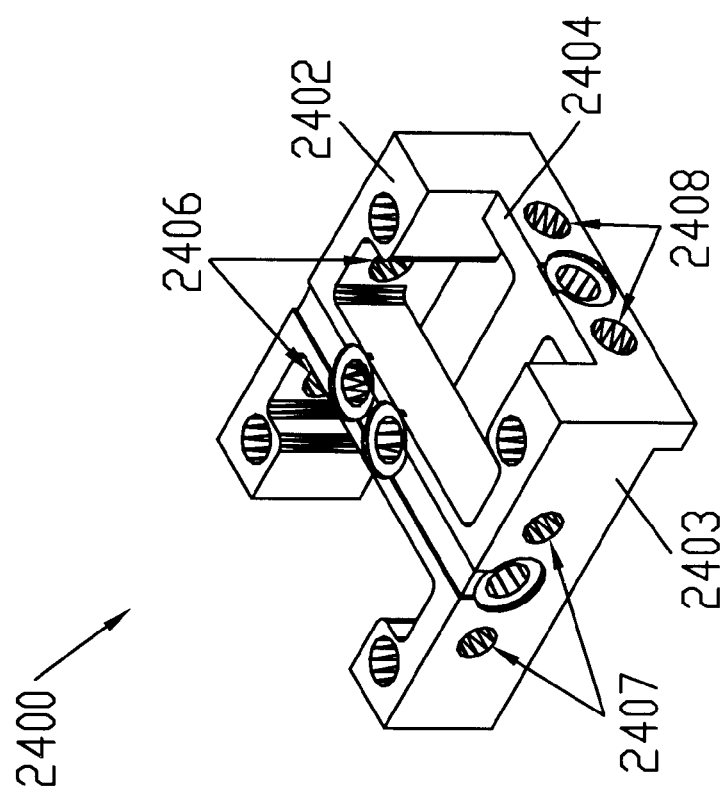
FIG. 34A is a perspective view of a unified modular block in accordance with an embodiment.

FIGS. 34A and 34B are a perspective view and a partial cross-sectional view, respectively, of unified modular block 2400. Unified modular block 2400 is configured to be used as an upstream header right modular block. Unified modular block 2400 preferably includes a first upper axial interface flange 2402 and a second upper axial interface flange 2403. First upper axial interface flange 2402 preferably includes first upper axial connection locations 2406. Second upper axial interface flange 2403 preferably includes second upper axial connection locations 2407. Unified modular block 2400 also preferably includes a first lower axial interface flange 2404. First lower axial interface flange 2404 preferably includes first lower axial connection locations 2408. Fluid flow path 2420 has an axial bore hole in an exterior surface of first upper axial interface flange 2402 and a top bore hole in the top surface of unified modular block 2400. Fluid flow path 2421 has an axial bore hole in an exterior surface of second upper axial interface flange 2403 and a top bore hole in the top surface of unified modular block 2400. Fluid flow path 2422 has an axial bore hole in an exterior surface of first lower axial interface flange 2404, and is preferably in fluid communication with fluid flow path 2421.

FIGS. 35A and 35B are a perspective view and a partial cross-sectional view, respectively, of unified modular block 2600. Unified modular block 2600 is configured to be used as a pump/purge tee modular block. Unified modular block 2600 preferably includes a first upper axial interface flange 2602 and a second upper axial interface flange 2603. First upper axial interface flange 2602 preferably includes first upper axial connection locations 2606. Second upper axial interface flange 2603 preferably includes second upper axial connection locations 2607. Unified modular block 2600 also preferably includes a first lower axial interface flange 2604 and a second lower axial interface flange 2605. First lower axial interface flange 2604 preferably includes first lower axial connection locations 2608. Second lower axial interface flange 2605 preferably includes second lower axial connection locations 2609. Interface web 2615 extends partially between first upper axial interface flange 2602 and second upper axial interface flange 2603. Both axial connection locations 2609, one of axial connection locations 2607, and one of axial connection locations 2606 are substantially obstructed by interface web 2615. Fluid flow path 2620 has an axial bore hole in an exterior surface of first upper axial interface flange 2602, and fluid flow path 2621 has an axial bore hole in an exterior surface of second upper axial interface flange 2603. Additionally, fluid flow path 2622 has an axial bore hole in an exterior surface of first lower axial interface flange 2604 and fluid flow path 2623 has an axial bore hole in an exterior surface of second lower axial interface flange 2605. Fluid flow paths 2620, 2621, 2622, and 2623 are all preferably in fluid communication, and lead into a top bore hole in the top surface of unified modular block 2600.

Figure 36B:
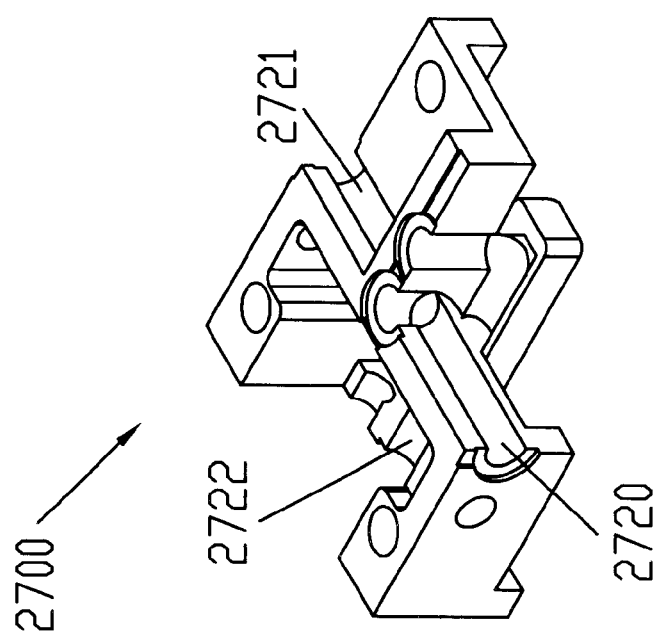
FIG. 36B is a partial cross-sectional view of the unified modular block of FIG. 36A.
Figure 36A:
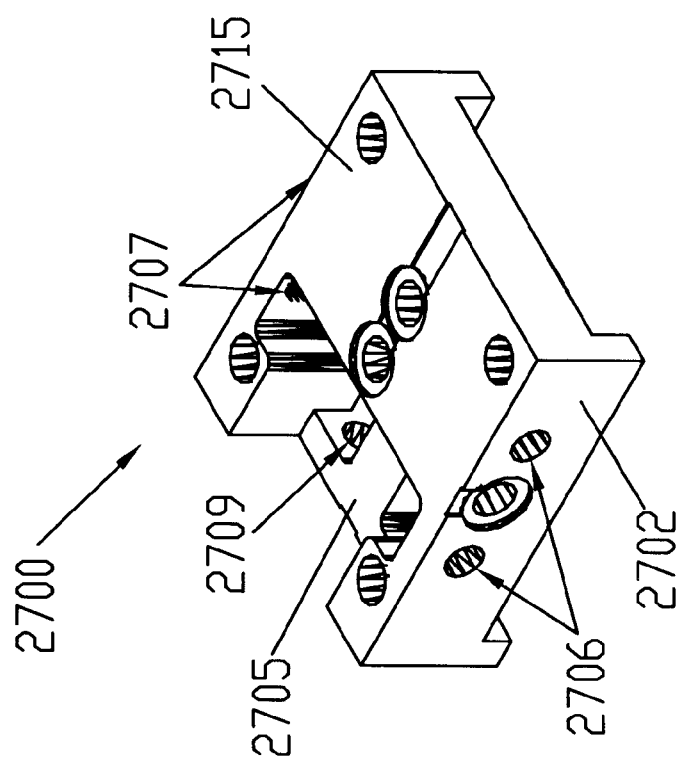
FIG. 36A is a perspective view of a unified modular block in accordance with an embodiment.

FIGS. 36A and 36B are a perspective view and a partial cross-sectional view, respectively, of unified modular block 2700. Unified modular block 2700 is configured to be used as a pump/purge left modular block. Unified modular block 2700 preferably includes a first upper axial interface flange 2702 and a second upper axial interface flange 2703. First upper axial interface flange 2702 preferably includes first upper axial connection locations 2706. Second upper axial interface flange 2703 preferably includes second upper axial connection locations 2707. Unified modular block 2700 also preferably includes a second lower axial interface flange 2705. Second lower axial interface flange 2705 preferably includes second lower axial connection locations 2709. Interface web 2715 extends partially between first upper axial interface flange 2702 and second upper axial interface flange 2703. One of axial connection locations 2707 and one of axial connection locations 2706 are substantially obstructed from the top surface of modular block 2700 by interface web 2715. Fluid flow path 2720 has an axial bore hole in an exterior surface of first upper axial interface flange 2702, and fluid flow path 2721 has an has an axial bore hole in an exterior surface of second upper axial interface flange 2703. Fluid flow path 2720 and fluid flow 2721 are preferably in fluid communication, and lead into a top bore hole in the top surface of unified modular block 2700. Fluid flow path 2722 has an axial bore hole in an exterior surface of second lower axial interface flange 2705 and a top bore hole in the top surface of unified modular block 2700.

Figure 37B:
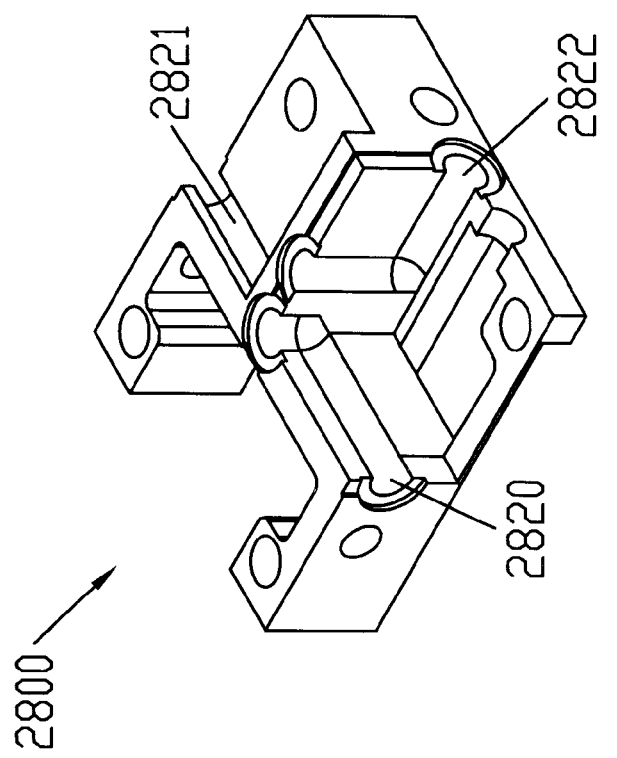
FIG. 37B is a partial cross-sectional view of the unified modular block of FIG. 37A.
Figure 37A:
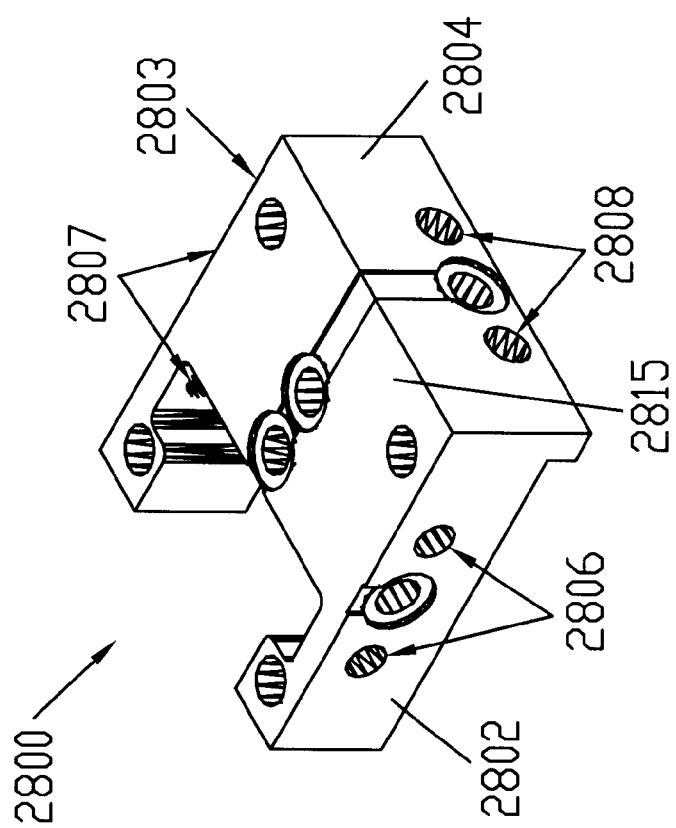
FIG. 37A is a perspective view of a unified modular block in accordance with an embodiment.

FIGS. 37A and 37B are a perspective view and a partial cross-sectional view, respectively, of unified modular block 2800. Unified modular block 2800 is configured to be used as a pump/purge right modular block. Unified modular block 2800 preferably includes a first upper axial interface flange 2802 and a second upper axial interface flange 2803. First upper axial interface flange 2802 preferably includes first upper axial connection locations 2806. Second upper axial interface flange 2803 preferably includes second upper axial connection locations 2807. Unified modular block 2800 also preferably includes a first lower axial interface flange 2804. First lower axial interface flange 2804 preferably includes first lower axial connection locations 2808. Interface web 2815 extends partially between first upper axial interface flange 2802 and second upper axial interface flange 2803. Both of axial connection locations 2808, one of axial connection locations 2807 and one of axial connection locations 2806 are substantially obstructed from the top surface of modular block 2800 by interface web 2815. Fluid flow path 2820 and fluid flow 2821 are preferably in fluid communication, and lead into a top bore hole in the top surface of unified modular block 2800. Fluid flow path 2822 has an axial bore hole in an exterior surface of first lower axial interface flange 2804 and a top bore hole in the top surface of unified modular block 2800.

Figure 38B:
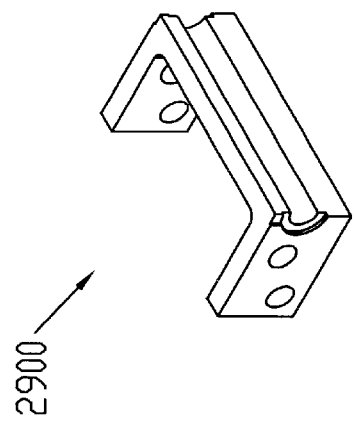
FIG. 38B is a partial cross-sectional view of the top pass thru modular block of FIG. 38A.
Figure 38A:
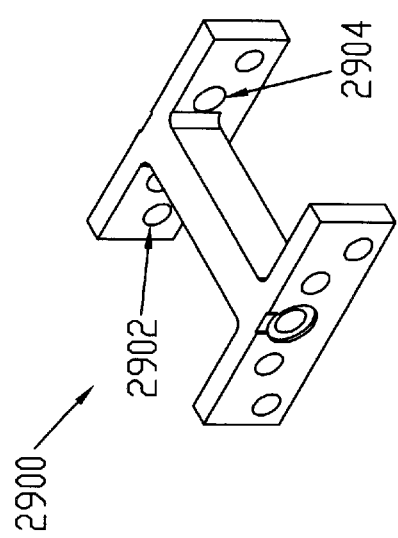
FIG. 38A is a perspective view of a top pass thin modular block in accordance with an embodiment.

FIGS. 38A and 38B are a perspective view and a partial cross-sectional view, respectively, of top pass thru modular block 2900. Top pass through modular 2900 block is configured to direct fluid flow therethrough. Top pass through modular block 2900 includes axial connections locations 2904 configured to allow top pass through modular block 2900 to be coupled to, e.g., an upper interface flange of a unified modular block. Top pass thru modular block includes bracket holes 2902 configured to allow a mounting bracket to be attacked to top pass through modular block 2900.

Figure 39B:
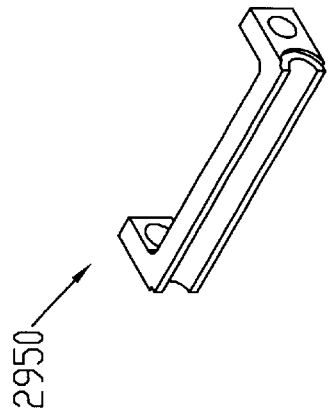
FIG. 39B is a partial cross-sectional view of the bottom pass thru modular block of FIG. 39A.
Figure 39A:
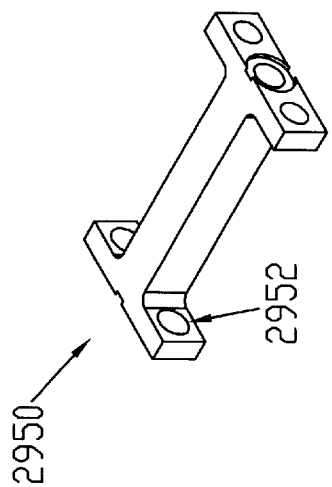
FIG. 39A is a perspective view of a bottom pass thru modular block in accordance with an embodiment.

FIGS. 39A and 39B are a perspective view and a cross-sectional view, respectively, of bottom pass thru modular block 2950. Bottom pass through modular 2950 block is configured to direct fluid flow therethrough. Bottom pass through modular block 2950 includes axial connections locations 2952 configured to allow bottom pass through modular block 2950 to be coupled to, e.g., an lower interface flange of a unified modular block (may also be referred to as a united modular block).

Figure 40B:
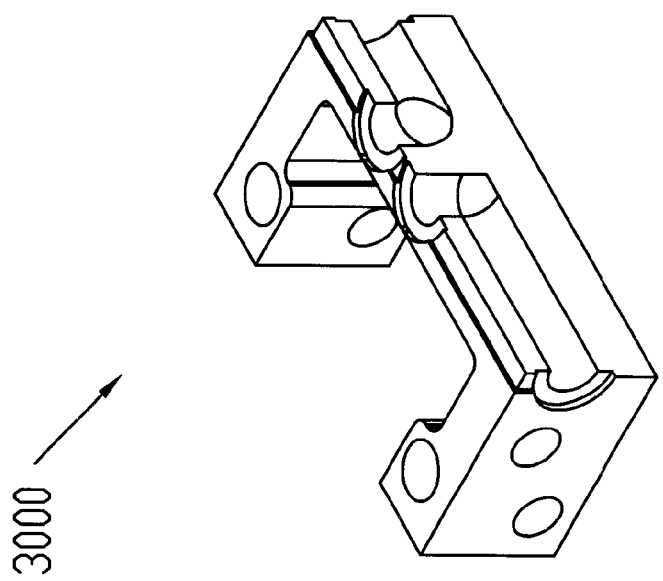
FIG. 40B is a partial cross-sectional view of the top-accessible modular block of FIG. 40A.
Figure 40A:
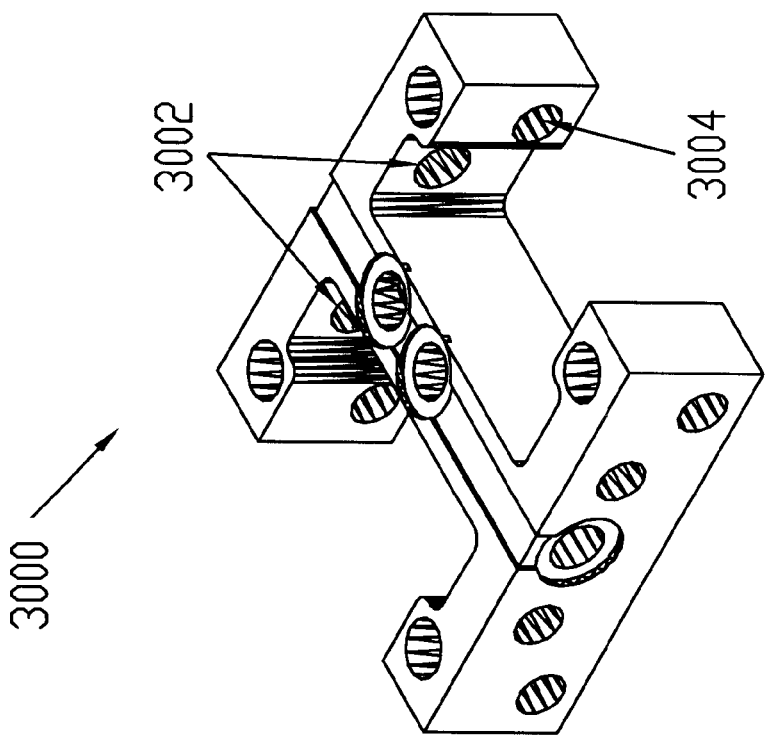
FIG. 40A is a perspective view of a top-accessible modular block in accordance with an embodiment.

FIGS. 40A and 40B are a perspective view and a partial cross-sectional view, respectively, of a universal modular block 3000. Universal modular block 3000 is configured to direct fluid flow therethrough. Universal modular block 3000 includes axial connection locations 3002 for allowing universal modular block 3000 to be coupled to, e.g., a laterally adjacent unified modular block. Universal modular block 3000 includes bracket holes 3004 configured to allow a mounting bracket to be attacked to universal modular block 3000.

Figure 41B:
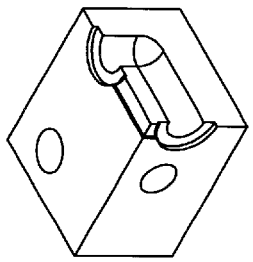
FIG. 41B is a partial cross-sectional view of the MFC outlet block of FIG. 41A.
Figure 41A:
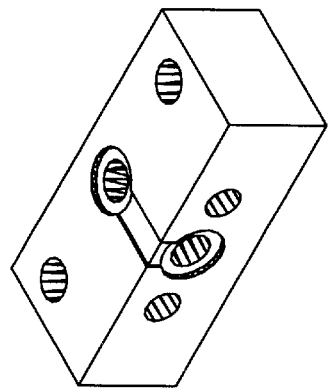
FIG. 41A is a perspective view of an MFC outlet block in accordance with an embodiment.

FIGS. 41A and 41B are a perspective view and a partial cross-sectional view, respectively, an MFC outlet block 3100. MFC outlet block 3100 may be coupled to a laterally adjacent modular block. Additionally, MFC outlet block 3100 is configured to interface with an MFC.

Figure 42B:
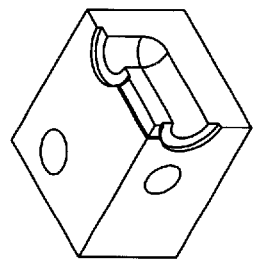
FIG. 42B is a partial cross-sectional view of the MFC inlet block of FIG. 42A.
Figure 42A:
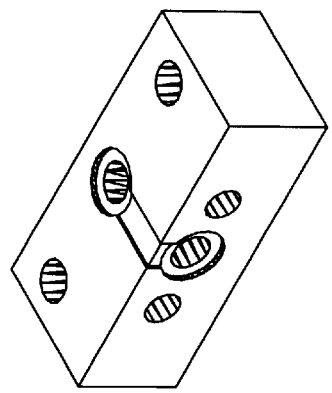
FIG. 42A is a perspective view of an MFC inlet block in accordance with an embodiment.

FIGS. 42A and 42B are a perspective view and a partial cross-sectional view, respectively, an MFC inlet block 3100. MFC inlet block 3200 may be coupled to a laterally adjacent modular block. Additionally, MFC inlet block 3200 is configured to interface with an MFC.

Figure 43B:
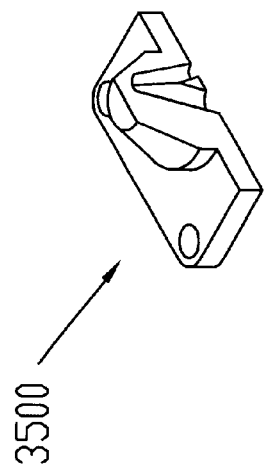
FIG. 43B is a partial cross-sectional view of the Top VCR™ fitting of FIG. 43A.
Figure 43A:
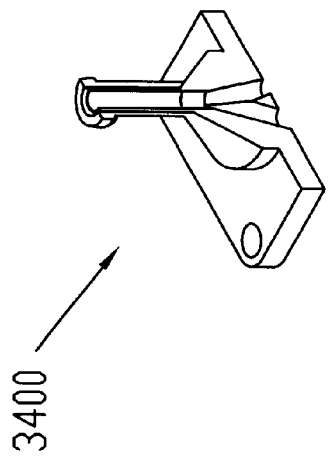
FIG. 43A is a perspective view of a Top VCR™ fitting configured to interface with the top surface of a modular block in accordance with an embodiment.

FIGS. 43A and 43B are a perspective view and a partial cross-sectional view, respectively, of a Top VCR™ fitting 3400. Top VCR™ fitting 3400 is configured to interface with the top surface of a modular block.

Figure 44B:
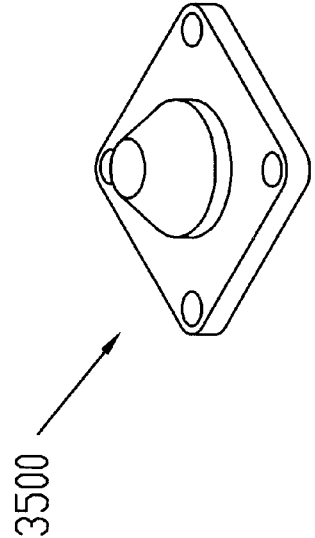
FIG. 44B is a partial cross-sectional view of the pass thru cap of FIG. 43A.
Figure 44A:
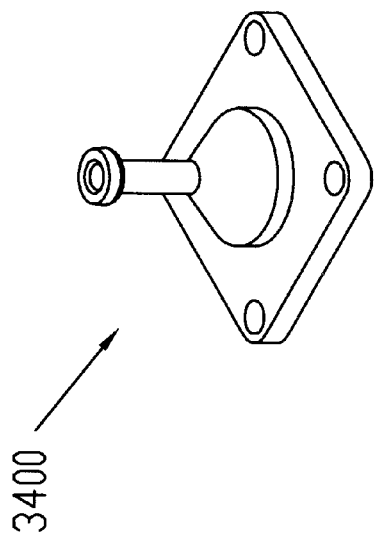
FIG. 44A is a perspective view of a pass thru cap configured to interface with the top surface of a modular block in accordance with an embodiment.

FIGS. 44A and 44B are a perspective view and a partial cross-sectional view, respectively, of a pass thru cap 3500 configured to interface with the top surface of a modular block. Pass thru cap 3500 may be used to pass a fluid flow through a modular block upon which it is mounted.

Figure 45:
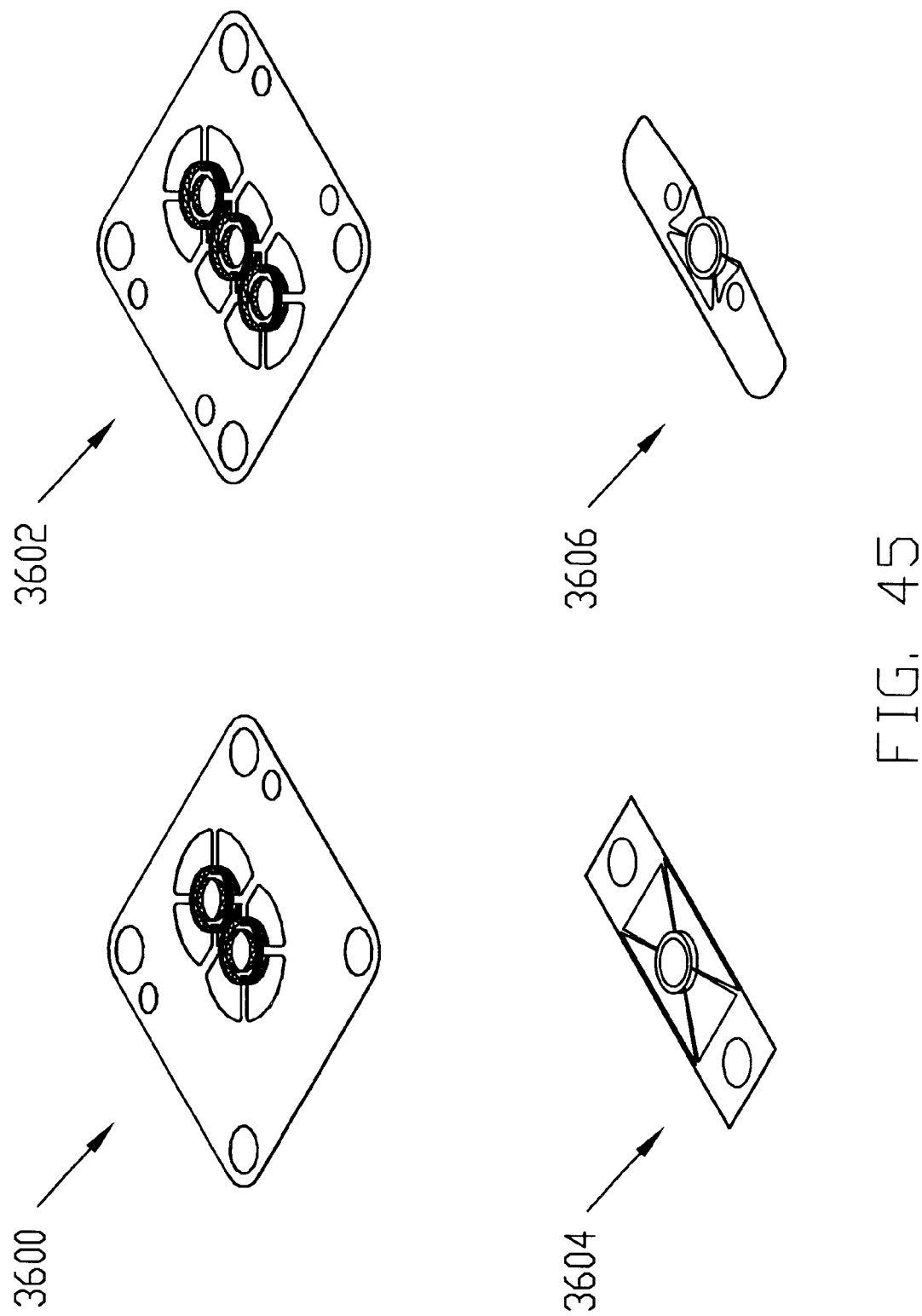
FIG. 45 is a perspective view of seals configured to be used with modular blocks described herein.

FIG. 45 is a perspective view of seals configured to be used with modular blocks described herein. Component interface seal 3600 is a 2-port seal configured to be used between the top surface of a modular block and the bottom surface of a chemical control component. Component interface seal 3602 is a 3-port seal configured to be used between the top surface of a modular block and the bottom surface of a chemical control component. MFC seal 3604 is configured to be used between the top surface of a modular block and the bottom surface of a MFC. Axial seal 3606 is configured to be used between the axial interfaces of laterally adjacent modular blocks. All of the above seals may be constructed from a variety of chemically resistant metals, including nickel and stainless steel.

Figure 46:
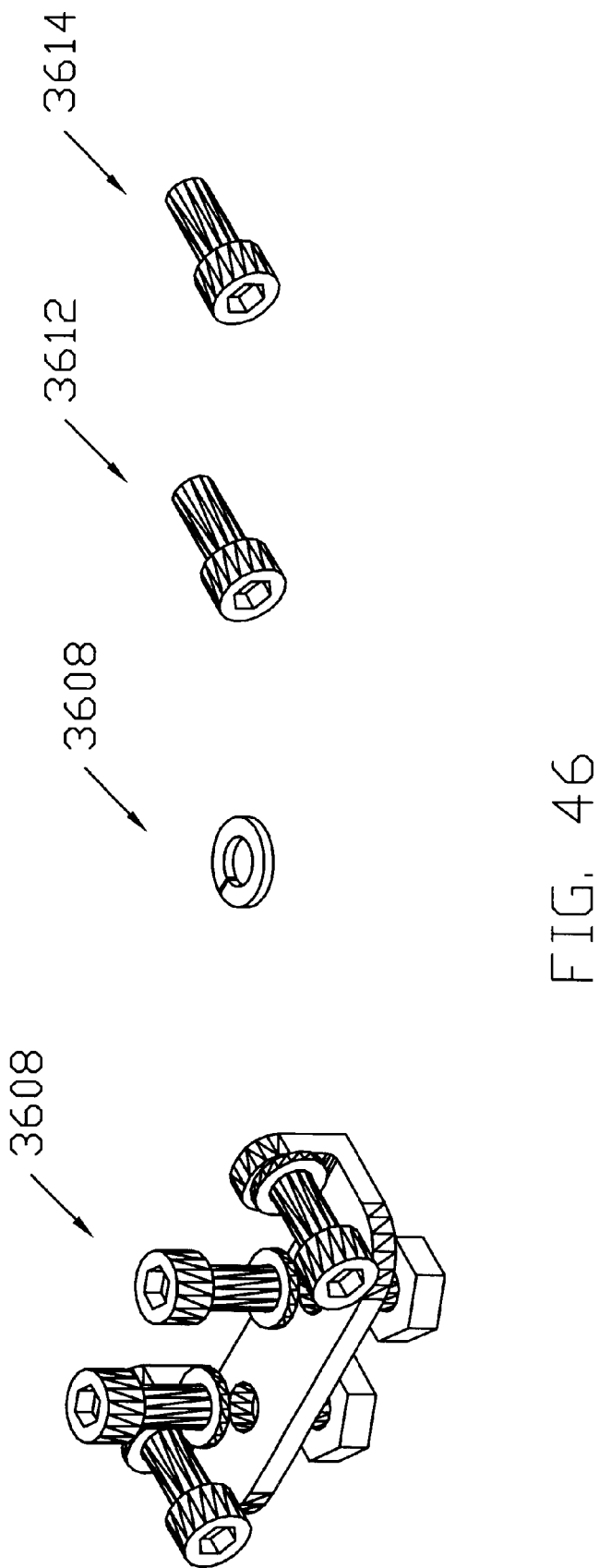
FIG. 46 is a perspective view of a bracket assembly, a lock washer, and fasteners configured to be used with modular blocks described herein.

FIG. 46 is a perspective view of a bracket assembly 3608, a lock washer 3610, and fasteners 3612 and 3614 configured to be used with modular blocks described herein. Bracket assembly 3608 is configured to be coupled to a bracket hole in a modular block and to a support structure for mounting a modular block. Lock washer 3610 is configured be used on the shaft of a fastener (e.g., fasteners 3612 and 3614). Fasteners 3612 and 3614 are fasteners configured couple adjacent modular blocks and/or a modular block to another component. For example, fasteners 3612 and 3614 may be local side-to-side fasteners, top-to-bottom fasteners, chemical control component fasteners, or mounting fasteners. Fasteners 3612 and 3614 may be threaded or unthreaded fasteners, and may include screws or nuts and/or bolts.

FIG. 47 is a perspective view of inlet fittings configured to be used with modular blocks described herein. Bottom fitting right 3700 includes axial connection locations 3701 configured to allow bottom fitting right 3700 to be coupled to a modular block. Bottom fitting left 370 includes axial connection locations 3703 configured to allow bottom fitting left 3702 to be coupled to a modular block. Tube stub inlet 3704 includes axial connection locations 3740 configured to allow tube stub inlet 3704 to be coupled to a modular block, and bracket holes 3742 configured to allow a mounting bracket to be attacked to tube stub inlet 3704. Tube stub outlet 3706 includes axial connection locations 3760 configured to allow tube stub outlet 3706 to be coupled to a modular block, and bracket holes 3762 configured to allow a mounting bracket to be attacked to tube stub outlet 3706. Inlet fitting 3708 includes axial connection locations 3780 configured to allow inlet fitting 3708 to be coupled to a modular block, and bracket holes 3782 configured to allow a mounting bracket to be attacked to inlet fitting 3708. Outlet fitting 3710 includes axial connection locations 3790 configured to allow outlet fitting 3710 to be coupled to a modular block, and bracket holes 3792 configured to allow a mounting bracket to be attacked to outlet fitting 3710. All of the above parts may be used as part of a modular chemical delivery system.

Further modifications and alternative embodiments of various aspects of the invention will be apparent to those skilled in the art in view of this description. Accordingly, this description is to be construed as illustrative only and is for teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A unified modular chemical delivery block configured to direct multi-directional fluid flow therethrough, comprising:
   at least four mounting holes in a top surface for mounting a chemical delivery control component;
   a first fluid flow path for transporting fluid flow through the modular block at least partially in a first direction, wherein the first fluid flow path comprises a first axial bore hole in a first exterior surface of the unified modular block and extends from the first exterior surface in the first direction;
   a first axial connection location configured to allow the modular block to be coupled to another modular block laterally adjacent to the first axial bore hole, wherein said unified modular block is configured to be fastened to the laterally adjacent modular block by insertion of a fastener into said first axial connection location from an interior of said unified modular block;
   a second fluid flow path for transporting fluid flow through the modular block at least partially in a second direction, wherein the second fluid flow path comprises a second axial bore hole in a second exterior surface of the unified modular block and extends from the second exterior surface in the second direction, and wherein the second direction is horizontally transverse to the first direction, and wherein a lowermost portion of the second fluid flow path is elevationally below a lowermost portion of the first fluid flow path; and
   a second axial connection location configured to allow the modular block to be coupled to a modular block laterally adjacent to the second axial bore hole;
   wherein said first axial borehole and said first axial connection location are laterally located in said first exterior surface completely between respective opposing edges of a first pair of said mounting holes closest to said first exterior surface, and wherein said second axial borehole and said second axial connection location are laterally located in said second exterior surface completely between respective opposing edges of a second pair of said mounting holes closest to said second exterior surface.

2. The unified modular block of claim 1, wherein the unified modular block is free of intermediate fasteners or seals.

3. The unified modular block of claim 1, wherein the second direction is substantially horizontally perpendicular to the first direction.

4. The unified modular block of claim 1, further comprising a first axial interface flange having the first exterior surface and a second axial interface flange having the second exterior surface, wherein the first axial interface flange is oriented substantially perpendicular to the first direction and the second axial interface flange is oriented substantially perpendicular to the second direction.

5. The unified modular block of claim 4, wherein the first fluid flow path comprises a first axial bore hole in the first axial interface flange and the second fluid flow path comprises a second axial bore hole in the second interface flange.

6. The unified modular block of claim 5, wherein the first fluid flow path and the second fluid flow path are configured to be in fluid communication within the unified modular block.

7. The unified modular block of claim 5, wherein the first fluid flow path further comprises a first top borehole in a top surface of said unified modular block.

8. The unified modular block of claim 7, wherein the second fluid flow path further comprises a second top borehole in a top surface of said unified modular block.

9. The unified modular block of claim 8, wherein the first top bore hole is arranged in a center of the top surface.

10. The unified modular block of claim 8, wherein the second top bore hole is arranged in a center of the top surface.

11. The unified modular block of claim 8, wherein the second fluid flow path is configured to transport fluid between the second axial borehole and the second top borehole without passing through a seal.

12. The unified modular block of claim 11, the second fluid flow path comprises a vertical fluid flow segment, and wherein the length of the vertical fluid flow segment is less than one-third a length and a width of the unified modular block.

13. The unified modular block of claim 1, wherein a thickness of the unified modular block is less than one-half a length and a width of the unified modular block.

14. The unified modular block of claim 1, wherein the modular block comprises stainless steel.

15. The unified modular block of claim 1, wherein the modular block comprises a fluorocarbon polymer.

16. A modular chemical delivery system, comprising:
a plurality of unified modular blocks each configured to provide multi-directional fluid flow therethrough, each of the plurality of unified modular blocks comprising:
at least four mounting holes in a top surface for mounting a chemical delivery control component;
a first fluid flow path for transporting fluid flow through the modular block at least partially in a first direction, wherein the first fluid flow path comprises a first axial bore hole in a first exterior surface of the unified modular block and extends from the first exterior surface in the first direction;
a first axial connection location configured to allow the modular block to be coupled to another modular block laterally adjacent to the first axial bore hole, wherein said unified modular block is configured to be fastened to the laterally adjacent modular block by insertion of a fastener into said first axial connection location from an interior of said unified modular block;
a second fluid flow path for transporting fluid flow through the modular block at least partially in a second direction, wherein the second fluid flow path comprises a second axial bore hole in a second exterior surface of the unified modular block and extends from the second exterior surface in the second direction, and wherein a lowermost portion of the second fluid flow path is elevationally below a lowermost portion of the first fluid flow path; and
a second axial connection location configured to allow the modular block to be coupled to a modular block laterally adjacent to the second axial bore hole, wherein the second direction is horizontally transverse to the first direction, and wherein the first and second directions are substantially parallel to a top surface of the unified modular block;
wherein said first axial borehole and said first axial connection location are laterally located in said first exterior surface completely between respective opposing edges of a first pair of said mounting holes closest to said first exterior surface, and wherein said second axial borehole and said second axial connection location are laterally located in said second exterior surface completely between respective opposing edges of a second pair of said mounting holes closest to said second exterior surface; and
a plurality of local side-to-side fasteners, wherein fasteners of the plurality of local side-to-side fasteners couple ones of the plurality of unified modular blocks to other, laterally adjacent ones of the plurality of unified modular blocks.

17. The system of claim 16, wherein the first axial connection location of each of the plurality of modular blocks further comprises a first axial fastener receiving element comprising an opening defined in the first exterior surface and configured to receive fasteners for coupling the modular block to a laterally adjacent modular block, and wherein the second axial connection location of each of the plurality of modular blocks further comprises a second axial fastener receiving element comprising an opening defined in the second exterior surface and configured to receive fasteners for coupling the modular block to an laterally adjacent modular block, and wherein each of the plurality of fasteners is arranged within the first axial fastener receiving element of one of said plurality of modular blocks and within the second axial fastener receiving element of another of said plurality of unified modular blocks such that each of the plurality of modular blocks is coupled to at least one other, laterally adjacent modular block, and further comprising sealing joints between laterally adjacent modular blocks to connect at least one of the fluid flow paths of each coupled one of the plurality of unified modular blocks.

18. The system of claim 17, wherein first, second and third coupled ones of the plurality of unified modular blocks are coupled such that the first fluid flow path of the first coupled one of the plurality of unified modular blocks is connected to the first fluid flow path of the second coupled one of the plurality of unified modular blocks, and wherein the second fluid flow path of the first coupled one of the plurality of unified modular blocks is connected to the second fluid flow path of the third coupled one of the plurality of unified modular blocks.

19. The system of claim 18, and wherein the first coupled one of the plurality of unified modular blocks comprises a third fluid flow path for transporting fluid flow through the modular block at least partially in the first direction, wherein the third fluid flow path of the plurality of unified modular blocks comprises a third axial bore hole in a third exterior surface of the first coupled one of the plurality of unified modular blocks, the system further comprising a single flow direction modular block comprising a first fluid flow path, and wherein the single flow direction modular block is coupled to the first coupled one of the plurality of unified modular blocks such that the first fluid flow path of the single flow direction modular block is connected to the third fluid flow path of the first coupled one of the plurality of unified modular blocks.

20. The system of claim 17, wherein each of the coupled ones of the plurality of unified modular blocks comprises a sealing interface arranged around each fluid flow path bore hole, and further comprising a plurality of sealing elements arranged between and in contact with coupled ones of the plurality of modular blocks to form the sealing joints, and wherein each of the sealing elements comprising a sealing gasket configured to interface with the sealing interfaces of the plurality of modular blocks, wherein the gasket comprises a first hole aligned with said fluid flow path bore hole for fluid flow therethrough and a second hole configured to aligned with either said first axial connection location or said second axial connection location.

21. The system of claim 17, wherein the plurality of modular blocks is coupled together such that decoupling one of the plurality of laterally adjacent modular blocks from a laterally adjacent modular block does not compromise the integrity of sealing joints existing between any other ones of the plurality of modular blocks.

22. The system of claim 16, wherein each of the plurality of unified modular blocks further comprises a plurality of component fastener receiving elements configured to receive fasteners for mounting a chemical control component above the top surfaces of each of the pluralities of modular blocks.

23. The system of claim 16, further comprising a semiconductor processing chamber, and wherein the system is configured to transport fluid flow from the plurality of modular blocks to the semiconductor processing chamber.

24. The system of claim 16, wherein each of the plurality of unified modular blocks further comprises a first axial interface flange having the first interior and exterior surfaces and a second axial interface flange having the second interior and exterior surfaces, wherein the first axial interface flange is oriented substantially perpendicular to the first direction and the second axial interface flange is oriented substantially perpendicular to the second direction.

25. The system of claim 24, wherein first axial connection locations of each of the plurality of unified modular blocks further comprise a plurality of first axial fastener receiving elements defined in the first axial interface flange and configured to receive local side-to-side fasteners for coupling the modular block to an laterally adjacent modular block, wherein each of the plurality of first axial fastener receiving elements comprises an interior opening defined in the first interior surface of the first axial interface flange and an exterior opening defined in the first exterior surface of the first axial interface flange, and wherein the interior opening of each of the plurality of first axial fastener receiving elements is unobstructed by other portions of the modular block and configured so that when fasteners are inserted through each of the plurality of first axial fastener receiving elements, the fasteners are accessible from the top surface.

* * * * *